(12) United States Patent
Niedzwiecki et al.

(10) Patent No.: US 11,802,024 B2
(45) Date of Patent: Oct. 31, 2023

(54) SYSTEM AND METHOD FOR THE TRANSPORT AND HOLDING OF BUILDING MATERIALS

(71) Applicant: NILEC SOLUTIONS, LLC, Houston, TX (US)

(72) Inventors: Timothy Allen Niedzwiecki, Atlantic Mine, MI (US); Scott David Compton, Houston, TX (US)

(73) Assignee: Nilec Solutions, LLC, Houston, TX (US)

( * ) Notice: Subject to any disclaimer, the term of this patent is extended or adjusted under 35 U.S.C. 154(b) by 370 days.

(21) Appl. No.: 17/151,581

(22) Filed: Jan. 18, 2021

(65) Prior Publication Data

US 2021/0221651 A1 Jul. 22, 2021

Related U.S. Application Data

(60) Provisional application No. 63/082,423, filed on Sep. 23, 2020, provisional application No. 62/964,064, filed on Jan. 21, 2020.

(51) Int. Cl.
| | |
|---|---|
| *B66C 1/24* | (2006.01) |
| *B65D 19/38* | (2006.01) |
| *F16M 11/22* | (2006.01) |
| *B65D 19/40* | (2006.01) |

(52) U.S. Cl.
CPC ............ *B66C 1/24* (2013.01); *B65D 19/38* (2013.01); *B65D 19/40* (2013.01); *F16M 11/22* (2013.01)

(58) Field of Classification Search
CPC ................................ B65D 19/38; B66C 1/24
USPC ........................................ 108/51.11; 248/544
See application file for complete search history.

(56) References Cited

U.S. PATENT DOCUMENTS

| | | | | |
|---|---|---|---|---|
| 1,555,022 | A | * | 9/1925 | Proctor .............. B65D 71/0096 294/67.41 |
| 3,058,542 | A | | 10/1962 | Rogalla |
| 5,960,904 | A | | 10/1999 | Ullmann |
| 6,269,905 | B1 | | 8/2001 | Smith |
| 8,939,415 | B2 | | 1/2015 | Dillinger et al. |
| 10,844,616 | B2 | | 11/2020 | Rashid et al. |
| 2005/0207873 | A1 | | 9/2005 | Endrud |
| 2006/0059858 | A1 | | 3/2006 | Layman |
| 2009/0229213 | A1 | * | 9/2009 | Mistelski .............. A01M 31/02 248/237 |
| 2009/0249740 | A1 | | 10/2009 | Crookston |
| 2015/0021452 | A1 | | 1/2015 | Bourbonnais |

* cited by examiner

*Primary Examiner* — Jose V Chen
(74) *Attorney, Agent, or Firm* — The Compton Law Firm, P.C.; Scott D. Compton

(57) ABSTRACT

The present disclosure is directed to the transport of one or more loads of items including building materials and/or other items to one or more target surfaces including one or more elevated surfaces. The present disclosure is also directed to the holding of one or more loads of items including building materials and/or other items during transport to one or more target surfaces including one or more elevated surfaces. The present disclosure is also directed to the holding of one or more loads of items including building materials and/or other items on one or more target surfaces including one or more elevated surfaces.

16 Claims, 46 Drawing Sheets

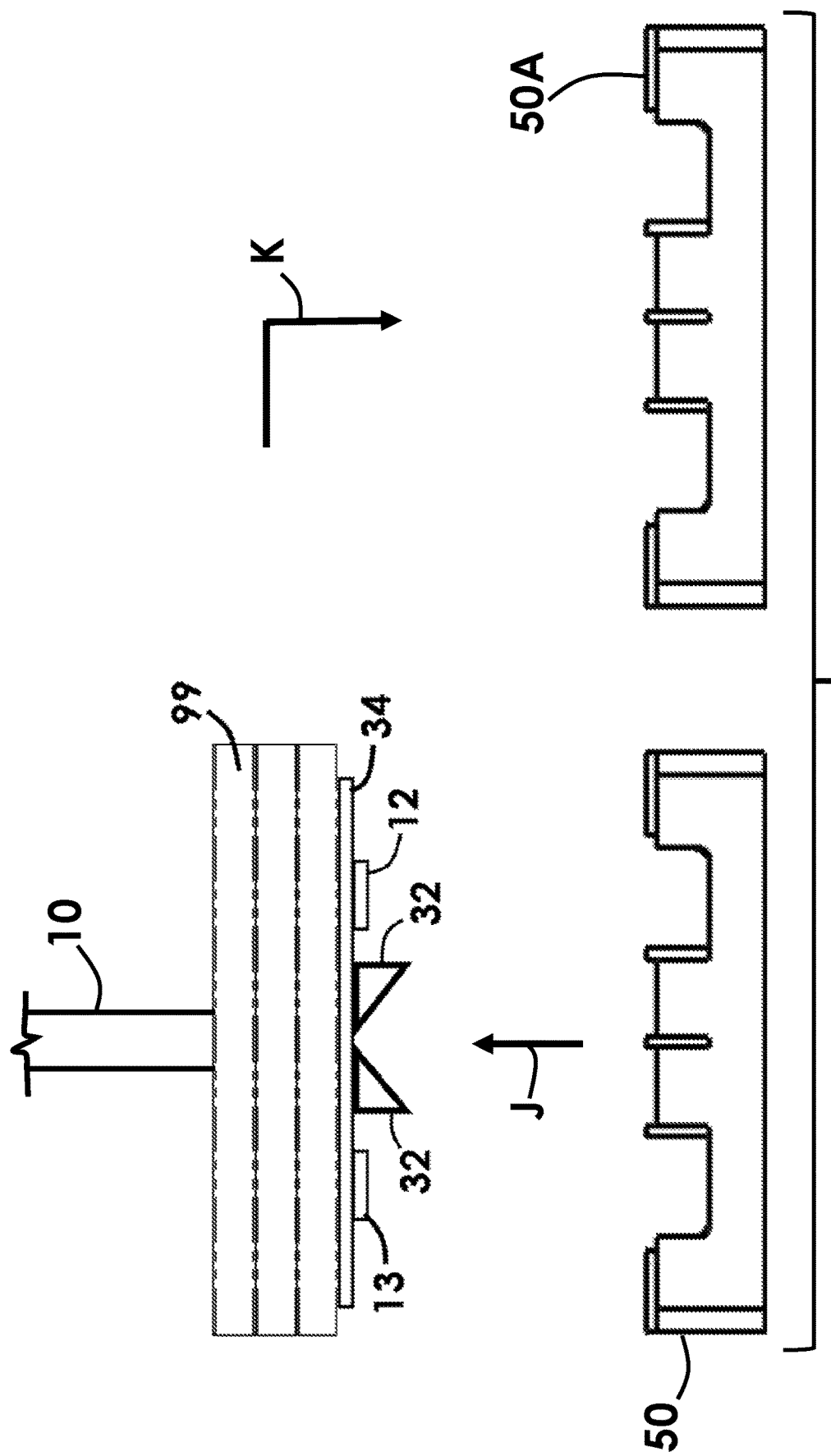

SYSTEM AND METHOD FOR THE TRANSPORT AND HOLDING OF BUILDING MATERIALS

CROSS-REFERENCE TO RELATED APPLICATIONS

This application claims benefit of U.S. Provisional Patent Application Ser. No. 62/964,064, filed on Jan. 21, 2020, the content of which is hereby incorporated by reference in its entirety. This application also claims benefit of U.S. Provisional Patent Application Ser. No. 63/082,423, filed on Sep. 23, 2020, the content of which is hereby incorporated by reference in its entirety.

STATEMENT REGARDING FEDERALLY SPONSORED RESEARCH OR DEVELOPMENT

Not applicable.

BACKGROUND OF THE DISCLOSURE

1. Field of the Disclosure

This application relates generally to the transport and holding of loads including loads of building materials and/or other items.

2. Background Art

Building materials such as bundles of roofing shingles, bricks, and lumber are delivered to construction sites and often placed on elevated surfaces such as roofs and the like. In instances where building materials are set on pitched roofs, person(s) often manually place the building materials on or near peak(s) of a roof. In other instances, person(s) manually place building materials on a roof against toe boards or brackets configured to hold the building materials in place preventing the building materials from falling off the roof. In still other instances, table top devices are placed on peaks of roofs to hold building materials including pallets carrying building materials, such devices having undersides shaped to rest on a pitched roof and/or legs configured to maintain the table top surface of the device in a level or substantially level orientation over a peak of a roof Certain table top devices may be limited to operation on a particular type of roof, limited to operation on a roof of a certain pitch or less, limited to operation on a roof constructed from a particular surface material, or limited to operation on a roof with a ridge of a certain length. A common feature for the above mentioned modes of delivery of building materials to a roof is that they all require manual installation by person(s) located on the roof at the time of delivery. Overcoming these shortcomings is desired.

SUMMARY OF THE DISCLOSURE

The present application is directed to a system for transporting one or more loads to one or more target surfaces, the system comprising at least one lifting device comprising a descending fork frame and one or more portable supports operationally configured to be transported together with one or more loads via the lifting device to one or more target surfaces and hold the one or more loads on the one or more target surfaces. The one or more portable supports are operationally configured to space at least part of the one or more loads from the one or more target surfaces.

The present application is also directed to a system for transporting one or more loads to one or more target surfaces, the system comprising at least one lifting device comprising a descending fork frame; and at least one portable platform operationally configured to transport one or more loads thereon comprising a base member and one or more removable members comprising one or more portable supports operationally configured to be removed from the base member by the lifting device with a load thereon and transported together with the load to one or more target surfaces. Each portable platform comprises first fork pockets for transport of the portable platform and second fork pockets for transport of the one or more portable supports apart from the base member of the portable platform.

The present application is also directed to a method for transporting one or more loads to one or more target surfaces, comprising (1) providing (a) at least one lifting device comprising a descending fork frame in communication with lifting equipment; and (b) at least one portable platform operationally configured to transfer one or more loads thereon comprising a base member and one or more first portable supports operationally configured to be removed from the base member by the lifting device with a load thereon and transported together with the load to a first target surface of the one or more target surfaces, the portable platform further comprising first fork pockets for receiving elongated support members of the lifting device in a manner effective to transport the portable platform and second fork pockets for receiving the elongated support members in a manner effective to direct the load and the one or more first portable supports apart from the base member; and (2) directing the load and one or more first portable supports apart from the base member and placing the load and the one or more first portable supports on the first target surface via the lifting device. The one or more first portable supports are operationally configured to hold a load on a first target surface in a manner effective to provide spacing between the first target surface and the load.

BRIEF DESCRIPTION OF THE SEVERAL VIEWS OF THE DRAWING

FIG. 63 is a side view illustrating transport of one or more portable supports and one or more bundles of the roofing shingles from a first portable platform to a second portable platform.

DEFINITIONS USED IN THE DISCLOSURE

Figure 1:
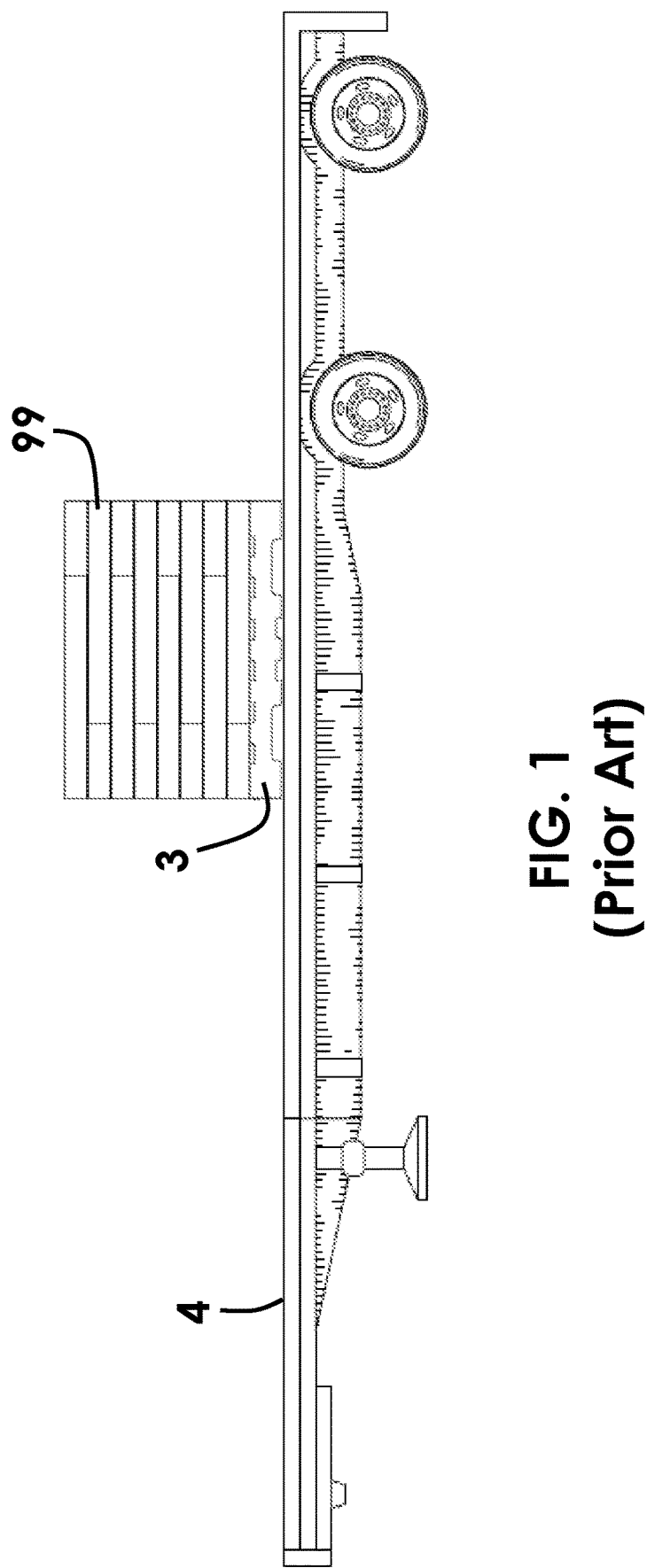
FIG. 1 is a side view of a platform trailer and a pallet carrying bundles of roofing shingles located on the platform trailer.

The term "at least one", "one or more", and "one or a plurality" mean one thing or more than one thing with no limit on the exact number; these three terms may be used interchangeably within this application. For example, at least one device means one or more devices or one device and a plurality of devices.

The term "about" means that a value of a given quantity is within ±20% of the stated value. In other embodiments, the value is within ±15% of the stated value. In other embodiments, the value is within ±10% of the stated value. In other embodiments, the value is within ±7.5% of the stated value. In other embodiments, the value is within +5% of the stated value. In other embodiments, the value is within ±2.5% of the stated value. In other embodiments, the value is within ±1% of the stated value.

The term "substantially" or "essentially" means that a value of a given quantity is within ±10% of the stated value. In other embodiments, the value is within ±7.5% of the stated value. In other embodiments, the value is within ±55% of the stated value. In other embodiments, the value is within ±2.5% of the stated value. In other embodiments, the value is within ±1% of the stated value. In other embodiments, the value is within ±0.5% of the stated value. In other embodiments, the value is within ±0.1% of the stated value.

DETAILED DESCRIPTION OF THE DISCLOSURE

For the purposes of promoting an understanding of the principles of the disclosure, reference is now made to the embodiments illustrated in the drawings and particular language will be used to describe the same. It is understood that no limitation of the scope of the claimed subject matter is intended by way of the disclosure. As understood by one skilled in the art to which the present disclosure relates, various changes and modifications of the principles as described and illustrated are herein contemplated.

It is to be understood that the present disclosure is not limited to particular embodiments. It is also to be understood that the terminology used herein is for the purpose of describing particular embodiments only, and is not intended to be limiting. As used in this specification and the appended claims, the terms "building materials" and "construction materials" may be used interchangeably. Herein, a category or type of building materials includes, but is not necessarily limited to "roofing materials" as the term is understood by the skilled artisan in the field of building construction. In reference to roofs of buildings, coverings and houses, the terms "peak" and "ridge" may be used interchangeably. In addition to its common definition of transferring or conveying something from one place to another, the term "transport" may also refer to one or more of moving, holding, carrying, lifting, storing, placing, setting, delivering one or more items to one or more target surfaces.

Herein, a "target surface" may include one or more ground surfaces, elevated surfaces, and combinations thereof. Target surfaces may include one or more planar surfaces, non-planar surfaces, curved surfaces, and combinations thereof. Target surfaces may include one or more horizontal surfaces, substantially horizontal surfaces, incline surfaces, pitched surfaces, curved surfaces, and combinations thereof. The term "elevated surface" may refer to one or more natural or man-made surfaces located at a higher altitude than a surface location of one or more items to be transported up to the one or more higher altitude surfaces. Exemplary elevated surfaces include, but are not necessarily limited to roofs or rooftops including peaks of roofs, bridges, overpasses, building ledges, tower platforms, loading docks, balconies of building structures, ramps, piping, vehicular surfaces, flatbed lifts, rigging containers, crane baskets, skip pans, and combinations thereof. Vehicular surfaces may include, but are not necessarily limited to automobile surfaces such as flatbeds and transportable towable flatbeds, locomotive surfaces such as transportable flatcars and containers, helicopter cargo surfaces, airplane cargo surfaces, airplane wing surfaces, airplane fuselage surfaces, ship decks and/or other ship cargo surfaces, and combinations thereof. The terms "unit load" and "load" may herein be used interchangeably to refer to one or more items that may be transported by a lifting device of the present disclosure and placed on one or more target surfaces by the lifting device.

In one embodiment, the disclosure comprises a system and method for transporting one or more items including, but not necessarily limited to one or more building materials onto one or more target surfaces including one or more elevated surfaces and holding the one or more items on the one or more target surfaces. In one embodiment, the system and method may include one or more portable supports operationally configured to hold the one or more items during transport and operationally configured to hold the one or more items on one or more target surfaces. In one embodiment, the system and method may include one or more portable platform assemblies comprising one or more portable supports. The one or more portable platforms and one or more portable supports of this disclosure may be built to scale.

In one embodiment, the disclosure comprises one or more portable platform assemblies operationally configured to hold one or more items during transport. One embodiment of a portable platform assembly comprises a portable platform comprising at least a first member operationally configured to contact one or more transport surfaces and one or more second members operationally configured to contact one or more transport surfaces and/or contact one or more end user target surfaces.

In one embodiment, the disclosure comprises a system and method for the transport of building materials and/or other items to one or more target surfaces without persons being present at the one or more target surfaces.

In one embodiment, the disclosure comprises a system, assembly and method for the transport of building materials and/or other items to one or more target surfaces including one or more elevated target surfaces without persons present at or otherwise located on the one or more elevated surfaces at the time the building materials and/or other items are placed on the one or more elevated surfaces.

In one embodiment, the disclosure comprises one or more portable supports for holding or retaining building materials and/or other items on one or more target surfaces.

In one embodiment, the disclosure comprises one or more portable supports operationally configured to be directed onto one or more target surfaces together with a load of one or more building materials and/or other items without any persons located at or on the one or more target surfaces at the time the one or more portable supports and accompanying load are placed or set on the one or more target surfaces. As such, the one or more portable supports of the present disclosure and an accompanying load for each may be placed or set on one or more target surfaces via one or more fully automated modes of transport. For example, one or more building materials and/or other items may be carried by one or more portable supports in a manner effective to direct the one or more portable supports and the one or more building materials and/or other items onto one or more target surfaces in one or more fully automated modes of delivery.

In one embodiment, the disclosure comprises one or more portable supports and/or one or more portable support assemblies operationally configured to hold or retain one or more building materials and/or other items on elevated surfaces including flat roofs, one or more inclined roofs and one or more pitched roofs of a plurality of pitches.

In one embodiment, the disclosure comprises one or more portable supports and/or one or more portable support assemblies operationally configured to accommodate pitched roofs having dissimilar roof pitches on each side of a peak of a target roof. For example, a portable support or portable support assembly of this disclosure may accommodate dissimilar roof pitches on each side of a peak of a roof effective to hold or retain a load including, but not necessarily limited to one or more building materials, e.g., one or more bundles of roofing shingles, and/or other items on the peak of the roof in a fixed position.

In one embodiment, the disclosure comprises a system for transporting one or more building materials and/or other items onto roof peaks at one or more locations along the length of the roof peaks.

In one embodiment, the disclosure comprises one or more portable supports operationally configured to engage peaks of pitched roofs and hold or retain one or more building materials and/or other items on and/or adjacent the peaks on either side of the peaks of the roofs. In one embodiment, a portable support is operationally configured to be disposed across a peak of a roof regardless the pitch of the roof.

In one embodiment, the disclosure comprises a system including one or more portable platform assemblies for transporting one or more items, each portable platform assembly comprising a first member and one or more second members removable from the first member. Each portable platform assembly has a first set of fork pockets and a second set of fork pockets. The first set of fork pockets are operationally configured to receive fork tines and other elongated support members therein for transporting the portable platform assembly. The second set of fork pockets are operationally configured to receive fork tines and other elongated support members therein for transporting the one or more second members apart from the first member. In one embodiment, the one or more second members may include one or more portable supports operationally configured to contact a roof including a peak or ridge of a pitched roof and hold or retain one or more building materials and/or other items thereon.

In one embodiment, the disclosure comprises one or more portable supports operationally configured to engage ridge vents of roofs and hold or retain one or more building materials and/or other items on the peak of the roof and/or on one or both sides of the peak of the roof.

In one embodiment, the disclosure comprises one or more portable supports operationally configured to be set on each side of a ridge vent of a pitched roof and hold or retain one or more building materials and/or other items on the peak of the pitched roof and/or over the peak of the pitched roof and/or on one or both sides of the peak of the roof.

In one embodiment, the disclosure comprises one or more portable supports and/or one or more portable support assemblies operationally configured to support or otherwise hold one or more building materials and/or other items on a plurality of roof types including, but not necessarily limited to flat roofs, lean-to roofs, shed roofs, open gable roofs, box gable roofs, dutch gable roofs, clerestory roofs, hip roofs, cross-gable roofs, cross-hipped roofs, gambrel roofs, mansard roofs, saltbox roofs, and pyramid hip roofs regardless the length of a target roof peak for installing one or more portable supports and/or portable support assemblies.

One or more building materials of this disclosure may include, but are not necessarily limited to one or more bags of concrete, one or more bags of cement, boxed supplies and/or other stackable items, floor tile, wall tile, brick, stone, rebar, wall panels, metal panels, plastic panels, glass fiber panels, drywall, pipe, window glass, one or more roofing materials, fence panels, electric wire, carpet, flooring materials, and combinations thereof. Exemplary roofing materials may include, but are not necessarily limited to bundled roofing shingles, unbundled roofing shingles, wooden materials, metal materials, plastic materials, bricks, roof tiles, insulation, roof vent materials, drywall, fluid containers, rolled up materials, e.g., underlayment rolls, flashing, solar panels and related items, roof panels, solar panels, and combinations thereof. Herein, roofing shingles may include but are not necessarily limited to asphalt shingles, wooden shingles, clay shingles, metal shingles, slate shingles, and concrete shingles. Herein, asphalt shingles may include 3-Tab asphalt shingles and/or laminated architectural shingles commonly provided in plastic wrapping or paper wrapping as stackable bundles of roofing shingles. One non-limiting commercial source of bundled asphalt shingles includes CertainTeed Corporation, Malvern, Pa., U.S.A. Herein, wooden materials may include, but are not necessarily limited to wooden shakes, wooden shingles, lumber, plywood sheets, and combinations thereof. Herein, roof tiles may include, but are not necessarily limited to clay roof tiles, concrete tiles, slate roof tiles, and metal roof tiles. Herein, metal materials may include, but are not necessarily limited to metal roof tiles, metal shingles, metal gutters, metal flashing, metal paneling, metal framing materials, and combinations thereof. Herein, the phrases "bundles of roof shingles," "bundles of shingles," "bundled shingles," and "shingle bundles" may be used interchangeably.

In one embodiment, the disclosure comprises a system for transporting one or more building materials and/or other items to one or more target surfaces including one or more elevated surfaces, the system including (1) one or more portable supports and/or one or more portable support assemblies operationally configured to be placed on one or more target surfaces in a manner effective to hold building materials and/or other items on the one or more target surfaces and (2) one or more automated devices operationally configured to lift the one or more portable supports and/or the one or more portable support assemblies with one or building materials and unload the one or more portable supports and/or one or more portable support assemblies with the one or building materials onto the one or more target surfaces in a manner effective for the one or more portable supports and/or one or more portable support assemblies to hold the building materials on at least part of the one or more target surfaces for a desired period of time.

In one embodiment, the disclosure comprises a system for transporting one or more building materials and/or other items to one or more target non-planar surfaces. Target non-planar surfaces may include, but are not necessarily limited to curved surfaces, surfaces defined by angles, irregular shaped surfaces defined by holes, cavities, dimples and/or protuberances, projections, and combinations thereof. In one embodiment, the system includes at least one lifting device and at least one portable support or portable support assembly. In one embodiment, the system may include at least one lifting device and at least one portable platform assembly including at least one portable support or portable support assembly.

In one embodiment, the disclosure comprises a system for transporting one or more building materials and/or other items to one or more target surfaces comprising loose material, e.g., gravel, rocks, water, chemical fluids, debris, and combinations thereof.

In one embodiment, the disclosure comprises a system for transporting one or more building materials and/or other items to one or more target surfaces comprising loose material, e.g., gravel, rocks, debris, and combinations thereof. In one embodiment, the disclosure comprises a system for transporting one or more building materials and/or other items to one or more target surfaces comprising moisture, one or more bodies of water, liquid chemicals, wet paint, ice, and combinations thereof. In one embodiment, the disclosure comprises a system for transporting one or more building materials and/or other items to one or more target surfaces, the system including one or more portable supports operationally configured to be placed on one or more target surfaces at temperatures up to or about 93.3° C. (200.0° F.).

In one embodiment, the disclosure comprises a system for transporting a load of one or more items to ground level horizontal pipe and/or elevated horizontal pipe.

In one embodiment, the disclosure comprises a system for transporting a load of one or more items to elevated locations on a pole or the like, e.g., a top of a utility pole. In one embodiment, the disclosure comprises a system for transporting a load of one or more items to elevated locations on a tower or similar structure, e.g., a radio tower, a transmission tower or power tower.

In one embodiment, the disclosure comprises a system and method for transporting one or more building materials and/or other items to one or more target surfaces including one or more elevated surfaces without the need for working personnel and/or other individuals being located at or on the one or more target surfaces at the time that the one or more building materials and/or other items are placed on the one or more target surfaces. The system may include one or more portable supports and/or one or more portable support assemblies operationally configured to be placed on one or more target surfaces including one or more elevated surfaces with building materials and/or other items without working personnel and/or other individuals being located at or on the one or more target surfaces. The system may also include a lifting device operationally configured to hold and transport one or more building materials and/or other items onto one or more target surfaces without working personnel and/or other individuals being located at or on the one or more target surfaces. In one embodiment, a lifting device may deliver at least one portable support and/or at least one first portable support assembly and one or more building materials and/or other items to one or more target surfaces in a manner effective for the first portable support or first portable support assembly to act as a support spacer between a target surface and at least part of the one or more building materials and/or other items. In one embodiment, a lifting device of this disclosure may be communicated with the one or more building materials and/or other items and the one or more building materials and/or other items may be communicated with the one or more portable supports. In one embodiment, a lifting device of this disclosure may be communicated with one or more portable platform assemblies and the one or more portable platform assemblies may be communicated with one or more building materials and/or other items.

In one embodiment, the disclosure comprises a system and method for transporting one or more building materials and/or other items from one or more manufacturing locations to one or more target surfaces operable as a final destination for end use. The present disclosure also comprises a system and method for transporting one or more building materials at one or more points in the life of the one or more building materials from one or more manufacturing locations to one or more end user locations. Although, the one or more building materials may vary, in the discussion below one or more building materials are discussed in reference to one or more bundles of asphalt roofing shingles (hereafter "bundles of roofing shingles"). Accordingly, in one embodiment the present disclosure is directed to the transport of one or more bundles of roofing shingles from one or more manufacturing locations and/or one or more distributor locations to one or more end user locations comprising one or more target surfaces.

Referring to FIG. 1, one or more bundles of roofing shingles 99 are typically stacked on pallets 3 for transport from a manufacturing facility downstream to one or more distributor locations and/or commercial store locations for storage before eventually being transported to end user locations such as existing home locations and new home construction locations for installation. As understood by persons of ordinary skill in the art of pallets, pallets 3 configured to carry bundles of roofing shingles 99 are typically lifted and carried using fork lifts comprising fork tines operationally configured to load and unload pallets 3 on and off surfaces such as floor surfaces and platform trailers 4 as shown in FIG. 1. Manually operated pallet trucks are also commonly employed to transport pallets 3 carrying bundles of roofing shingles 99 in warehouse type settings and the like.

Figure 2:
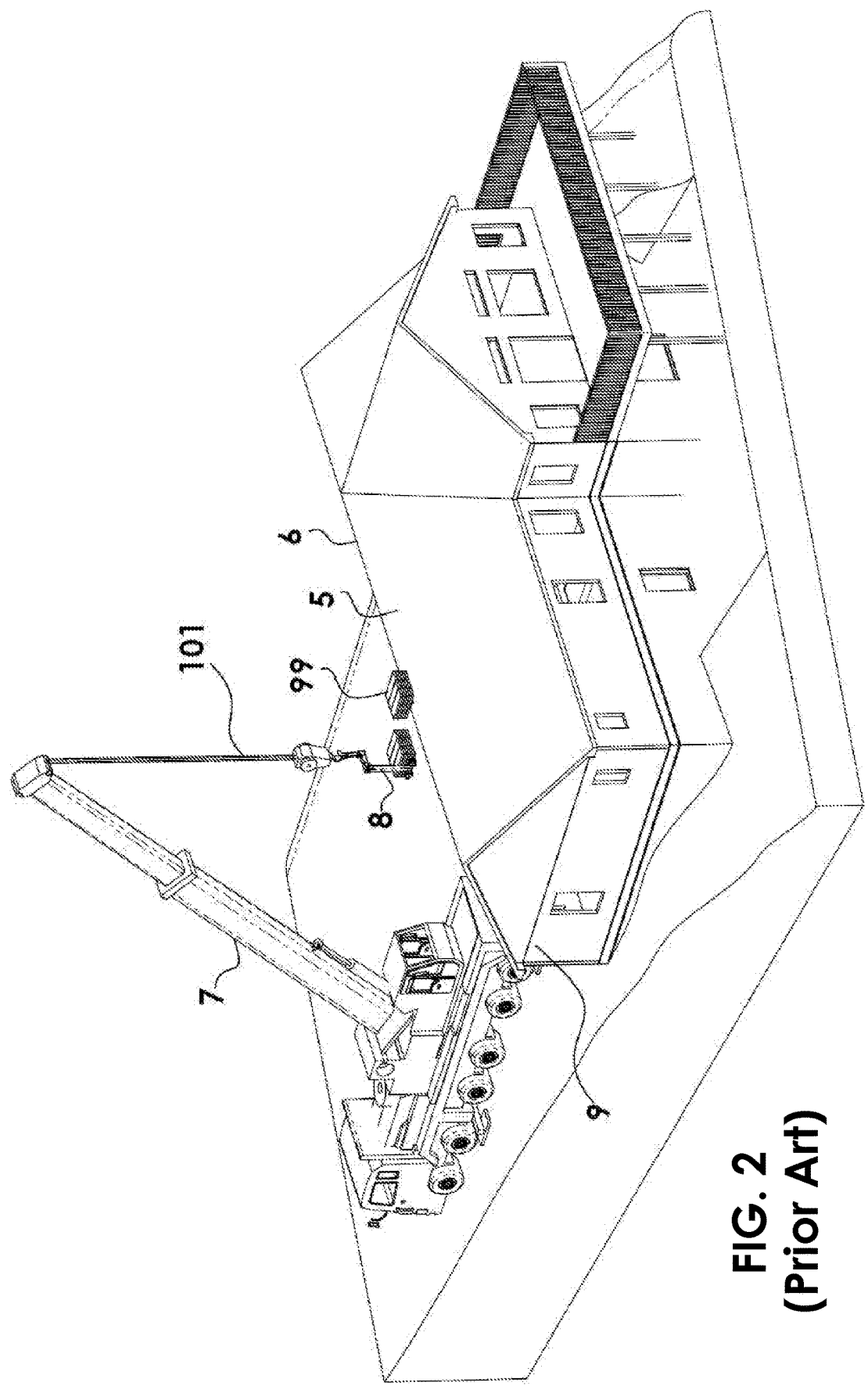
FIG. 2 is a perspective view of lifting equipment including a fork lift at a house location with bundles of roofing shingles stacked on the peak of the roof.

With reference to FIG. 2, once bundles of roofing shingles 99 reach an end user location such as a house or home 9 location via a platform trailer 4 or the like, lifting equipment 7 such as a truck mounted crane as shown or other type of lift or hoist comprising a crane fork or other fork lift 8 is used to lift one or more individual pallets 3 holding bundles of roofing shingles 99 off from a platform trailer 4 and direct the pallet 3 of bundles of roofing shingles 99 toward a target surface such as the roof 5 of the home 9 at a position whereby one or more persons located on the roof 5 manually remove each of the bundles of roofing shingles 99 from the pallet 3 and place the bundles of roofing shingles 99 on the roof 5 and/or on a ridge or peak 6 of a roof 5, e.g., place or stack the bundles of roofing shingles 99 on a peak 6 of a roof 5 lengthwise perpendicular to the peak 6 of a roof 5 as shown in FIG. 2. In another embodiment, lifting equipment may be used to transport one or more pallets 3 holding bundles of roofing shingles 99 from ground level toward a roof 5 of a home 9 for manual removal of the bundles of roofing shingles 99 from the pallet 3 onto a peak 6 of the roof 5. One non-limiting example of a lift or hoist system is described in U.S. Pat. No. 7,424,932 titled "Lifting Hoist Assembly" issued on Sep. 16, 2008, which is herein incorporated by reference in its entirety. In either scenario described above, one or more persons are required to be located on the roof 5 in order to manually remove the bundles of roofing shingles 99 from one or more pallets 3 and place the bundles of roofing shingles 99 on the peak 6 of a roof 5 as shown in FIG. 2. In contrast, the present disclosure comprises the transport of bundles of roofing shingles 99 onto roofs 5 including onto peaks 6 of roofs 5 without one or more persons being located on the roofs 5.

Figure 3:
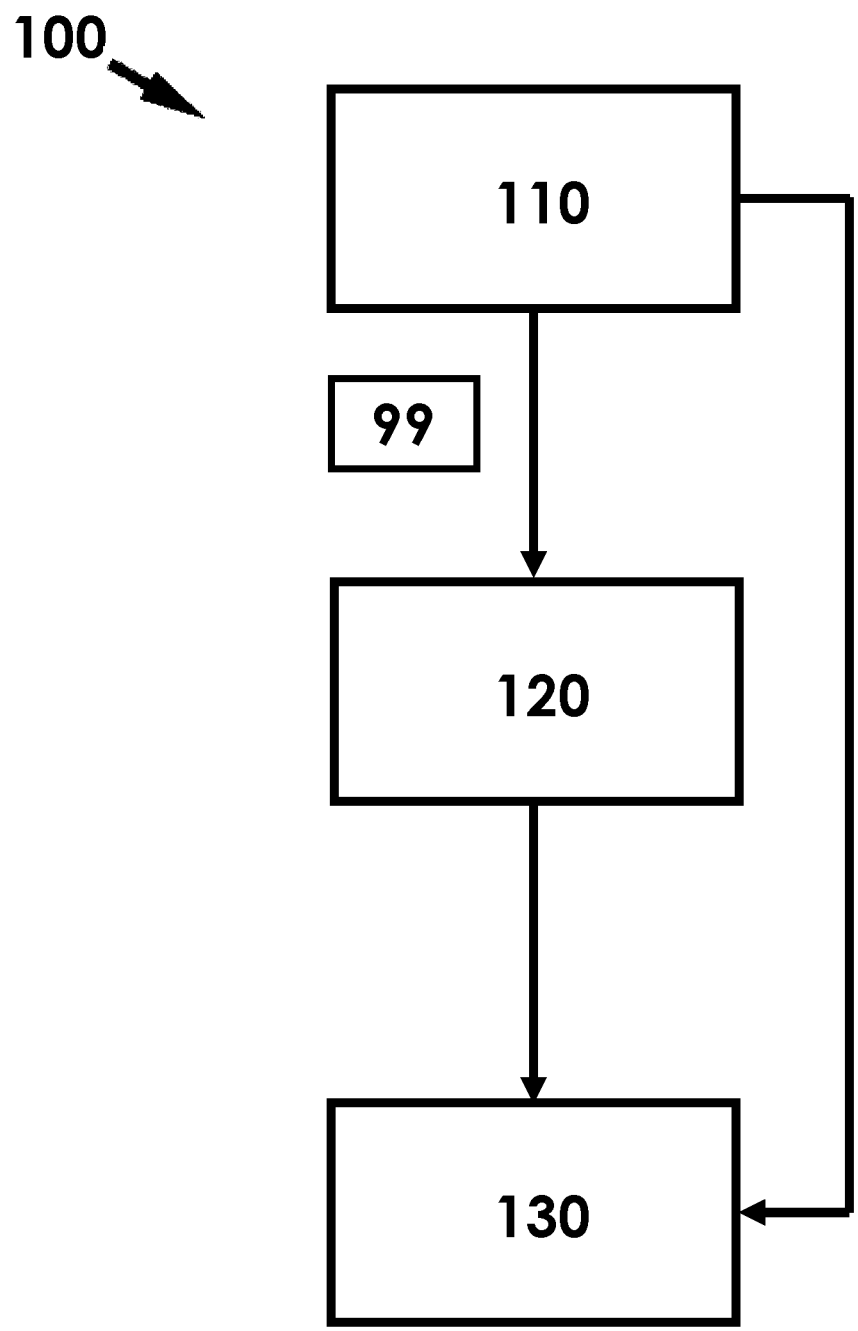
FIG. 3 is a flowchart of an embodiment of a system of the present disclosure.

With reference to FIG. 3, in one embodiment the present disclosure comprises a system 100 operationally configured to transport one or more building materials including one or more bundles of roofing shingles 99 from a point of manufacture 110 to (1) one or more storage facilities 120 such as secure lots or warehouse type structures, e.g., distributor locations and/or commercial store locations, and/or (2) one or more end user locations 130 such as a home 9 site or other roofed or covered structure. The present system 100 is advantageous in that one or more bundles of roofing shingles 99 may be placed onto roofs 5 including onto peaks 6 of roofs 5 without the use of manual labor. In other words, the present system 100 is operationally configured to deliver bundles of roofing shingles 99 onto roofs 5 including the peaks 6 of roofs 5 without persons being located on the roofs 5 at the time the one or more bundles of roofing shingles 99 are placed on the one or more roofs 5.

As described above, a common mode of transporting pallets 3 carrying one or more bundles of roofing shingles 99 includes commercial vehicles such as tractor trailers including, but not necessarily limited to a platform trailers 4 (or "flatbed" trailers). Other modes of transportation of the system 100 include, but are not necessarily limited to (1) air transport, e.g., cargo planes, (2) rail transport, e.g., flat cars, (3) passenger truck transport, e.g., pickup trucks, (4) marine transport, e.g., cargo ships, one or more of which may be used in combination including in combination with one or more tractor trailers for purposes of delivering one or more bundles of roofing shingles 99 to one or more end user locations 130. The modes of transportation described herein typically comprise horizontally aligned planar type support surfaces for holding pallets 3 and other items.

Figure 4:
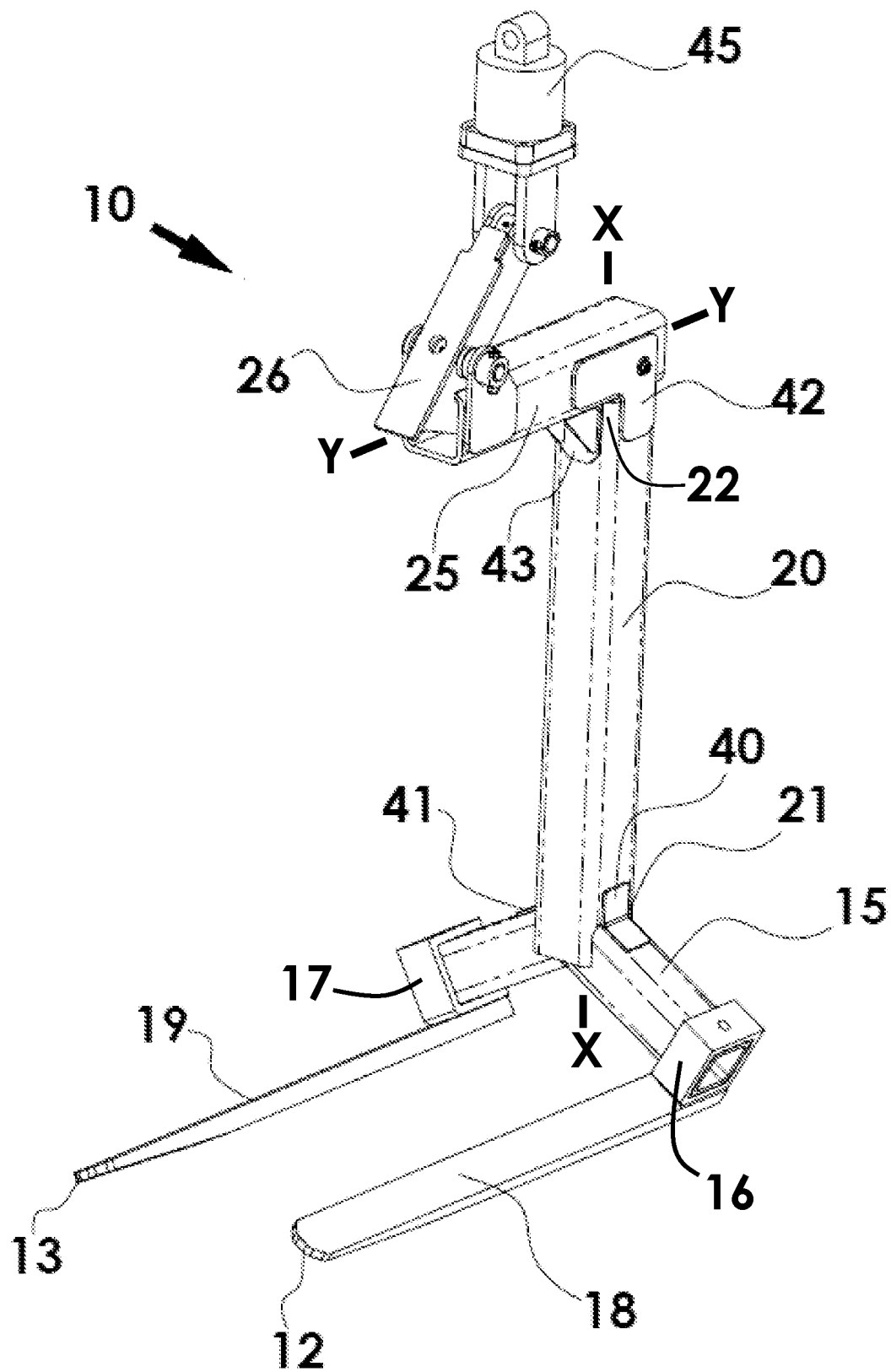
FIG. 4 is a front perspective view of an embodiment of a lifting device of the present disclosure.

Turning to FIG. 4, in one embodiment a system 100 of this disclosure may comprise a lifting device 10 operationally configured to be hoisted by lifting equipment such as a truck mounted crane 7 or other type of lift (hereafter "lifting equipment 7") in space in any direction as desired along a X, Y and Z axis. As described below, a lifting device 10 of this disclosure is operationally configured to carry one or more bundles of roofing shingles 99 and unload the one or more bundles of roofing shingles 99 on one or more target surfaces 5 including flat roofs 5, inclined roofs 5 and pitched roofs 5. In one embodiment, a lifting device 10 of this disclosure is operationally configured to remove one or more bundles of roofing shingles 99 from a platform trailer 4 or other surface and place the one or more bundles of roofing shingles 99 on a roof 5 including a peak 6 of a roof 5 as shown in FIG. 2. As understood by persons of ordinary skill in the art of construction, additional lifting equipment 7 may be provided to make use of a plurality of lifting devices 10 for one or more particular operations.

Suitably, a lifting device 10 of this disclosure includes a frame or frame assembly operationally configured to be attached to lifting equipment 7 in a manner effective to operate the lifting device 10. As shown in FIG. 4, in one embodiment the frame of the lifting device 10 may include a base section (hereafter "first frame section 15"), an elongated vertical intermediate section defined by a longitudinal centerline X-X (hereafter "second frame section 20") and an elongated upper section defined by a longitudinal centerline Y-Y (hereafter "third frame section 25"). As shown, the first frame section 15 of this embodiment is disposed along an X-axis, the second frame section 20 is disposed along a Y-axis and the third frame section 25 is disposed along a Z-axis.

In one embodiment, a lifting device 10 may be provided as a one-piece member wherein a first frame section 15 extends out in a lateral direction from each side of a proximal end 21 of a second frame section 20 and a third frame section 25 extends out in a forward direction from a distal end 22 of the second frame section 20. In another embodiment, a lifting device 10 may be provided as an assembly wherein a first frame section 15 is permanently attached to a proximal end 21 of a second frame section 20 and a third frame section 25 is permanently attached to a distal end 22 of the second frame section 20. In an embodiment where a lifting device 10 is constructed from one or more metals, the first frame section 15 and the third frame section 25 may be welded to the second frame section 20. As shown in FIG. 4, a lifting device 10 may also include one or more stiffener members such as gusset plates or the like, e.g., steel gusset plates, operationally configured to reinforce the welded connections between the second frame section 20 and the first and third frame sections 15 and 25 (see stiffener members 40 and 41 welded to the first frame section 15 and the second frame section 20 and stiffener members 42 and 43 welded to the second frame section 20 and the third frame section 25).

In another embodiment, a first frame section 15 and/or a third frame section 25 of a lifting device 10 may be releasably attached to a second frame section 20 via one or more fasteners, e.g., threaded fasteners, pin connections, and combinations thereof. In an embodiment including threaded fasteners such as threaded bolts the proximal end 21 and the distal end 22 of a second frame section 20 may include threaded holes operationally configured to receive threaded bolts therein to secure a first frame section 15 and/or a third frame section 25 to the second frame section 20. In another embodiment, a first frame section 15 and/or a third frame section 25 may be attached to a second frame section 20 via one or more adhesives, welds, fasteners, and combinations thereof.

As shown in FIG. 4, the third frame section 25 of the lifting device 10 extends out from an attachment point with the distal end 22 of the second frame section 20 forming an angle—shown in this embodiment as forming a ninety (90.0) degree angle with the second frame section 20. In another embodiment, the angle formed may be greater than or less than ninety degrees. In the embodiment of FIG. 4, the distal end 22 of the second frame section 20 acts as a support surface or seat for the third frame section 25 wherein the surface configuration of the distal end 22 may establish the angle of the third frame section 25 in relation to the second frame section 20. As described below, a third frame section 25 of a lifting device 10 suitably extends out from the distal end 22 of the second frame section 20 a distance effective to maintain the lifting device 10 in a level or substantially level position during operation.

Figure 5:
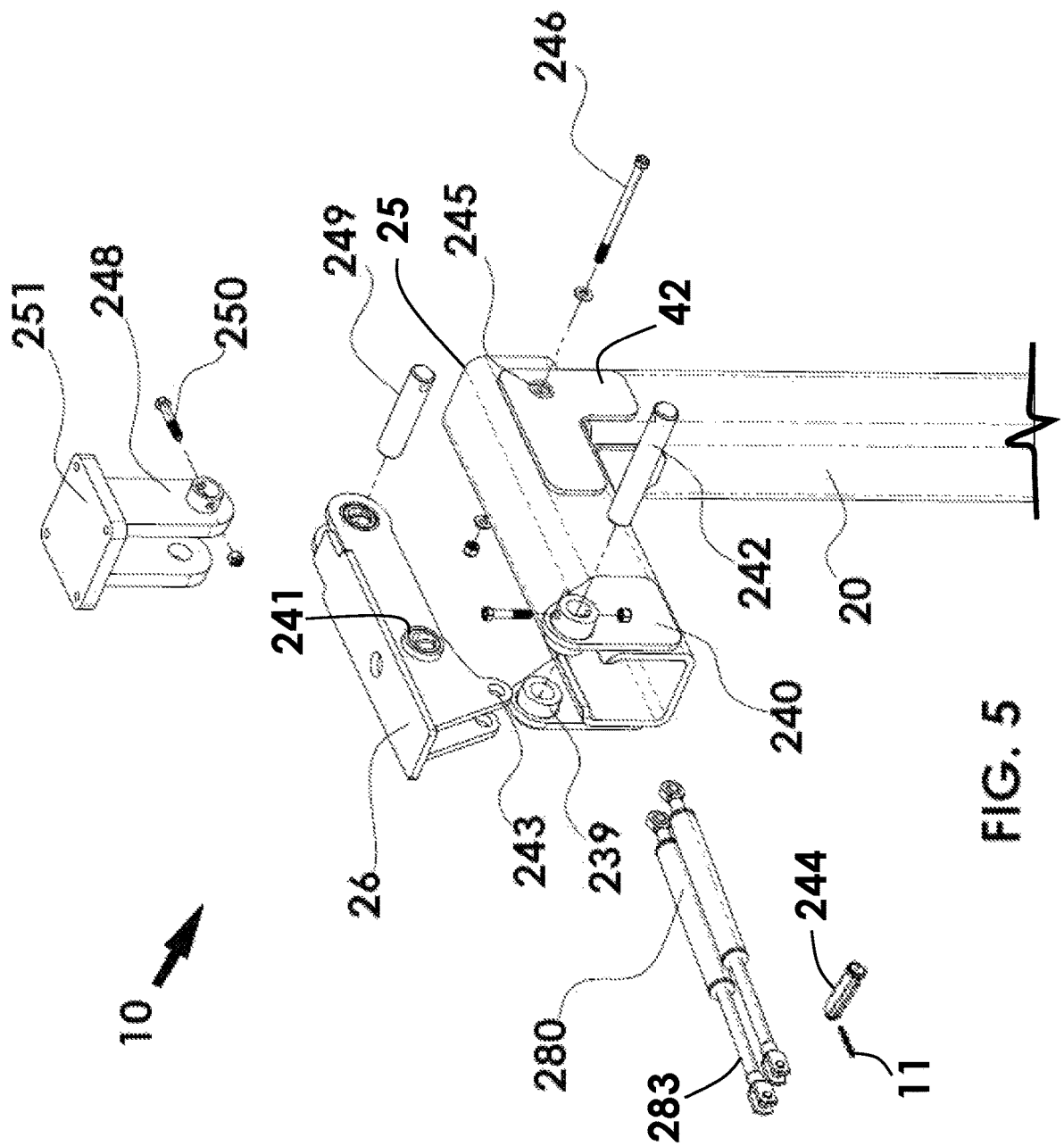
FIG. 5 is a front perspective view of part of the lifting device of FIG. 4.
Figure 7:
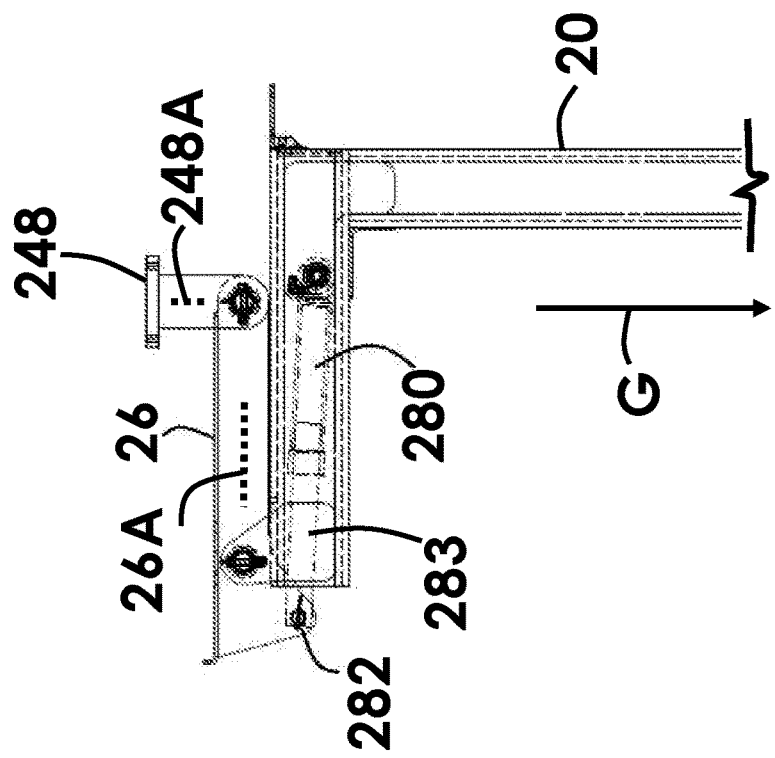
FIG. 7 is a side phantom view of part of the lifting device of FIG. 4.
Figure 6:
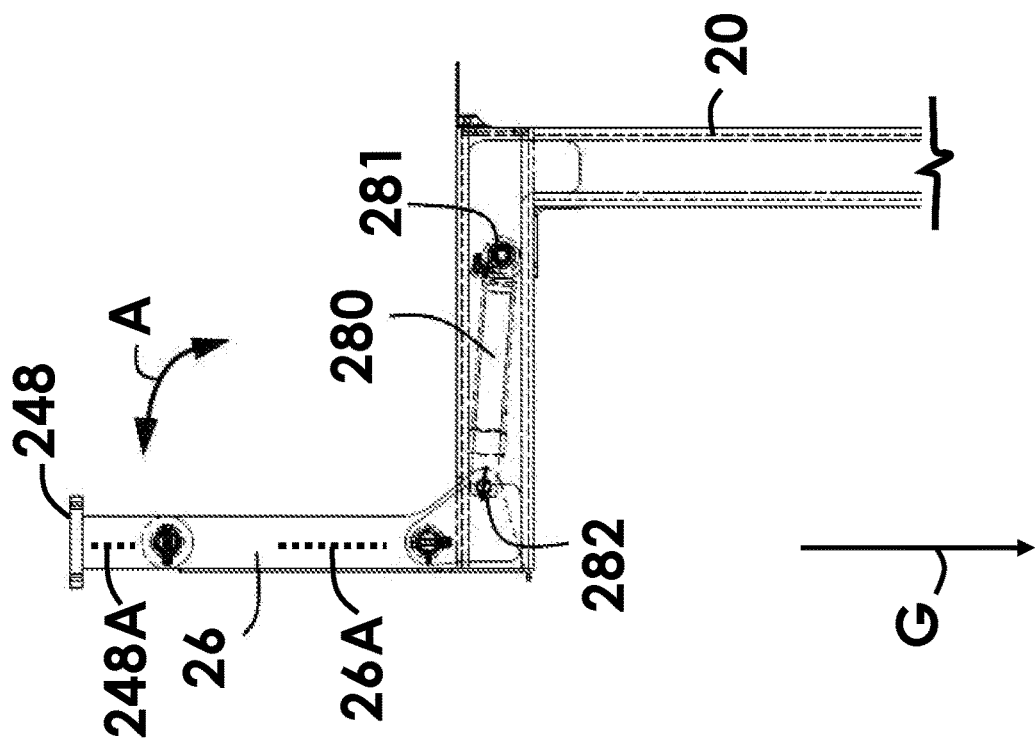
FIG. 6 is a side phantom view of part of the lifting device of FIG. 4.

Referring to FIGS. 5-7, a third frame section 25 may be provided as part of a leveling assembly of a lifting device 10 operationally configured as a connector to communicate the lifting device 10 with a lift line 101 of lifting equipment 7 for directing the lifting device 10 in space to one or more locations in a desired orientation. Suitably, a leveling assembly of the lifting device 10 is also operationally configured to maintain the second frame section 20 in a vertical or substantially vertical alignment with the earth's gravitational vector during operation. In addition to the third frame section 25, a leveling assembly of the lifting device 10 includes a leveling arm member 26 pivotally attached to the third frame section 25, one or more linear actuators 280 operationally configured to rotate the leveling arm member 26 toward and away from the third frame section 25 and a lift attachment member or crane mount 248 pivotally attached to the leveling arm member 26 via a pin 249 and fastener 250, e.g., a bolt or the like. In this embodiment, the third frame section 25 may be provided as a hollow or partially hollow member for receiving one or more linear actuators 280 therein. In addition, the distal end of the third frame section 25 includes a space or open area operationally configured to receive a proximal end of the leveling arm member 26 whereby the one or more linear actuators 280 are operationally configured to direct the leveling arm member 26 between a fully extended position as shown in FIG. 6 and a fully contracted position as shown in FIG. 7 (see arrow A in FIG. 6).

Suitably, the third frame section 25, the leveling arm member 26 and the one or more linear actuators 280 are operably connected via fasteners and corresponding apertures for receiving the apertures there through. In this embodiment, the leveling arm member 26 may be provided as a four-sided hollow member or as an open three-sided member with a proximal end configured to include linkage geometry operationally configured to rotate the leveling arm member 26 according to arrow A when the leveling arm member 26 is acted on by the one or more linear actuators 280. For example, as shown in FIG. 5 the distal end of the third frame section 25 includes opposing apertures 239 provided via mounting plates 240 secured to the third frame member 25, e.g., via welds and/or fasteners, the opposing apertures 239 corresponding to a first set of apertures 241 of the leveling arm member 26 for receiving a pivot pin 242 there through in a manner effective for the leveling arm member 26 to be directed according to arrow A. The leveling arm member 26 also includes a second set of apertures 243 for receiving a fastener such as pin 244 there through for securing the one or more linear actuators 280 to the leveling arm member 26—the pin 244 being secured during operation via a cotter pin 11 or the like. In addition, the third frame member 25 also includes opposing apertures 245 provided via the opposing stiffener members 42 for receiving a fastener such as pin 246 there through in a manner effective to secure the one or more linear actuators 280 to the third frame member 25.

With further reference to FIGS. 5-7, each of the one or more linear actuators 280 may comprise a single acting hydraulic cylinder or a double acting hydraulic cylinder as shown in which a bore at a tail end of each double acting hydraulic cylinder is secured to the third frame section 25 at attachment point 281 via pin 246 and a distal end of a drive rod 283 of each double acting hydraulic cylinder is pivotally attached to the leveling arm member 26 at attachment point 282 via pin 244. Suitably, linear movement of the drive rods 283 of the one or more linear actuators 280 translates to rotational motion of the leveling arm member 26. For example, linear movement of the drive rods 283 in a retracted direction, or to a retracted position, causes hydraulic fluid, e.g., oil, to pressurize within each of the double acting hydraulic cylinders. As understood by the skilled artisan, a hydraulic relief valve may be positioned in line with a hydraulic fluid port of each hydraulic cylinder 280 that is operationally configured to trap the hydraulic fluid and allow the fluid pressure to build inside each hydraulic cylinder 280. As also understood by the skilled artisan, hydraulic fluid is not compressible, as such, the hydraulic fluid acts like a solid and the drive rod 283 of each hydraulic cylinder 280 cannot move in a retracted direction any further until the pressure within each hydraulic cylinder 280 builds high enough to open a corresponding hydraulic relief valve. Once the corresponding hydraulic relief valve opens, the hydraulic fluid exits a base part of each hydraulic cylinder 280 thereby directing each drive rod 283 in a retracted direction allowing the leveling arm member 26 to rotate until the lifting device 10 reaches a level position.

Once a level position of the lifting device 10 is realized, the hydraulic relief valve pressure setting is equal or substantially equal to the pressure within each hydraulic cylinder 280 whereby the hydraulic relief valve may be directed to a closed position. When the lifting device 10 is carrying a load, e.g., carrying up to or about eighteen bundles of shingles 99 or a weight up to or about 693.99 kg (1530.0 pounds), a level position of the lifting device 10 is realized when the leveling arm member 26 is in a vertical position or near vertical position whereby the longitudinal center line 26A of the leveling arm member 26 and the longitudinal center line 248A of the crane mount 248 are in linear alignment with the center of gravity (arrow G) of the lifting device 10 as shown in FIG. 6.

As the one or more bundles of shingles 99 are removed from the lifting device 10, the center of gravity (arrow G) of the lifting device 10 may change thereby directing the lifting device 10 to a non-level position. As such, during removal of one or more bundles of shingles 99 an operator of the lifting device 10 may pressurize each hydraulic cylinder 280 via controls, e.g., a joystick, which directs each drive rod 283 of the hydraulic cylinder 280 in an extended direction. In particular, as the volume of hydraulic fluid within each hydraulic cylinder 280 increases, i.e., as the fluid pressure within each hydraulic cylinder 280 increases, each drive rod 283 is directed linearly in an extended direction and directs the leveling arm member 26 toward the third frame section 25 to a desired contracted position. As shown in FIG. 7, when the lifting device 10 is empty or unladen the center of gravity (arrow G) of the lifting device 10 moves toward the second frame section 20. To maintain the lifting device 10 in a level position the leveling arm member 26 is suitably directed to a parallel or substantially parallel position with respect to the third frame section 25 whereby the longitudinal center line 248A of the crane mount 248 is in linear alignment with the center of gravity (arrow G) of the lifting device 10. As stated above, leveling of the lifting device 10 is suitably operator controlled, however, if the lifting device 10 is directed beyond its level position, the natural effect of the fluid pressure in each hydraulic cylinder 280 and the setting of the hydraulic relief valve are operationally configured to take effect to suspend the lifting device 10 from the lift line 5 in a level or substantially level position.

In another embodiment, a lifting device 10 of this disclosure may be operationally configured without a hydraulic relief valve, relying instead on fluid communication with a pressure relief valve provided as part of a hydraulic system of the lifting equipment 7. Typically, a hydraulic system of the lifting equipment 7 is set to a pressure level higher than required for self-leveling of a lifting device 10, thereby acting as a protection or safety system for the lifting device 10. For example, in an embodiment wherein the one or more linear actuators 280 comprise one or more double acting hydraulic cylinders in fluid communication with an auxiliary hydraulic circuit of lifting equipment 7, an operator of the lifting equipment 7 and lifting device 10 may apply hydraulic pressure to either a rod side or a base side of the one or more linear actuators 280 to operate the one or more linear actuators 280. Similar as shown in FIGS. 6 and 7, in this embodiment a drive rod 283 of each double acting hydraulic cylinder is pivotally attached to the leveling arm member 26 at an attachment point 282, when hydraulic pressure is applied to a rod side of the one or more linear actuators 280, the drive rod 283 of each of the one or more linear actuators 280 is directed in a retracted direction causing the lifting device 10 to rotate in a clockwise direction (see arrow B in FIG. 13). Likewise, when hydraulic pressure is applied to a base side of the one or more linear actuators 280, which is secured to the third frame section 25 at attachment point 281, a drive rod 283 of each of the one or more linear actuators 280 is directed in an extended direction causing the lifting device 10 to rotate in a counterclockwise direction (see arrow C in FIG. 13). In this embodiment, the ability to apply hydraulic pressure to one or more linear actuators 280 suitably enables an operator to orient a lifting device 10 in a level position and one or more angled positions. For example, one or more angled positions of a lifting device 10 may be suitable for mating with one or more pallets 3 located on uneven surfaces and/or angled surfaces.

A lifting device 10 of this disclosure may include a hydraulic control valve 85 comprising one or more hydraulic fluid inlet ports or fluid connections for receiving one or more hydraulic fluid lines, e.g., a flexible hydraulic hose or combination of flexible hose and non-flexible hydraulic tubing, typically associated with an auxiliary function of lifting equipment 7. For example, commercially available lifting equipment 7 such as a truck mounted hydraulic crane are typically equipped with one or more auxiliary hydraulic systems including control circuitry, a main control valve, and hydraulic fluid lines fluidly communicating the main control valve with a rotation mechanism 45, e.g., a hydraulic rotator unit, hanging from or otherwise attached at a distal end of a boom of crane type lifting equipment 7. A typical auxiliary hydraulic system includes a supply line, e.g., a pressure hose, conveying pressurized fluid to a hydraulic rotator unit and a return line, e.g., a pressure hose, for conveying the hydraulic fluid back to the main control valve of the lifting equipment 7. For purposes of the present disclosure, the supply line may be disconnected from the hydraulic rotator unit and connected, possibly with extension hoses, to an inlet or pressure port located on the hydraulic control valve 85. Likewise, the return line may be disconnected from the hydraulic rotator unit and connected to a return port of the hydraulic control valve 85 of the lifting device 10.

Suitably, the lifting device 10 includes individual hydraulic fluid lines (not shown) fluidly communicating the hydraulic control valve 85 with each of the one or more linear actuators 280, e.g., one or more hydraulic cylinders. In one embodiment, the hydraulic control valve 85 may include individual fluid ports corresponding to each of the one or more linear actuators 280 wherein a first end of each hydraulic fluid line is fluidly connected to a particular fluid port of the hydraulic control valve 85 and a second end of each hydraulic fluid line is fluidly connected to a port on a particular linear actuator 280. Exemplary hydraulic fluid lines include, but are not necessarily limited to hydraulic hoses, hydraulic tubes, and combinations thereof. In one embodiment, a spool inside the hydraulic control valve 85 is operationally configured to shift by way of an electrical signal. The electrical signal suitably originates from the lifting equipment 7 via remote control. Some lifting equipment 7 remote controls, e.g., Hiab XS Drive, may be operationally configured to control additional functions beyond just the lifting equipment 7 itself. In one embodiment, remote control of the lifting equipment 7 may be set to a secondary control mode, whereby an operator may use the lifting equipment 7 remote control to remotely control the lifting device 10. For example, a wireless signal may be sent from the lifting equipment 7 remote control, e.g., a transmitter, to a receiver located on the apparatus 10. The receiver (not shown) sends the received signals to a valve driver or valve control module, i.e., an electronic device that sends control signals to each work section of hydraulic control valve 85. In operation, the hydraulic control valve 85 receives an electrical signal and shifts the spool to deliver fluid pressure to the appropriate work port for desired operation of the lifting device 10.

Figure 8:
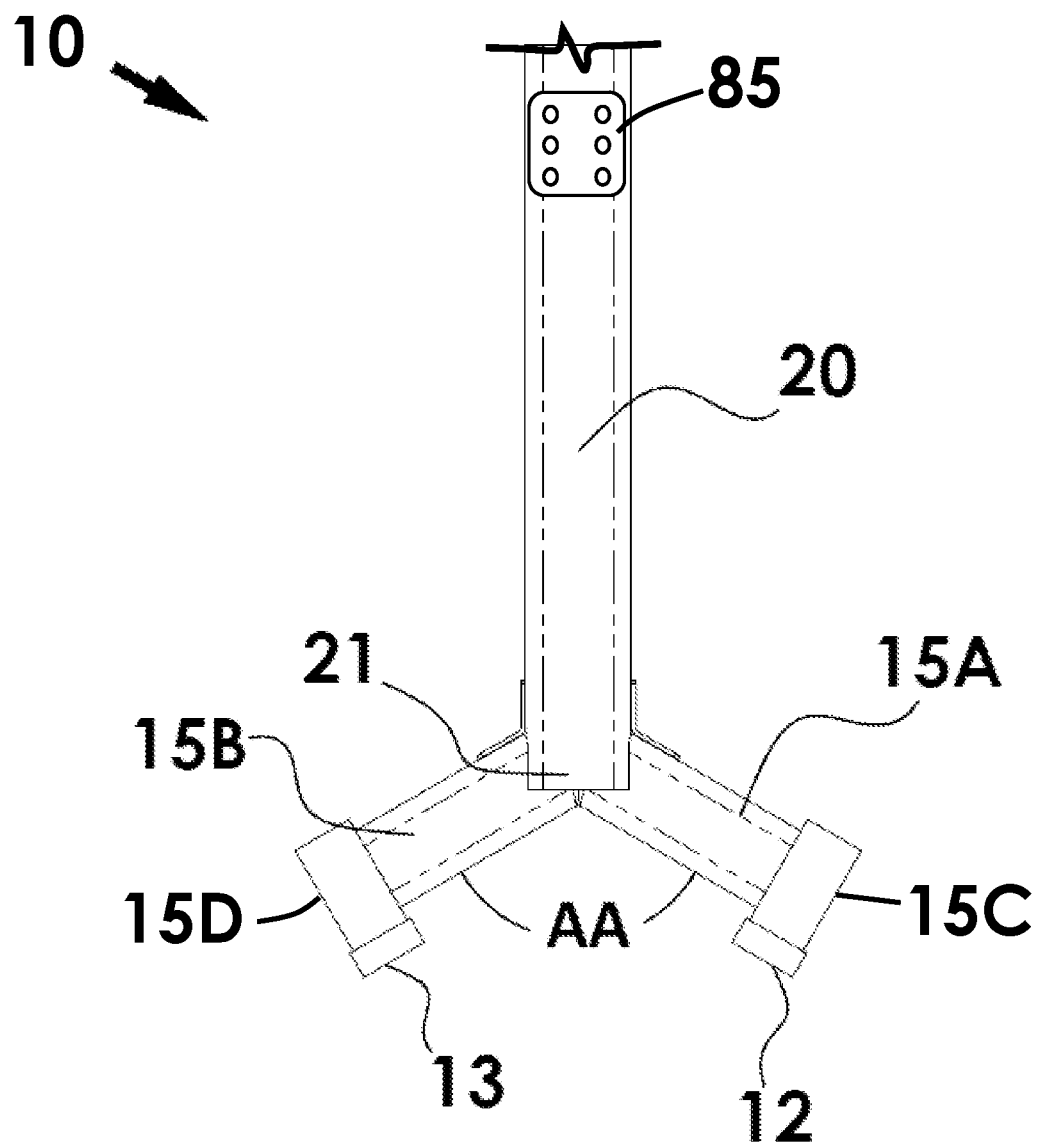
FIG. 8 is a front view of part of another embodiment of a lifting device of the present disclosure.

As shown in FIG. 8, a hydraulic control valve 85 may be located on a front side of the second frame section 20. In another embodiment, a hydraulic control valve 85 may be located on a different part of a lifting device 10. One suitable hydraulic control valve 85 may include an L90LS mobile valve commercially available from Parker Hannifin Corporation, Cleveland, Ohio, U.S.A.

In one suitable embodiment, each hydraulic fluid line may include first and second ends with connectors operationally configured to provide sealed fluid connections between the hydraulic fluid lines and the ports of the hydraulic control valve 85 and the one or more linear actuators 280. Suitable connectors include, but are not necessarily limited to thirty-seven degree flare fittings, O-ring straight thread fittings, pipe thread fittings, split flange fittings, crimps, clamps, or other connectors operationally configured for high pressure hydraulic and/or pneumatic use.

In another embodiment, the one or more linear actuators 280 may include one or more linear spring members including, but not necessarily limited to one or more pneumatic cylinders, spring cylinders, or coil springs. In an embodiment of a lifting device 10 employing pneumatic cylinders, a control valve 85 may be provided as a pneumatic control valve.

In one embodiment a linear actuator 280 including a linear spring member may be secured to the third frame section 25 at attachment point 281 via pin 246 and a distal end of the linear spring member may be pivotally attached to the leveling arm member 26 at attachment point 282 via pin 244. In this embodiment, linear movement of a drive rod of a linear spring member translates to rotational motion of the leveling arm member 26. For example, when a drive rod of a linear spring member is directed to a retracted position, the leveling arm member 26 is directed rotationally away from the third frame member 25 to a vertical position perpendicular with respect to the third frame member 25 and when a drive rod of a linear spring member is directed toward an extended position, the leveling arm member 26 is directed rotationally toward the third frame member 25 whereby the leveling arm member 26 may be directed to a parallel or substantially parallel position with respect to the third frame section 25. In an extended position, the force provided by the linear spring member 280 is effective to hold the leveling arm member 26 in a fixed position while the lifting device 10 is lifted and/or transported in space, simultaneously maintaining alignment of the second frame section 20 vertically with the center of gravity—enabling an empty or unladen lifting device 10 to be lifted in a level position. When the lifting device 10 is carrying a load in space, e.g., carrying up to or about eighteen bundles of shingles 99 or a weight up to or about 693.99 kg (1530.0 pounds), the spring member 280 will fully or completely retract directing the leveling arm member 26 to a vertical position, enabling the lifting device 10 to remain level as the lifting device 10 is lifted and/or transported in space.

With further reference to FIG. 5, the crane mount 248 includes a connection bracket 251 operationally configured to be fastened to a rotation mechanism 45 such as a hydraulic rotator unit, electro-mechanical rotation unit, pneumatic rotation unit, or combination thereof of lifting equipment 7 (see FIG. 4). In one embodiment, the crane mount 248 may be fastened to a rotation mechanism 45 via fasteners including, but not necessarily limited to bolt/nut fasteners, locking pins, and combinations thereof. In another embodiment, a different type of connection may be employed for connecting a crane mount 248 to a rotation mechanism 45, e.g., a quick coupler. In another embodiment, a quick coupler or the like may be used in place of a crane mount 248 for attaching a lifting device 10 to a rotation mechanism 45 or other part of lifting equipment 7.

Referring again to FIG. 4, the lifting device 10 includes one or more elongated support members 12 and 13 extending out from the first frame section 15 in parallel or substantially parallel alignment on opposite sides of the second frame section 20. In this embodiment, the one or more support members 12 and 13 may be provided as fork tines or the like with upper support surfaces 18 and 19 operationally configured to contact and hold one or more items in a manner effective to lift and transport the one or more items onto one or more target surfaces 5 including, but not necessarily limited to one or more elevated target surfaces as described above. Similar as fork tines provided as part of a fork lift or crane fork 8, the one or more support members 12 and 13 of the lifting device 10 may be operationally configured to engage and/or hold and/or carry one or more portable support devices. Exemplary portable support devices may include, but are not necessarily limited to one or more pallets, skids, crates, cartons, baskets, cages, racks, trays, boxes, and the like. As understood by the skilled artisan, a pallet is characterized by a top deck portion and a bottom deck for structural support and a skid is characterized by a single-deck without a bottom deck. Non-limiting examples of pallets may include two-way pallets and four-way pallets as such terms are known in the art. Exemplary two-way pallet styles may include (1) reversible pallets, (2) closed boarded, no base board pallets, and (3) wing type pallets. Exemplary four-way pallets may include (1) close boarded, three base pallets, (2) perimeter base pallets, (3) wing type pallets, (4) close boarded, perimeter base pallets, and (5) open boarded, three base pallets. Another exemplary pallet may include a EUR pallet as such term is understood by the skilled artisan. Commercially available pallets and skids may be constructed from materials including, but not necessarily limited to one or more woods, one or more pressed woods, one or more plastics, one or more rubbers, one or more metals, one or more cardboard materials, one or more composite materials, and combinations thereof.

As depicted in FIG. 8, the first frame section 15 and the second frame section 20 of the lifting device 10 of FIG. 4 may form an inverted Y-shape configuration wherein the first frame section 15 includes opposing legs 15A and 15B that descend out laterally from each side of a proximal end 21 of the second frame section 20 forming angle AA of the first frame section 15 as shown. In this embodiment, angle AA may vary from or about 20.0 degrees to or about 140.0 degrees in a manner effective for at least part of the distal ends 15C and 15D of the opposing legs 15A and 15B to descend or otherwise be located at an elevation lower than the proximal end 21 of the second frame section 20 as shown in FIG. 8. In the embodiment of FIG. 4 and FIG. 8, the legs 15A and 15B of the first frame section 15 form an angle AA of or about 45.0 degrees. Although the angle formed by the legs 15A and 15B and the length of the legs 15A and 15B may vary, when targeting steep roofs 5, e.g., 4/12-12/12, the legs 15A and 15B suitably descend from the proximal end 21 of the second frame section 20 to a point whereby the distal ends 15C and 15D of the opposing legs 15A and 15B and the support members 12 and 13 attached to the legs 15A and 15B are located at an elevation less than a peak 6 of a target pitched roof 5 during operation of the lifting device 10 when delivering one or more bundles of shingles 99 as discussed below (see distance D in FIG. 9, which represents the difference in elevation between the bottommost part of the support members 12 and 13 and the peak 6 of the target pitched roof 5 when the lifting device 10 of this embodiment is oriented in a maximum unloading position relative the roof 5). In regard to pitched roofs 5, a maximum unloading position of a lifting device 10 may include a contact position between a midpoint of a first frame section 15 and a peak 6 of a roof 5, or a contact position between a midpoint of a proximal end of a second frame section 20 and a peak 6 of a roof 5 in an embodiment where a proximal end 21 of a second frame section 20 extends below a midpoint of a corresponding first frame section 15. A maximum unloading position of a lifting device 10 may also include a non-contact position wherein the midpoint of the first frame section 15 is positioned an operable distance near a peak 6 of a roof 5, or in another embodiment, where a midpoint of a proximal end of a second frame section 20 is positioned an operable distance near a peak 6 of a roof 5 for purposes of unloading one or more items from the lifting device 10 onto the roof 5. Herein, an operable distance for a target pitched roof 5 may be determined according to (1) the length of each of the opposing legs 15A and 15B of a first frame section 15, (2) the angle AA formed by the opposing legs 15A and 15B, (3) the pitch of a target pitched roof 5, and combinations thereof. Without limiting the disclosure, an operable distance for a lifting device 10 of this disclosure in regard to pitched roofs 5 up to a pitch of 12/12 may range from a contact position with a peak 6 of a roof 5 as described above up to or about 91.44 cm (36.0 inches) vertically apart from a peak or ridge 5 of a roof 5.

Figure 9:
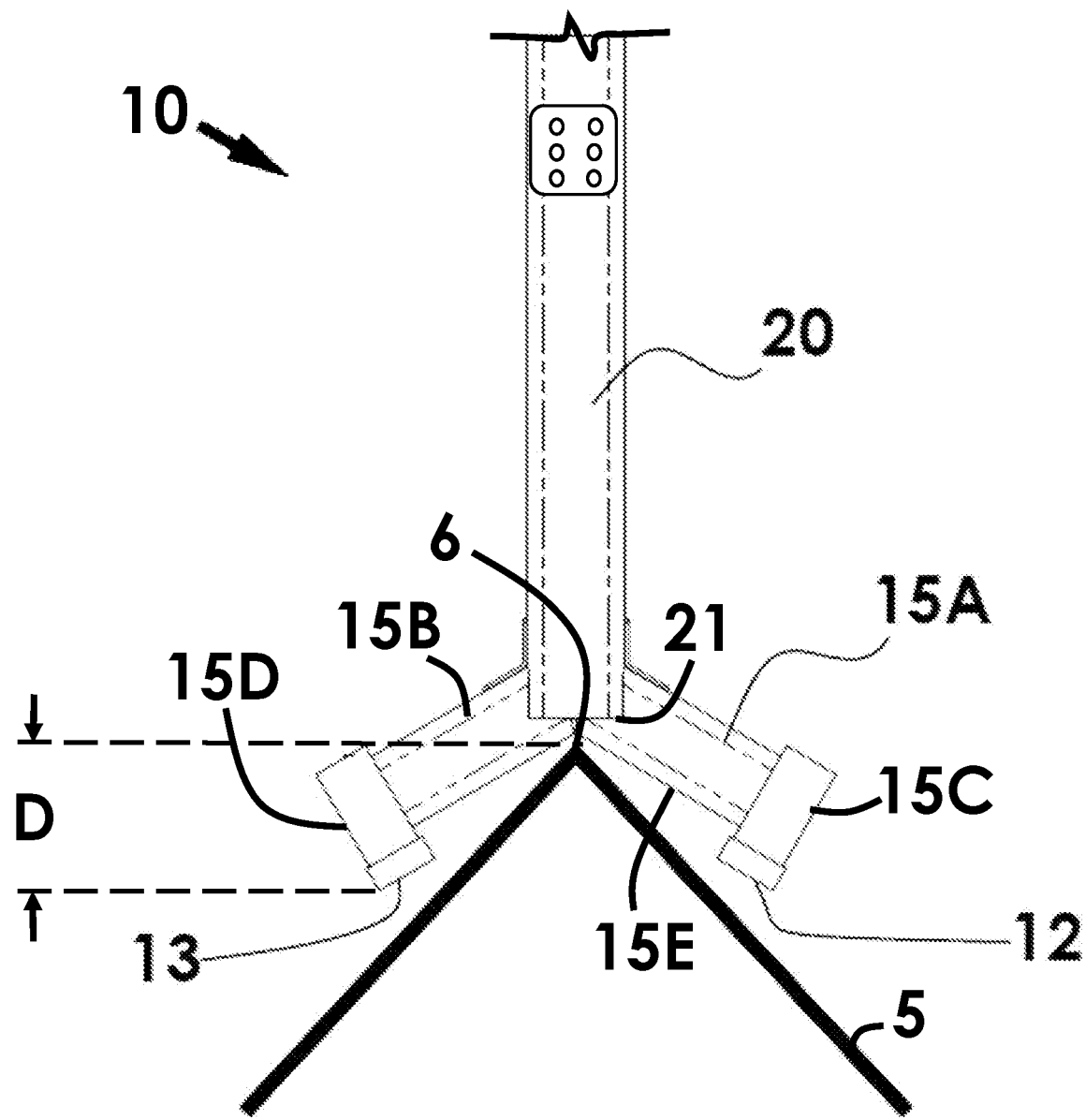
FIG. 9 is a front view of the part of the lifting device of FIG. 8 located near a peak or ridge of a roof.
Figure 10:
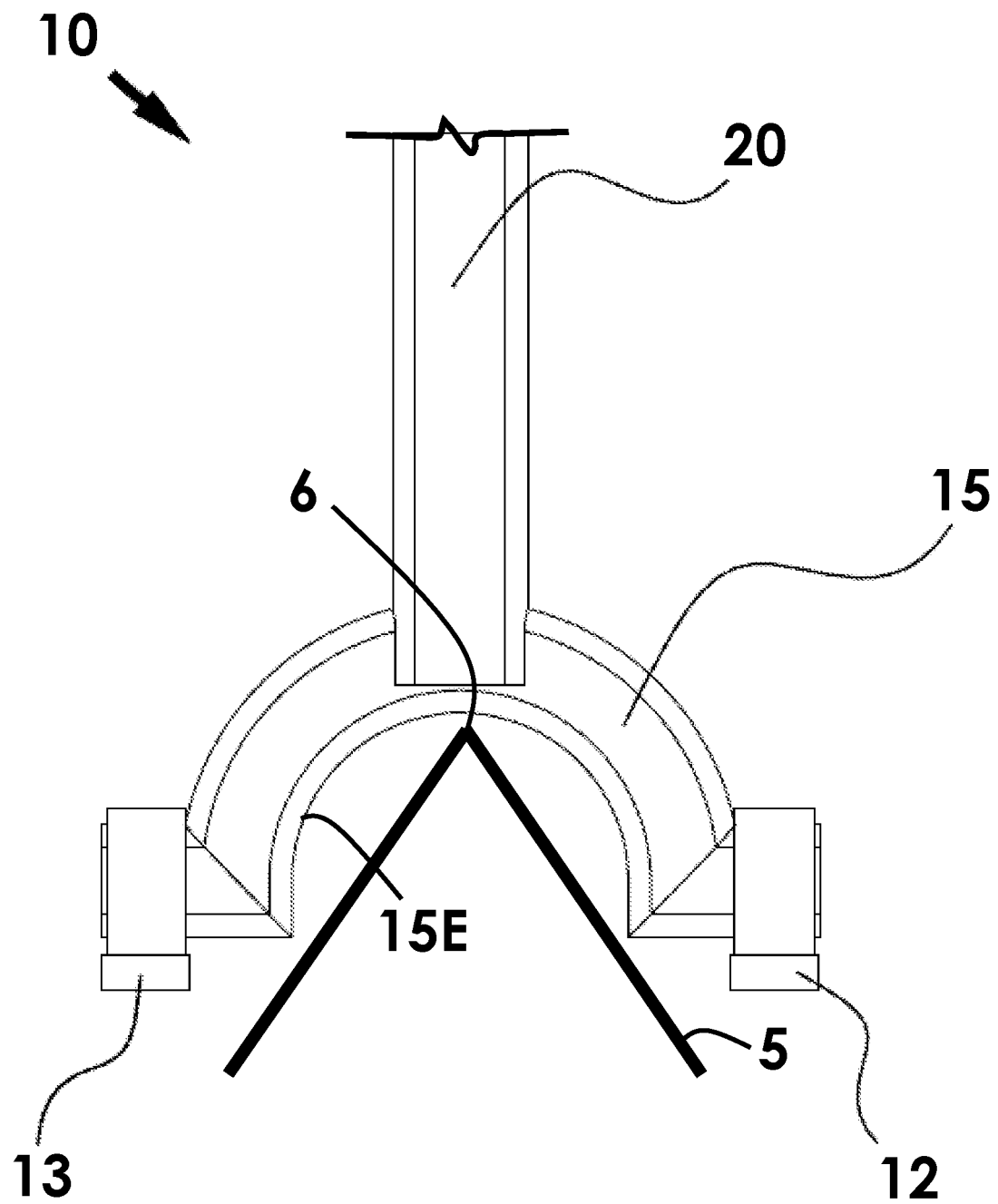
FIG. 10 is a front view of part of another embodiment of a lifting device of the present disclosure located near a peak of a roof.
Figure 11:
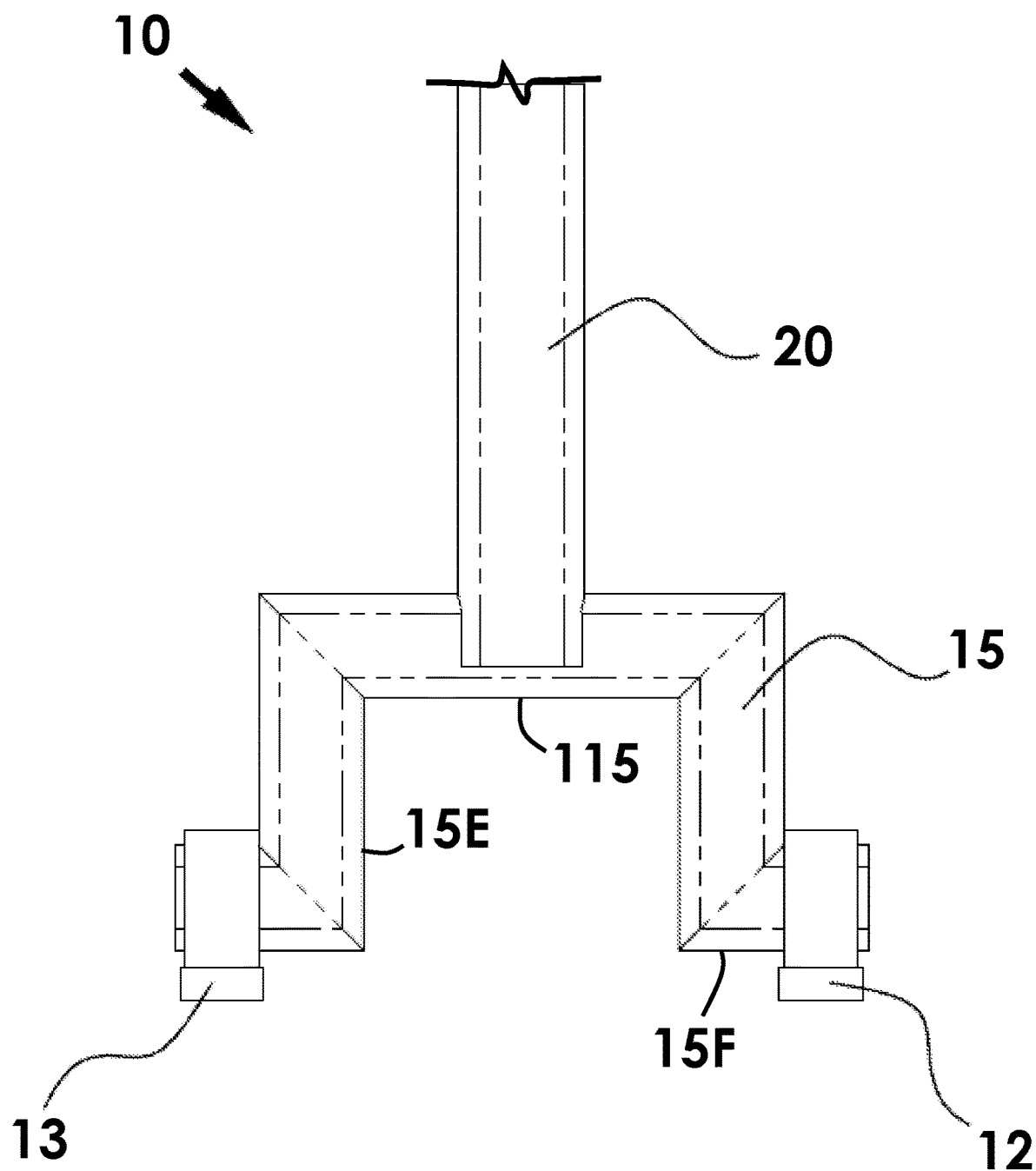
FIG. 11 is a front view of part of another embodiment of a lifting device of the present disclosure.

Although a lifting device 10 as shown in FIGS. 4, 8 and 9 comprises an inverted Y-shape configuration other descending or declining first frame section 15 configurations are herein contemplated effective to provide support members 12 and 13 located at an elevation less than a peak 6 of a roof 5 during operation of the lifting device 10 when delivering one or more bundles of shingles 99 as shown in FIG. 9. For example, a lifting device 10 may include an inverted U-shape first frame section 15 as shown in FIG. 10. In another embodiment a lifting device 10 may include a three-sided rectangular type configuration as shown in FIG. 11. Similar as the lifting device 10 of FIG. 11, in another embodiment an inverted T-shape fork lift 8 as shown in FIG. 2 may be modified to provide a three-sided rectangular configuration. In still another embodiment, a lifting device 10 may include another inverted Y-shape configuration including legs 15A and 15B, each of which includes a first part that descends out laterally from the proximal end 21 of the second frame section 20 forming an angle of the first frame section 15 and a second part that extends out from the first part horizontally as shown in the embodiments of FIG. 12A, 12B, 12C and FIG. 13. In the embodiments of a lifting device 10 described herein, at least part of an inner surface 15E of each leg 15A and 15B is located lower on the lifting device 10 than an upper apex 115 of the first frame section 15 during operation of the lifting device 10. Likewise, the bottommost part 15F of each leg 15A and 15B is located at a point lower on the lifting device 10 than an upper apex 115 of the first frame section 15 during operation of the lifting device 10 (see FIG. 11 and FIG. 12A). When targeting steep roofs 5 at least part of an inner surface 15E of each leg 15A and 15B is located at an elevation less than a peak 6 of a target pitched roof 5 when the lifting device 10 is at a maximum unloading position relative the roof 5 (see FIGS. 9 and 12B). When targeting low slope roofs 5, e.g., less than 4/12, at least part of each support member 12 and 13 is located at an elevation less than a peak 6 of a target pitched roof 5 when the lifting device is at a maximum unloading position relative the roof 5 (see FIG. 12C).

Figure 12A:
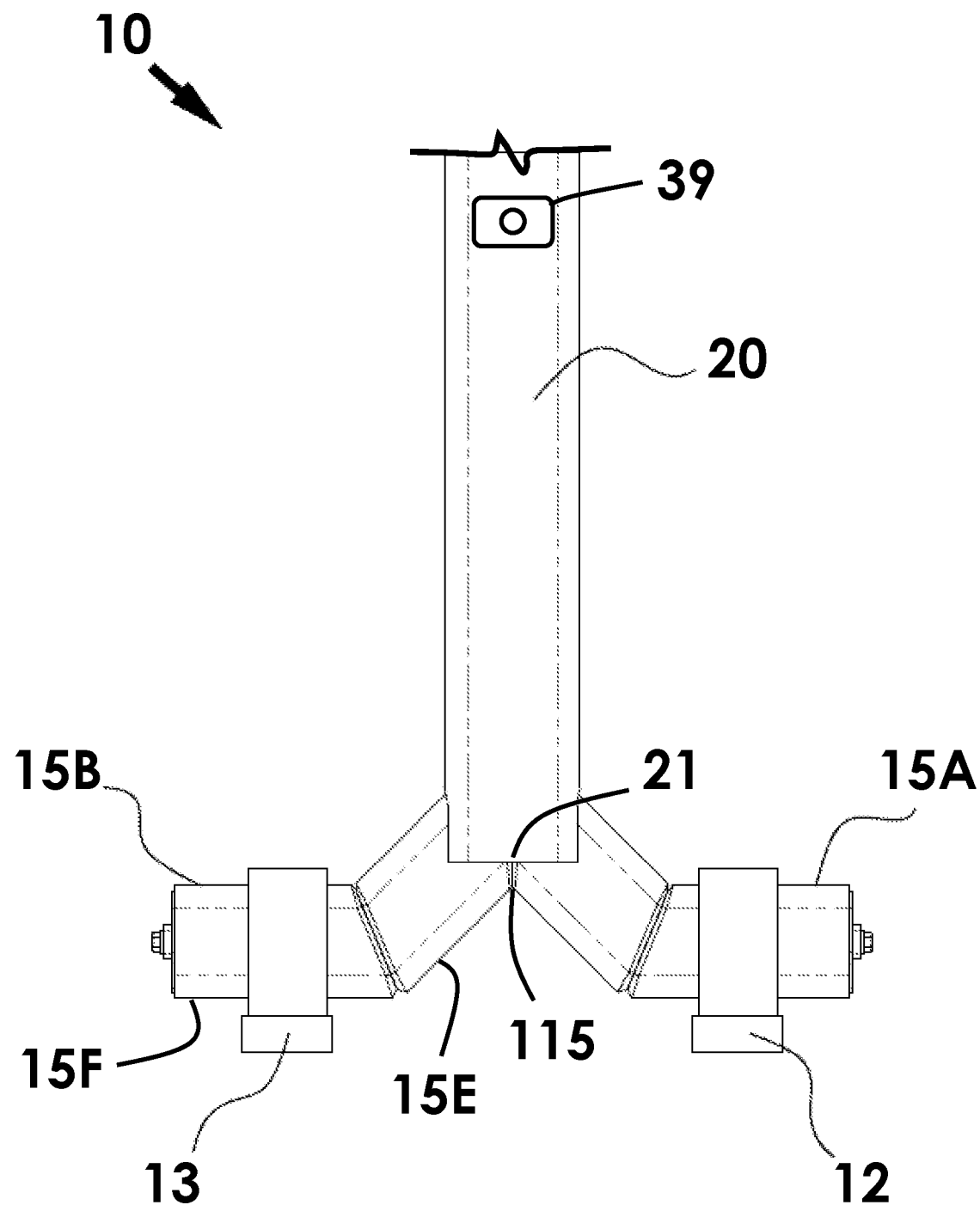
FIG. 12A is a front view of part of another embodiment of a lifting device of the present disclosure.
Figure 12B:
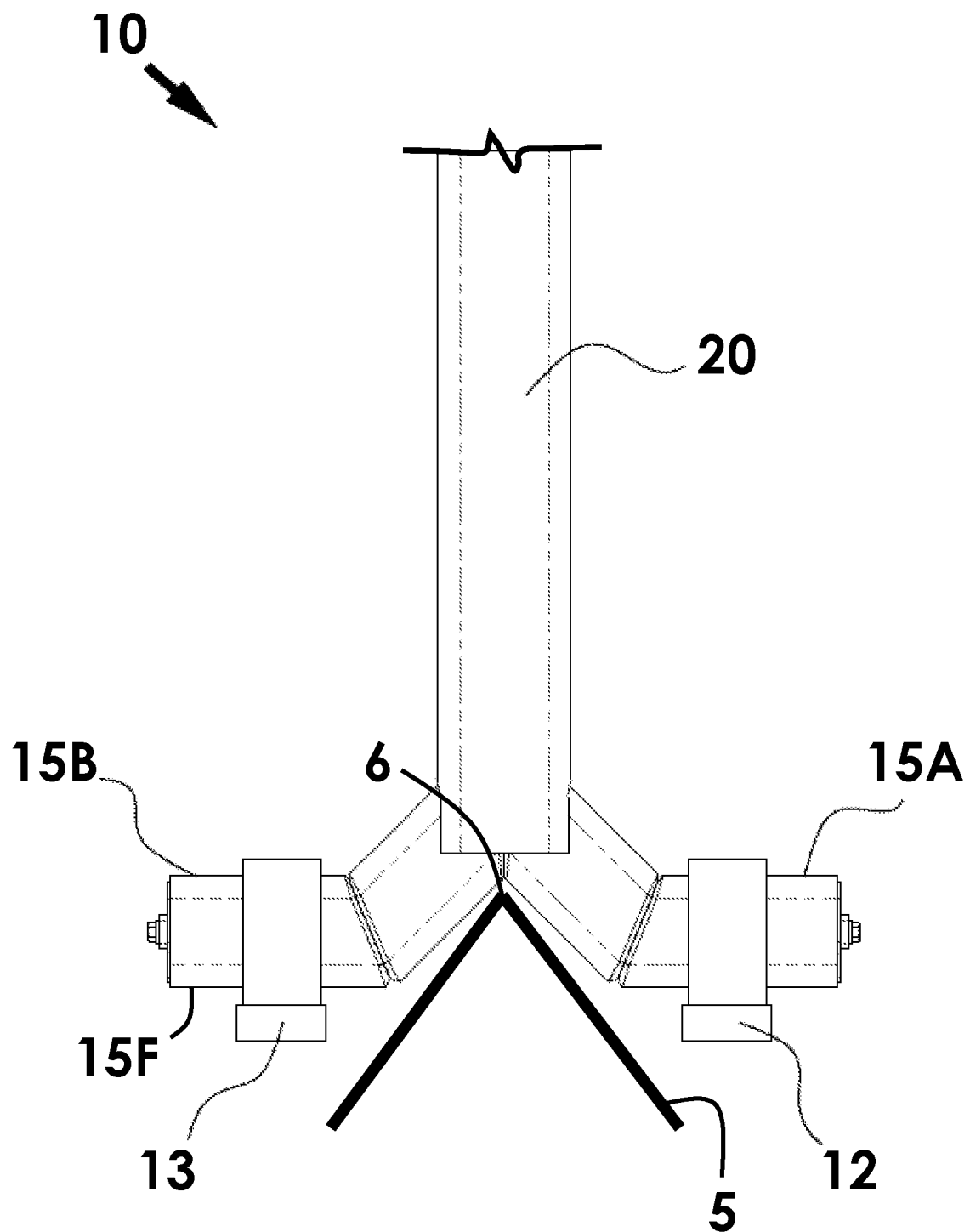
FIG. 12B is a front view of the part of the lifting device of FIG. 12A located near a peak of a roof.
Figure 12C:
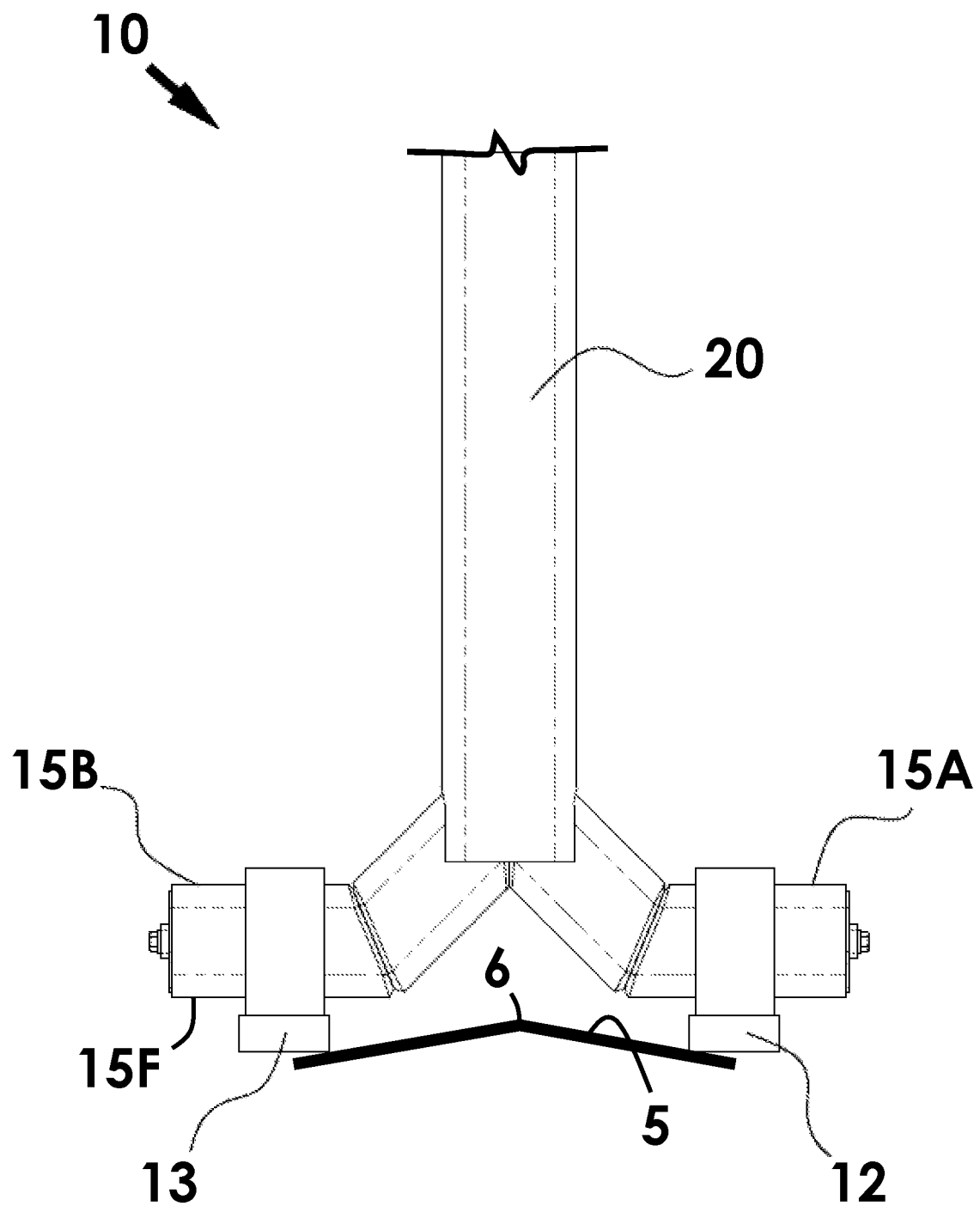
FIG. 12C is a front view of the part of the lifting device of FIG. 12A located near a peak of a roof.

Herein, a frame of a lifting device 10 as depicted in FIGS. 8-13 may be referred to as a "descending fork frame" or a "declining fork frame" and a frame of a lifting device 10 as depicted in FIGS. 8-13, including support members 12 and 13 attached thereto, may be referred to as a "descending fork frame assembly" or a "declining fork frame assembly." As such, a lifting device 10 as depicted in FIGS. 8-13 may be referred to as a "descending fork lift" or a "declining fork lift." Without limiting the present disclosure, at a maximum unloading position at least the bottommost part 15F of each leg 15A and 15B of the first frame section 15 is located at an elevation less than a peak 6 of a target pitched roof 5 (see FIG. 12B). Other descending or declining fork lift configurations for use with pitched roofs 5 are herein contemplated.

Figure 13:
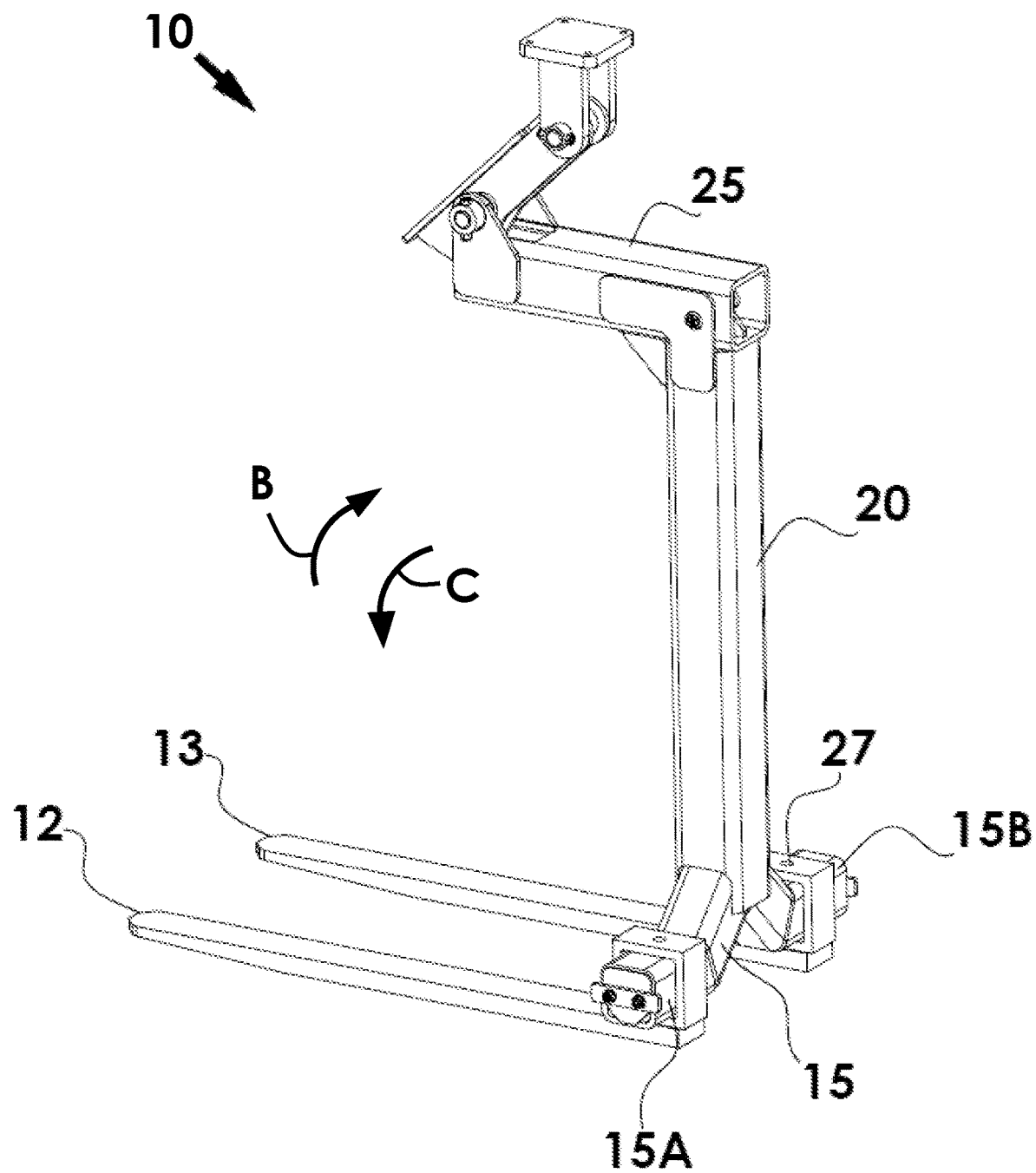
FIG. 13 is a rear perspective view of another embodiment of a lifting device of the present disclosure.
Figure 14:
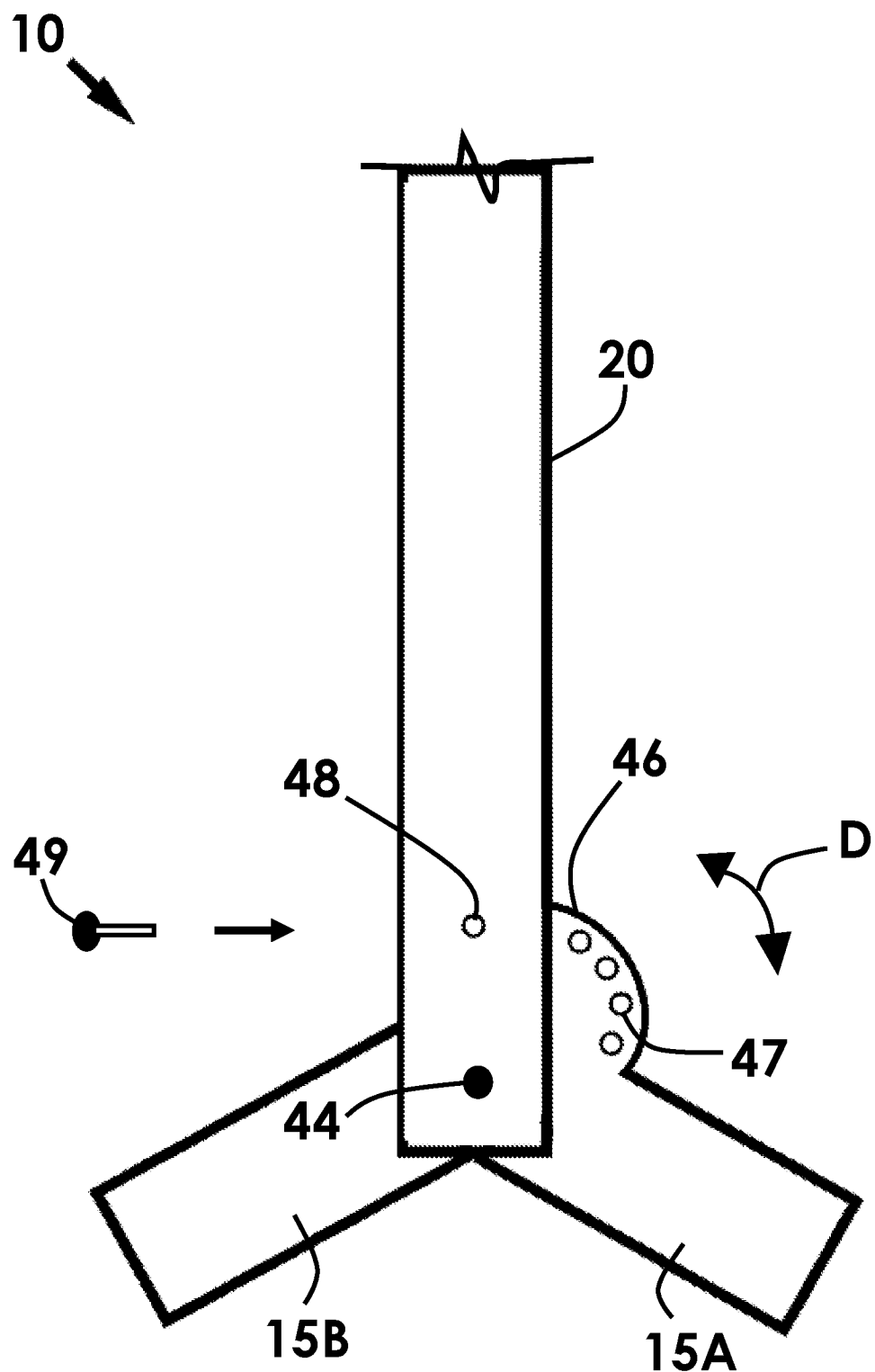
FIG. 14 is a front view of part of another embodiment of a lifting device of the present disclosure.

Although the first frame section 15 in each of the embodiments of FIGS. 8-13 is provided as a fixed member, in another embodiment, at least part of the first frame section 15 may rotate about the second frame section 20 in a manner effective to modify angle AA, i.e., modify the operable distance between the support members 12 and 13 and modify the operable elevation of the support members 12 and 13 below the proximal end 21 of the second frame section 20 (see arrow D in FIG. 14). In the non-limiting embodiment of FIG. 14, the lifting device 10 may include a cam 46 attached to a leg 15A of the first frame section 15 comprising a plurality of apertures 47 corresponding to an aperture 48 on the second frame section 20, wherein the leg 15A may pivot about pivot point 44 in a manner effective to align one of the plurality of apertures 47 with the aperture 48 to receive a set pin 49 or the like there through to hold the leg 15A in a fixed position in relation to the second frame section 20. In still another embodiment, a first frame section 15 may comprise telescoping legs 15A and 15B with apertures and fasteners, e.g., locking pins, effective for adjusting the length of the legs 15A and 15B as desired for operation with a target roof(s) 5 or other target surface(s) described herein.

Referring again to FIG. 4, the support members 12 and 13 of this embodiment may be provided as fork tines including planar upper surfaces 18 and 19. The support members 12 and 13 may also include collars 16 and 17 secured to the first frame section 15 on opposite sides of the second frame section 20. In this embodiment, the attachment of the collars 16 and 17 to the declining first frame section 15 provides upper surfaces 18 and 19 oriented along non-horizontal planes as shown. In the embodiment of FIG. 13, including a first frame section 15 with legs 15A, 15B that extend out laterally, the collars 16 and 17 are suitably secured to the legs 15A, 15B in a manner effective to provide upper surfaces 18 and 19 extending out along a horizontal plane when the lifting device 10 is in a level position. In one embodiment, the support members 12 and 13 may be attached to the bottom of the collars 16 and 17, e.g., via welds, fasteners, and combinations thereof. In another embodiment, the support members 12 and 13 may comprise part of the corresponding collars 16 and 17, e.g., providing a bottom part of each collar 16, 17. In another embodiment, the support members 12 and 13 and the collars 16 and 17 may be provided as one-piece members.

In one embodiment, the collars 16 and 17 may be adjustable along the first frame section 15. In one embodiment, the collars 16 and 17 and the first frame section 15 may include corresponding apertures for receiving fasteners, e.g., threaded bolts, there through for securing the collars 16 and 17 to the first frame section 15 in a fixed position (see fastener 27 in FIG. 13). In another embodiment, the collars 16 and 17 may be permanently fixed to the first frame section 15. For example, in an embodiment of the lifting device 10 constructed from one or more metals, the collars 16 and 17 may be welded to the first frame section 15 in a fixed orientation. In another embodiment, the support members 12 and 13 may be provided as part of the first frame section 15 as a fixed one-piece construction.

As stated above, the lifting device 10 may include one or more support members 12 and 13 provided as fork tines attached to and extending out from opposing ends of the first frame section 15 in parallel alignment. As understood by persons of ordinary skill in the art of fork tines, support members 12 and 13 of this disclosure may include fork tines with planar upper surfaces as describe above and/or the fork tines 12 and 13 may taper toward their distal ends (see the tapering distal end of fork tine 13 in FIG. 4). Also, the distance between the fork tines 12 and 13 may vary as desired or as otherwise required for operation of the lifting device 10 by adjusting the location of the collars 16 and 17 along the first frame section 15 or by fixing the fork tines 12 and 13 to the first frame section 15 at a desired position.

Figure 15:
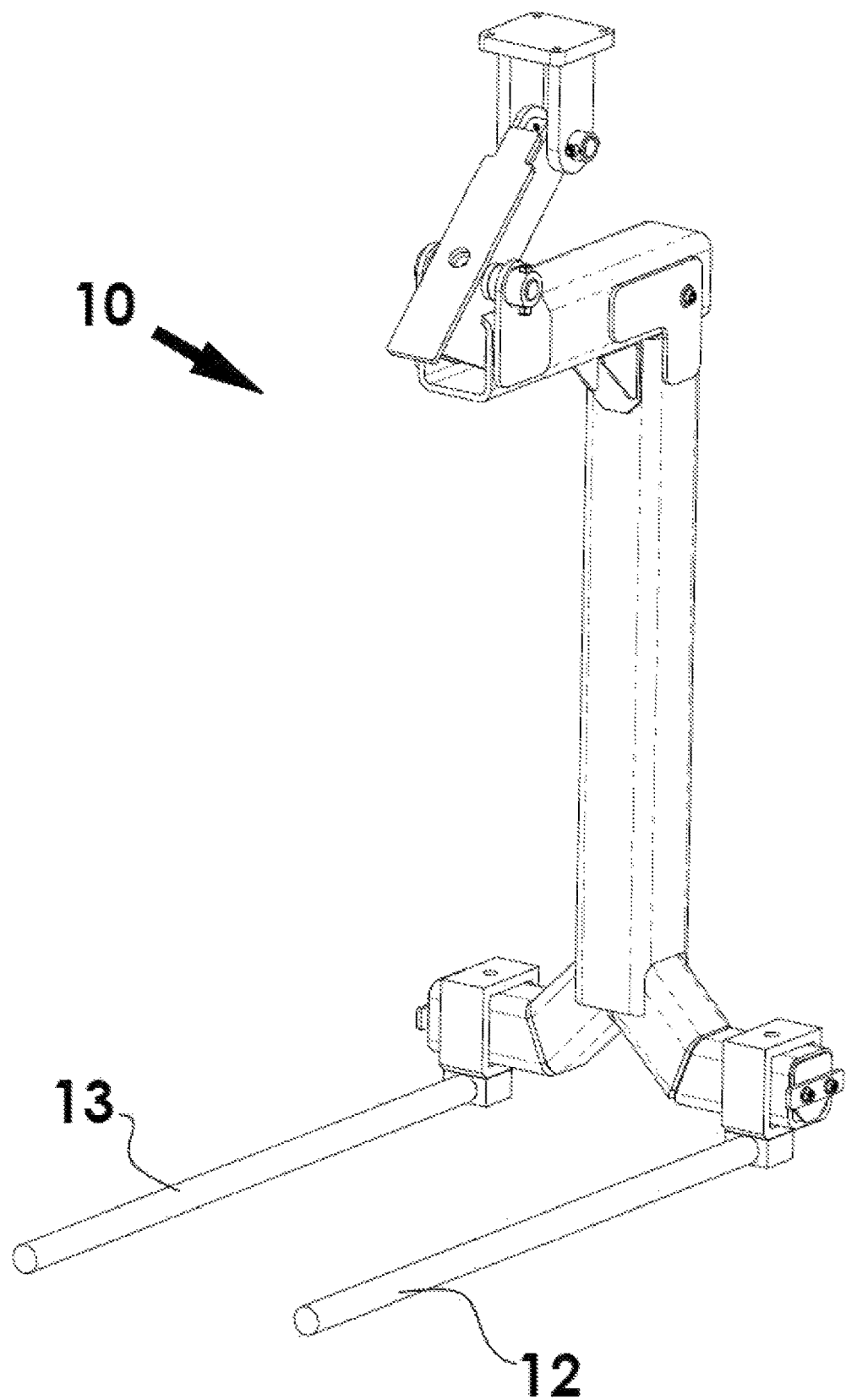
FIG. 15 is a front perspective view of another embodiment of a lifting device of the present disclosure.
Figure 16:
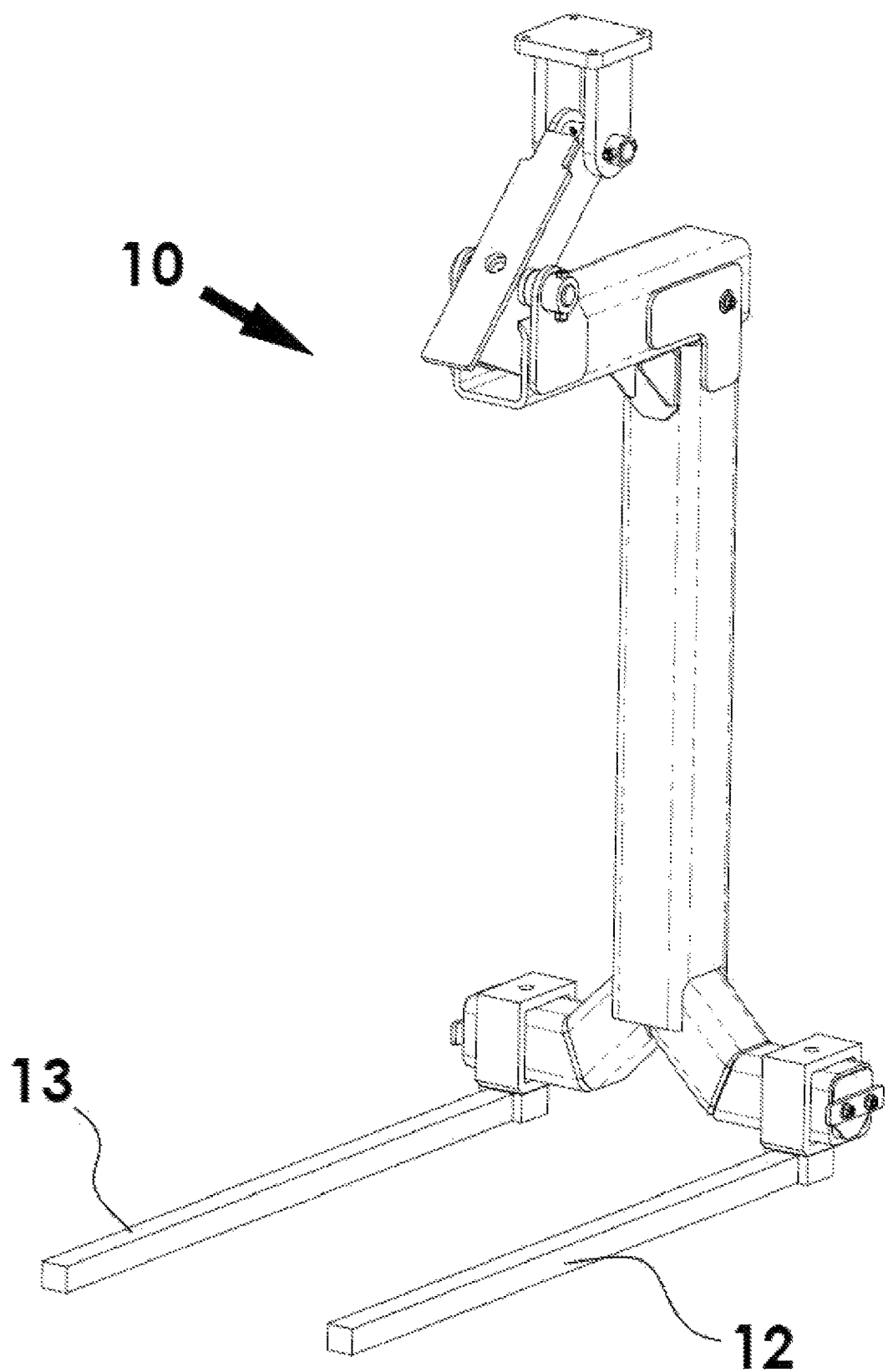
FIG. 16 is a front perspective view of another embodiment of a lifting device of the present disclosure.
Figure 17:
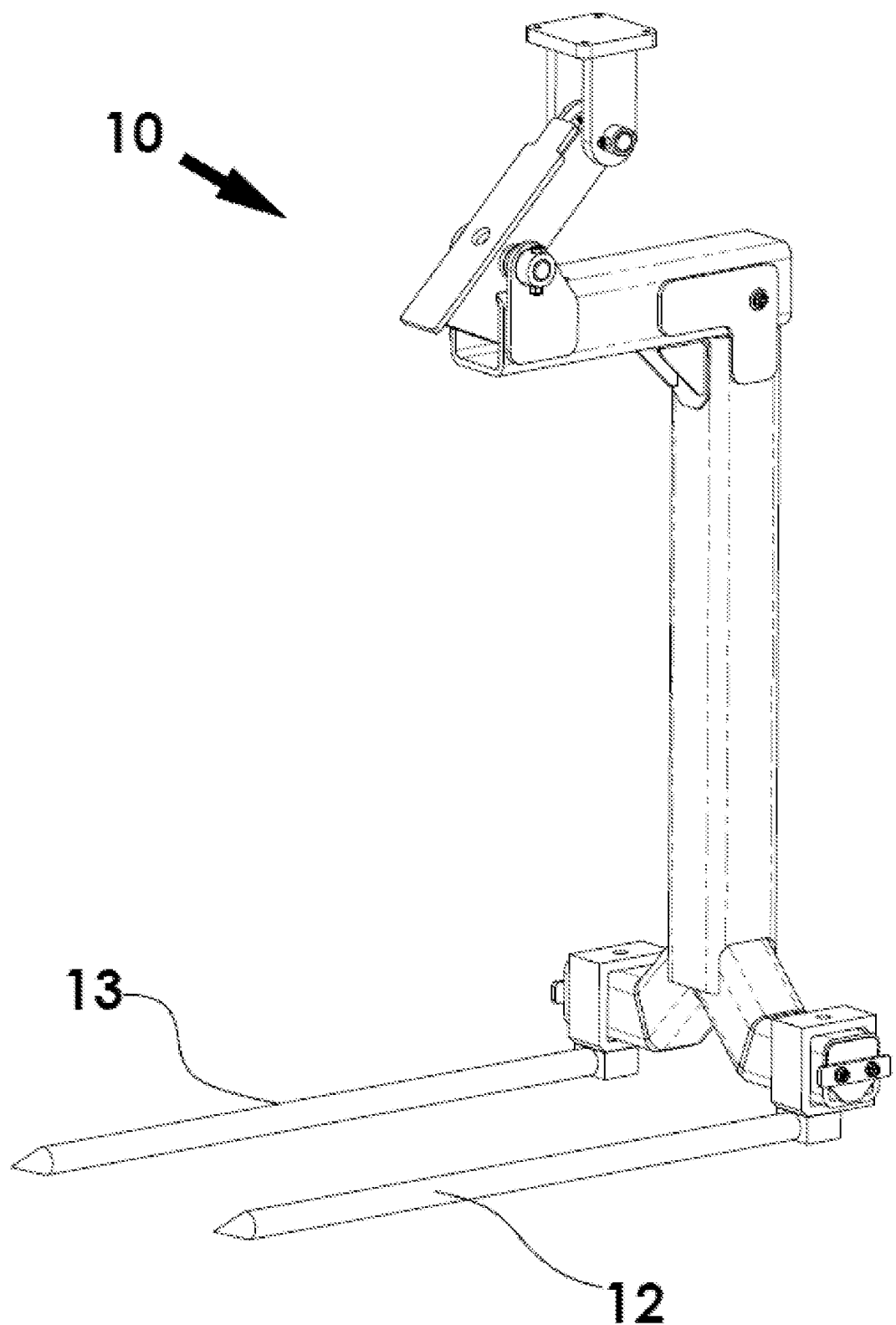
FIG. 17 a front perspective view of another embodiment of a lifting device of the present disclosure.
Figure 18:
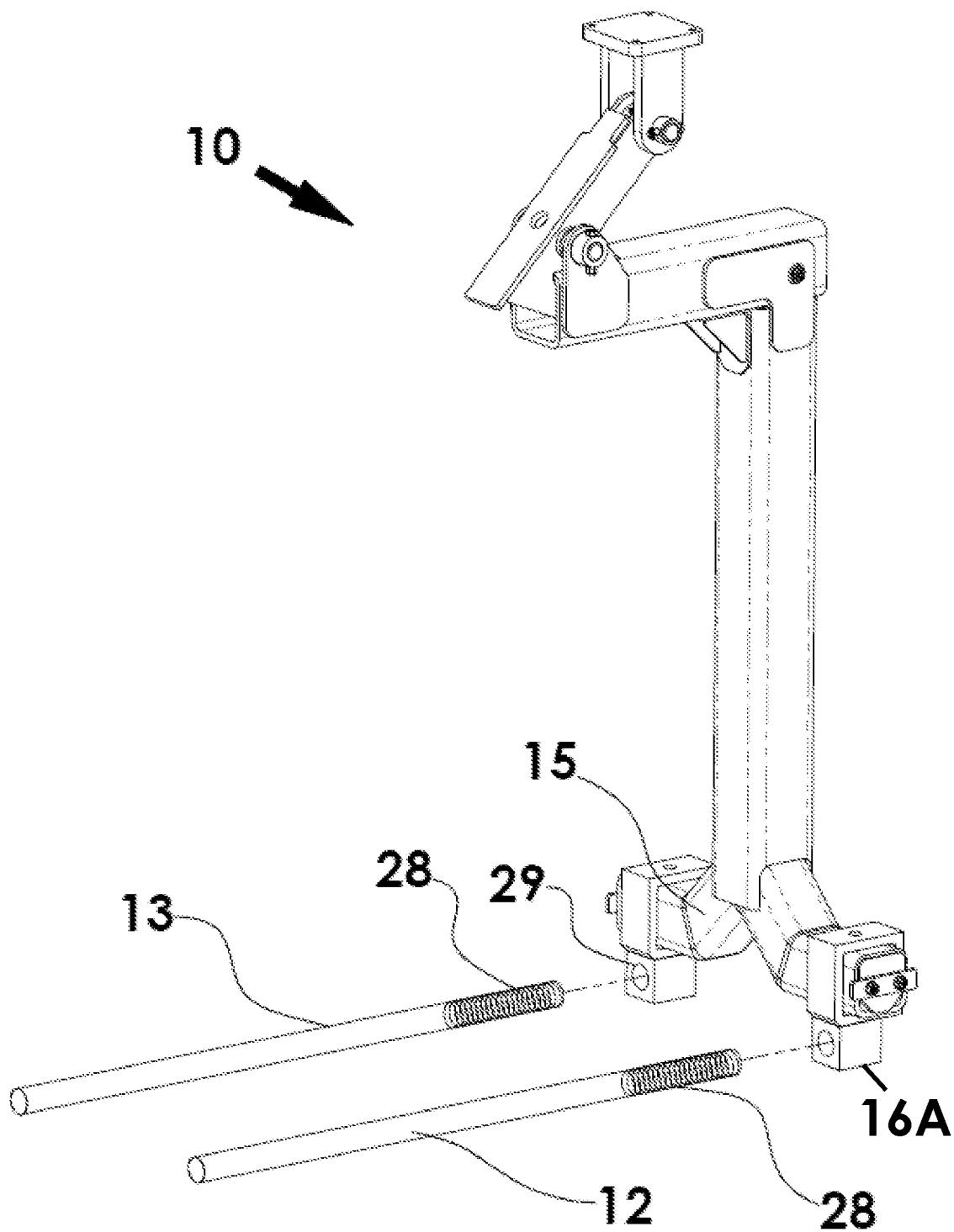
FIG. 18 is a front exploded view of another embodiment of a lifting device of the present disclosure.

Other support member 12 and 13 configurations are herein contemplated. For example, in one embodiment the support member 12 and 13 may be provided as cylindrical or tubular members (see FIG. 15). In another embodiment, the support members 12 and 13 may be provided as four sided plank type members (see FIG. 16). In another embodiment, the support members 12 and 13 may be provided as hay or bale spear fork type members as shown in FIG. 17. In embodiments including releasable support members 12 and 13, support members 12 and 13 as described above, and others, may be provided as interchangeable support members usable with common collars 16 and 17. For example, the support members 12 and 13 may include threaded proximal ends 28 for mating the support members 12 and 13 with female type threaded surfaces on the first frame section 15 or female type threaded surfaces 29 on collars 16 and 17 or collar extensions 16A (see FIG. 18). As such, the configurations of support members 12 and 13 described above, and others, may be provided as interchangeable members having similar threaded proximal ends 28.

Herein, one or more parts of a lifting device 10 of this disclosure may be constructed from one or more materials including, but are not necessarily limited to one or more materials resistant to chipping, cracking, excessive bending and reshaping as a result of ozone, weathering, heat, moisture, other outside mechanical and chemical influences, as well as physical impacts. Exemplary rigid materials of construction of a lifting device 10 may include, but are not necessarily limited to metals, plastics, rubbers, woods, filled composite materials, and combinations thereof. Suitable metals may include, but are not necessarily limited to aluminum, copper, nickel, brass, alloy steel, carbon steel, titanium, and combinations thereof. Suitable plastics may include, but are not necessarily limited to acrylic or polymethyl methacrylate ("PMMA"), polycarbonate ("PC"), polyethylene ("PE"), polypropylene ("PP"), polyethylene terephthalate ("PETE"), polyvinyl chloride ("PVC"), acrylonitrile-butadiene-styrene ("ABS"), and combinations thereof. In an embodiment of a lifting device 10 constructed from one or more metals, the lifting device 10 may include one or more corrosion-inhibiting coatings. In addition, a lifting device 10 may be provided in one or more colors or one or more color patterns as desired or as may otherwise be required for one or more particular operations.

Although a lifting device 10 of this disclosure may be built to scale, in one suitable embodiment for use in the construction industry, the support members 12 and 13 may be provided as fork tines as shown in FIG. 13 constructed from steel operationally configured for carrying one or more building materials 99 comprising a total weight of or about 2721.6 kg (6000.0 pounds) with dimensions of each support member 12 and 13 as described in Table 1.

TABLE 1

| | |
|---|---|
| Length: | 152.4 cm (60.0 inches); |
| Width: | 15.2 cm (6.0 inches); |
| Thickness: | 3.81 cm (1.5 inches). |

A lifting device 10 of this disclosure may also include electronic control circuitry as known to persons of ordinary skill in the art of lifting equipment 7 including fork lifts and other lift devices. In one embodiment, a lifting device 10 may include a video system including one or more cameras 39 (see FIG. 12A) mounted to the lifting device 10 operationally configured to allow an operator of the lifting device 10 to visually observe operation of the lifting device 10 in real time via a video monitor. Without limiting the disclosure, one suitable camera may include, but is not necessarily limited to an action camera as understood by persons of ordinary skill in the art. As of the time of this application, one non-limiting example of an action camera is commercially available from GoPro, Inc., San Mateo, Calif., U.S.A. In addition to releasable mounts, one or more cameras of a video system may be releasably secured to a lifting device 10 via one or more fasteners and/or magnetic connections and/or adhesive connections and/or suction cup connections. The location of one or more cameras 39 on a lifting device 10 may vary as desired or as may otherwise be required for one or more particular operations.

In one embodiment, camera video may be recorded via a digital video recorder ("DVR"), which may be integrated into a camera, into a corresponding monitor or into a smartphone or tablet computer on which a video of the operation of a lifting device 10 is to be shown on a display screen. In one embodiment, a lens of a camera may include a reticle with one or more guide lines operationally configured for use with one or more lifting device 10 operations. In one embodiment, a display screen of a monitor, smartphone or tablet computer may include an overlay of one or more guide lines operationally configured for use with one or more lifting device 10 operations. One or more guide lines may also be provided as a software feature for video display. In one embodiment, guide lines, e.g., vertical and/or horizontal solid guide lines and/or broken guide lines and/or dots, may be operationally configured to assist an operator of a lifting device 10 transport a load onto one or more target surfaces including a peak 6 of a roof 5. In one embodiment, a lifting device 10 of this disclosure may include one or more proximity sensors operationally configured to alert an operator of a lifting device 10 when a load being transported by a lifting device 10 is in a safe position and/or unsafe or hazard position with respect to placing a load onto a target surface, e.g., a peak 6 of a roof 5. In another embodiment, a lifting device 10 of this disclosure may include one or more visible alarms, e.g., one or more lights, and/or one or more audible alarms attached to the lifting device 10. An operator display screen may also include one or more visible alarms and/or more or more audible alarms in electric communication with a lifting device 10.

Figure 19:
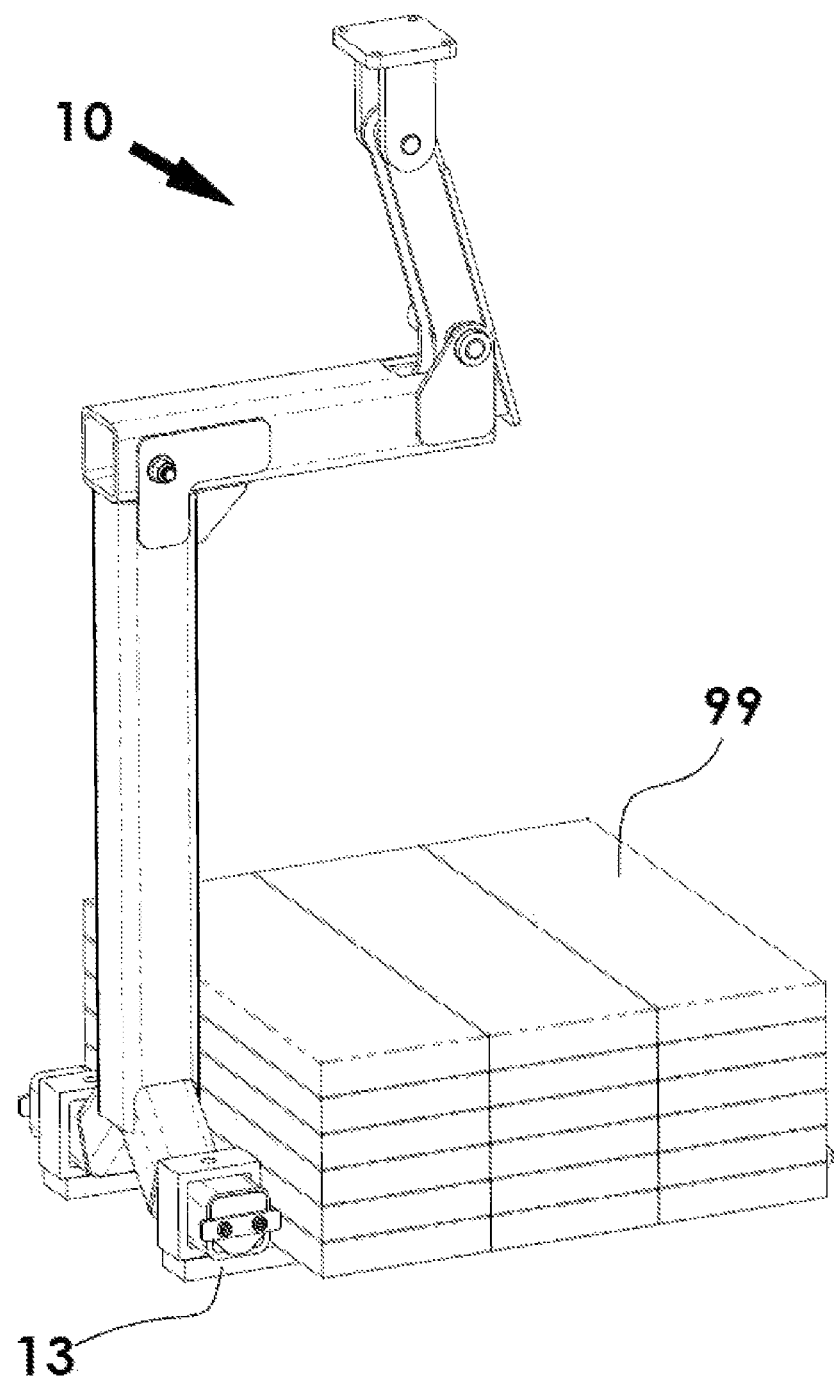
FIG. 19 is a rear perspective view of the lifting device of FIG. 13.
Figure 20:
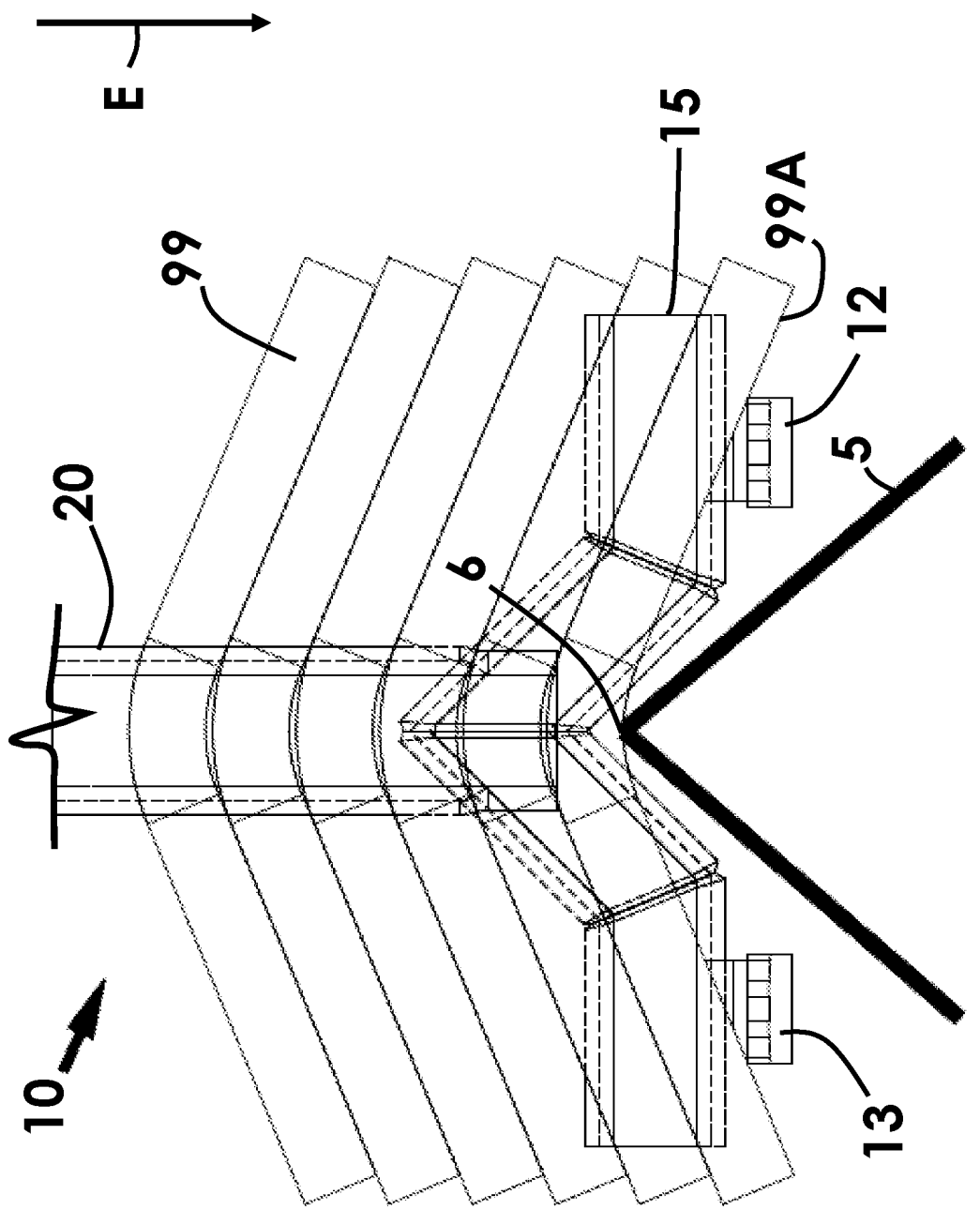
FIG. 20 is a front partial phantom view of part of the lifting device of FIG. 13 located near a peak of a roof.

Turning to FIGS. 19 and 20, a lifting device 10 comprising a descending fork frame assembly as described above is suitably operationally configured to support or hold one or more bundles of roofing shingles 99 across the support members 12 and 13 and unload the one or more bundles of roofing shingles 99 directly onto a peak 6 of a roof 5 without any persons being located on the roof 5 at the time the one or more bundles of roofing shingles 99 are unloaded onto the peak 6 of the roof 5. In particular, a lifting device 10 of this disclosure may be operationally configured to direct a bottom surface 99A of one or more bundles of roofing shingles 99 to a contact position with a peak 6 of one or more pitched roofs 5 without the support members 12 and 13 contacting the roof 5 as shown in FIG. 20 (see arrow E). Accordingly, a lifting device 10 of this disclosure is operationally configured to place one or more bundles of roofing shingles 99 on one or more peaks 6 of one or more roofs 5 lengthwise perpendicular to the peak(s) 6 of the roof(s) 5 in a manner similar as performed manually by person(s) as described in reference to FIG. 2.

As understood by the skilled artisan, individual bundles of roofing shingles are capable of flexing or bending, however, once one or more bundles of roofing shingles 99 are set on a peak 6 lengthwise perpendicular to the peak 6 as shown in FIG. 20 the amount of bend of the bottommost row of one or more bundles of roofing shingles 99 is often minimal providing some space between at least part of the bottom surface 99A of bottommost row of the one or more bundles of roofing shingles 99 and the roof 5 whereby the support members 12 and 13 may be directed away from the one or more bundles of roofing shingles 99 without disturbing the orientation of the one or more bundles of roofing shingles 99 on the peak 6 of the roof 5. As an example, once the one or more bundles of roofing shingles 99 are set on the peak 6 of the roof 5 the lifting device 10 may be directed in a rearward direction until the support members 12 and 13 are cleared from the one or more bundles of roofing shingles 99, i.e., until the support members 12 and 13 are no longer located under the one or more bundles of roofing shingles 99.

In operation, one or more bundles of roofing shingles 99 may be placed across the support members 12 and 13 of a lifting device 10 by hand via one or more persons as shown in FIG. 19, e.g., via one or more persons present at an end user location 130. As an example, one or more bundles of roofing shingles 99 carried on one or more pallets 3 may be delivered to an end user location 130, e.g., a house with a pitched roof 5, on a platform trailer 4 whereby an operator of the lifting equipment 7 may direct the lifting device 10 onto or near the platform trailer 4 where one or more persons can manually transfer one or more bundles of roofing shingles 99 from one or more pallets 3 directly onto the support members 12 and 13. Once the one or more bundles of roofing shingles 99 are unloaded onto a peak 6 of a roof 5 as described with reference to FIG. 20, the operator of the lifting equipment 7 may direct the lifting device 10 back onto or near the platform trailer 4 in order for the person(s) on the platform trailer 4 to transfer another load of one or more bundles of roofing shingles 99 onto the support members 12 and 13 of the lifting device 10 for delivery onto the roof 5. This process may be repeated until a desired number of one or more bundles of roofing shingles 99 are located on the roof 5.

As understood by the skilled artisan, bundles of roofing shingles 99 are typically provided by shingle manufacturers on pallets 3 comprising from or about ten rows to or about fourteen rows of bundles of roofing shingles 99—each row having a total of either three or four bundles of roofing shingles 99 (herein referred to as a "full pallet" of bundles of roofing shingles 99). As also understood by the skilled artisan, due to the weight of the bundles of roofing shingles 99, only about half of a full pallet of bundles of roofing shingles 99, e.g., up to about six rows of three or four bundles of roofing shingles 99, are delivered and stacked on a given spot or area of the peak 6 of a roof 5 due to localized roof 5 load limitations. As such, the method of delivery described above typically requires at least two trips to transport a full pallet of bundles of roofing shingles 99 onto a roof 5 in two or more stacks of bundles of roofing shingles 99. In another mode of operation, an operator of the lifting equipment 7 may use a lifting device 10 to transport one or more full pallets of bundles of roofing shingles 99 from a platform trailer 4 onto a ground surface, e.g., street, driveway, yard, sidewalk, whereby one or more persons may there after manually transfer bundles of roofing shingles 99 from the pallet 3 onto support members 12 and 13 of a lifting device 10 for delivery onto a roof 5.

Figure 21:
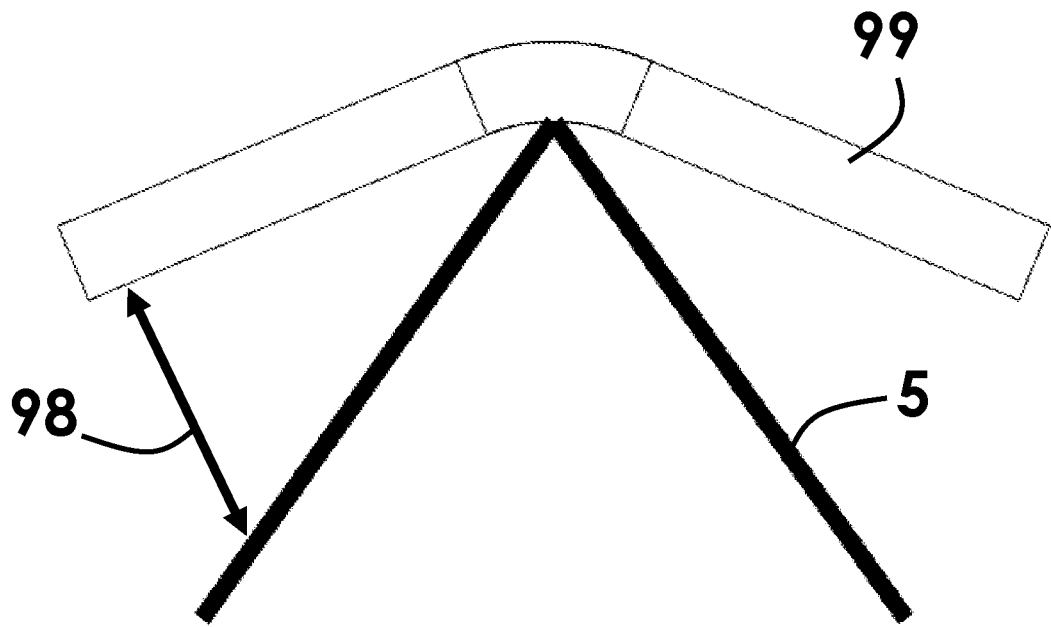
FIG. 21 illustrates a bundle of roofing shingles located on a peak of a roof.
Figure 22:
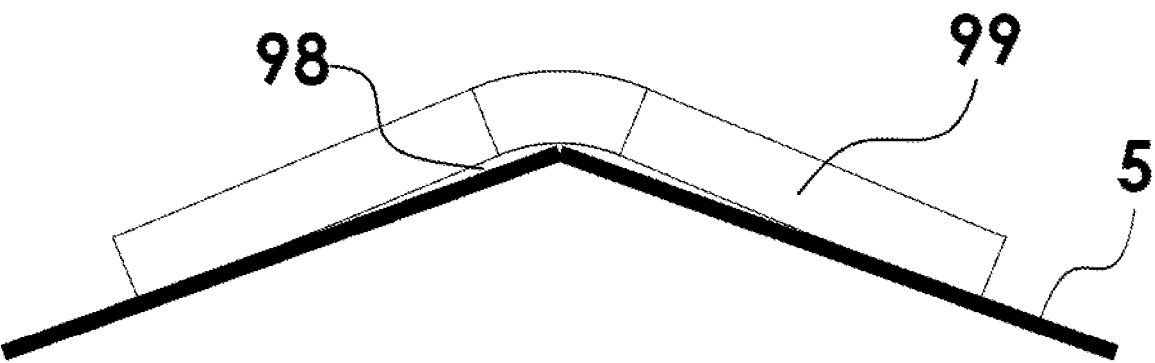
FIG. 22 illustrates a bundle of roofing shingles located on a peak of a roof.

As understood by the skilled artisan, the spacing realized between the bottom surface 99A of a bottommost row of one or more bundles of roofing shingles 99 and a roof 5 when the one or more bundles of roofing shingles 99 are placed on a peak 6 of the roof 5 lengthwise perpendicular to the peak 6 of a roof 5 may vary depending on the pitch of the roof 5 and/or the amount of bend in the one or more bundles of roofing shingles 99. For example, the gap or spacing 98 realized between a bottom surface 99A or part of a bottom surface 99A of a bottommost row of one or more bundles of roofing shingles 99 and a roof 5 is typically greater in relation to a steep roof, such as a 12/12 roof (see FIG. 21) compared to setting the same one or more bundles of roofing shingles 99 on a shallow roof, such as a 1/12 roof (see FIG. 22). As such, in another embodiment a system 100 of this disclosure may comprise one or more portable items operationally configured to be placed on a roof 5 as one or more spacer type supports between the roof 5 and a bottommost row of one or more bundles of roofing shingles 99 effective to provide and/or maintain operable spacing 98 between the roof 5 and the bottommost row of one or more bundles of roofing shingles 99. As described below, the spacing 98 provided between the roof 5 and the bottommost row of one or more bundles of roofing shingles 99 is effective to provide clearance for the support members 12 and 13 when the support members 12 and 13 are directed apart from the one or more bundles of roofing shingles 99 and when the support members 12 and 13 are directed to an engagement position with the one or more bundles of roofing shingles 99 without disrupting the arrangement of the one or more bundles of roofing shingles 99 as originally placed on a peak 6 of a roof 5.

Figure 23A:
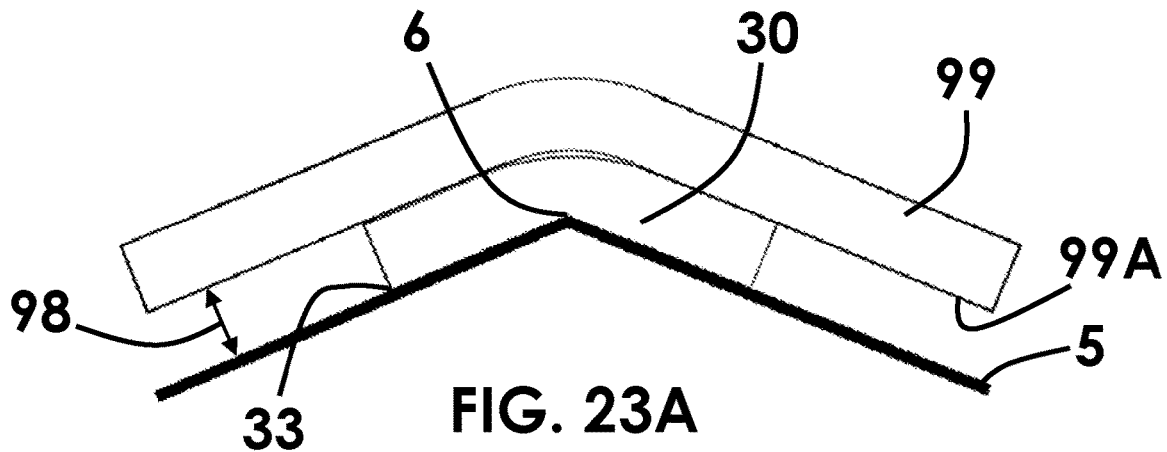
FIG. 23A illustrates a bundle of roofing shingles at a peak of a roof supported by a portable support.

With reference to FIG. 23A, in one embodiment one or more portable items may include one or more portable supports 30 operationally configured to be transported onto a roof 5 including a peak 6 of a roof 5 via a lifting device 10 whereby the one or more portable supports 30 extend over a peak 6 onto each side of the roof 5 a desired distance as shown. In this embodiment, each of the one or more portable supports 30 are operationally configured as a spacer operationally configured to maintain one or more bundles of roofing shingles 99 apart from a peak 6 of a roof 5 (see spacing 98). In one embodiment, a portable support 30 may be provided in a form fit corresponding to a particular pitch of a roof 5. In one embodiment, a portable support 30 may be provided as a flexible member or partly flexible member operationally configured to conform to a pitch of a roof 5 during use.

Figure 23B:
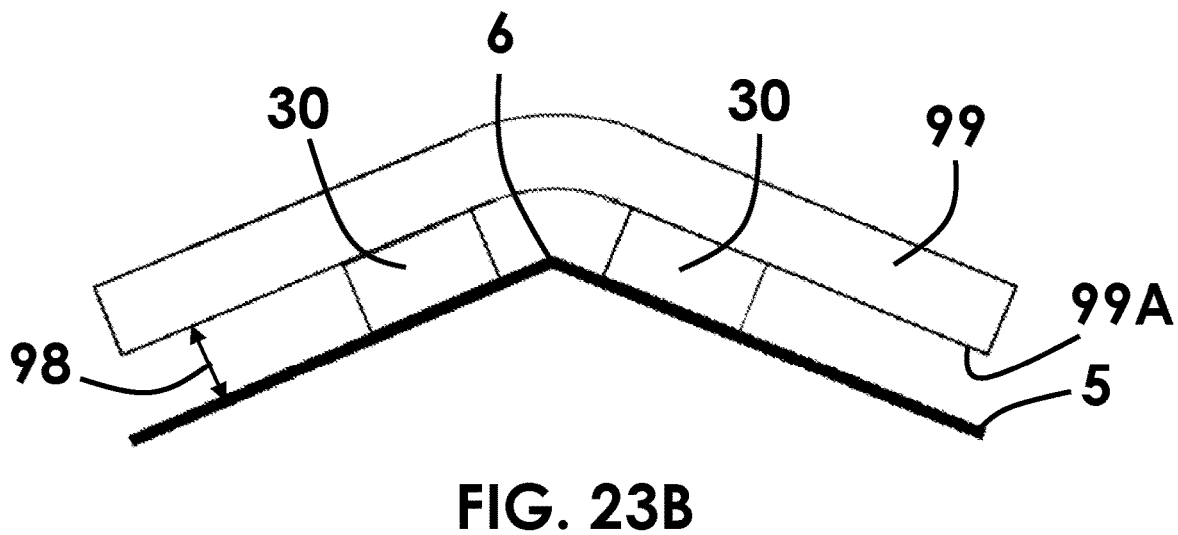
FIG. 23B illustrates a bundle of roofing shingles at a peak of a roof supported by portable supports.

With reference to FIG. 23B, in another embodiment one or more portable supports 30 may be placed on each side of a roof 5 near a peak 6 of the roof 5 in a manner effective to space one or more bundles of roofing shingles 99 apart from the roof 5 as desired (see spacing 98). As understood by the skilled artisan, the spacing between the peak 6 of the roof 5 and a bottom surface 99A of a bottommost row of one or more bundles of roofing shingles 99 may vary according to the location of the one or more portable supports 30 on each side of a roof 5. For example, as the one or more portable supports 30 are directed away from the peak 6 to a lower elevation the one or more portable supports 30 are directed downward toward the peak 6 of a roof 5.

Suitably, the one or more portable supports 30 of this disclosure are operationally configured to be transported to one or more target surfaces via a lifting device 10 together with one or more bundles of roofing shingles 99. In one embodiment, at least part of the one or more portable supports 30 are operationally configured as contact surfaces for support members 12 and 13 of a lifting device 10 whereby the one or more portable supports 30 may be transported together with one or more bundles of roofing shingles 99 atop the support members 12 and 13 to one or more target surfaces. In another embodiment, one or more portable supports 30 may be attached directly to one or more bundles of roofing shingles 99 in a manner effective to be transported together with one or more bundles of roofing shingles 99 via a lifting device 10 to one or more target surfaces.

Figure 24A:
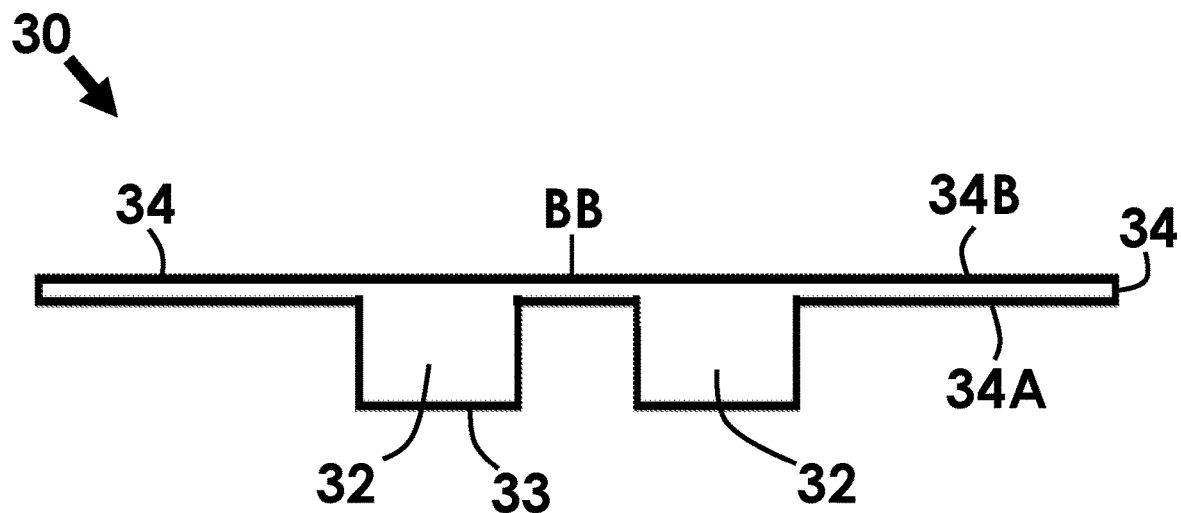
FIG. 24A is a side elevation view of an embodiment of a portable support of the present disclosure.

As shown in FIG. 24A, in one embodiment a portable support 30 may include (1) one or more opposing spacers 32 operationally configured to separate at least part of one or more bundles of roofing shingles 99 from one or more surfaces of a roof 5 and (2) one or more extension members 34 operationally configured as contact surfaces for support members 12 and 13 of a lifting device 10. In particular, each of the extension members 34 comprises a bottom surface 34A operationally configured as a contact surface for support members 12 and 13 of a lifting device 10 and an upper surface 34B operationally configured as a contact surface for one or more bundles of roofing shingles 99. As described below, in operation the one or more opposing spacers 32 define an operable midpoint BB of a portable support 30 regardless the length of any one of the one or more extension members 34 extending out from the one or more opposing spacers 32 on opposing sides of a portable support 30.

Figure 24B:
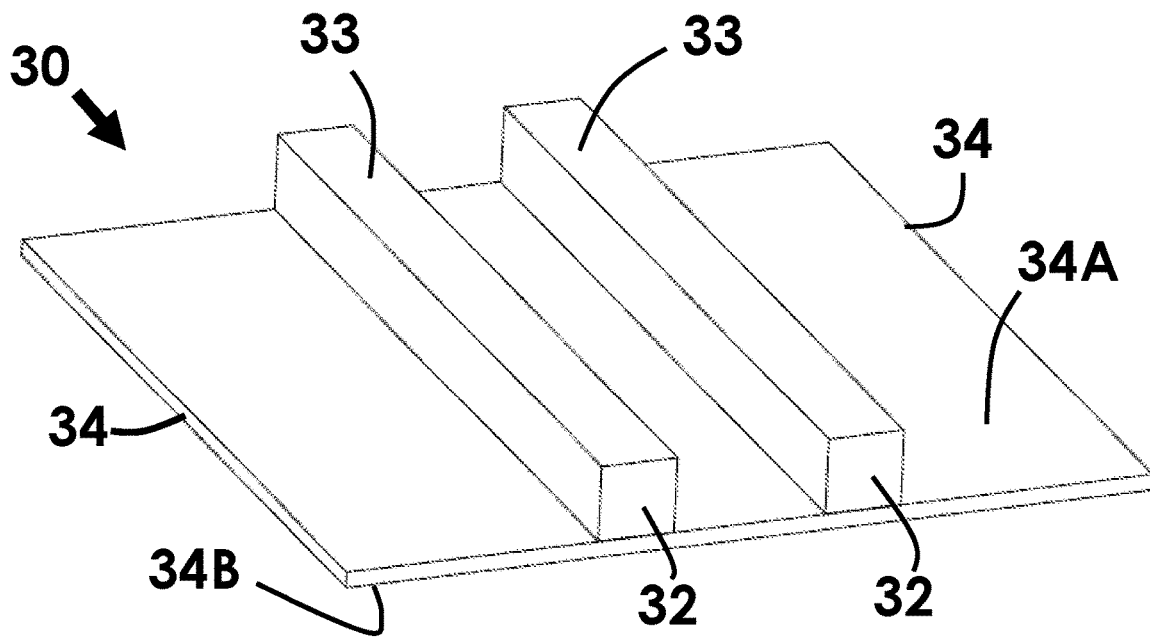
FIG. 24B is a bottom perspective view of an embodiment of a portable support of the present disclosure.

As shown in FIG. 24A, in one embodiment a portable support 30 may be provided as a one-piece member or single unit construction. As shown in FIG. 24B, in another embodiment a portable support 30 may comprise an assembly of one or more spacers 32 and one or more extension members 34, including one or more spacers 32 attached to one or more bottom surfaces 34A of one or more extension members 34. In one embodiment, one or more spacers 32 may be releasably attached, or releasably assembled, to one or more bottom surfaces 34A of one or more extension members 34. In another embodiment, one or more spacers 32 may be permanently attached, or permanently assembled, to one or more bottom surfaces 34A of one or more extension members 34. In another embodiment, one or more spacers 32 may be releasably attached to one or more upper surfaces 34B of one or more extension members 34 as desired or may be required for one or more particular operations.

With reference to FIGS. 23A and 24B, in one embodiment the one or more portable supports 30 suitably comprise one or more contact surfaces 33 for one or more target surfaces. In one embodiment, the one or more contact surfaces 33 may comprise planar or substantially planar contact surfaces 33. In another embodiment, the one or more contact surfaces 33 may comprise non-planar contact surfaces. In another embodiment, one or more contact surfaces 33 may include one or more raised surfaces, e.g., one or more protuberances for contacting one or more particular target surfaces. In another embodiment, the one or more contact surfaces 33 may include one or more anti-slip materials disposed thereon, e.g., one or more anti-slip tapes, one or more grip fabrics, one or more slip resistant rubber materials, one or more spiked materials, anti-slip epoxy, diamond plate with raised surface resists, and combinations thereof.

Figure 25:
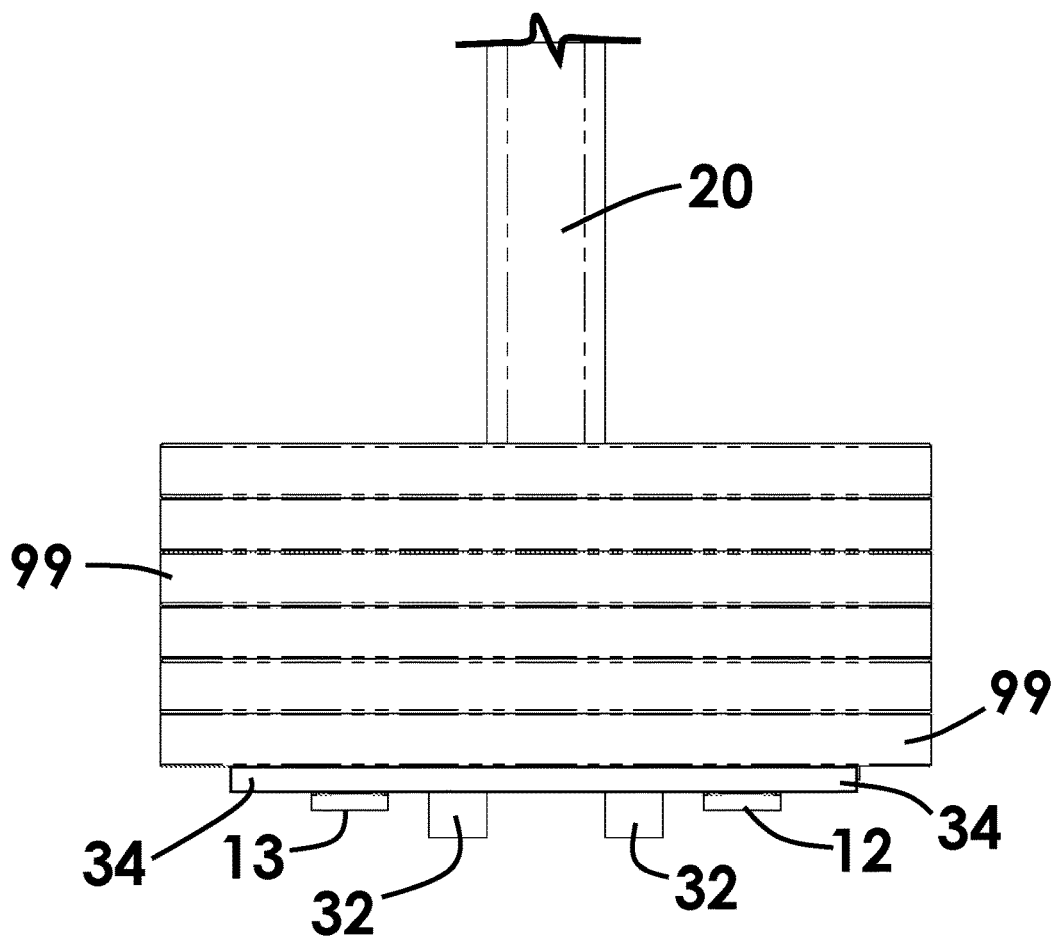
FIG. 25 is a front view of part of a lifting device of the present disclosure illustrating transport of a portable support together with six rows of bundles of roofing shingles.
Figure 26:
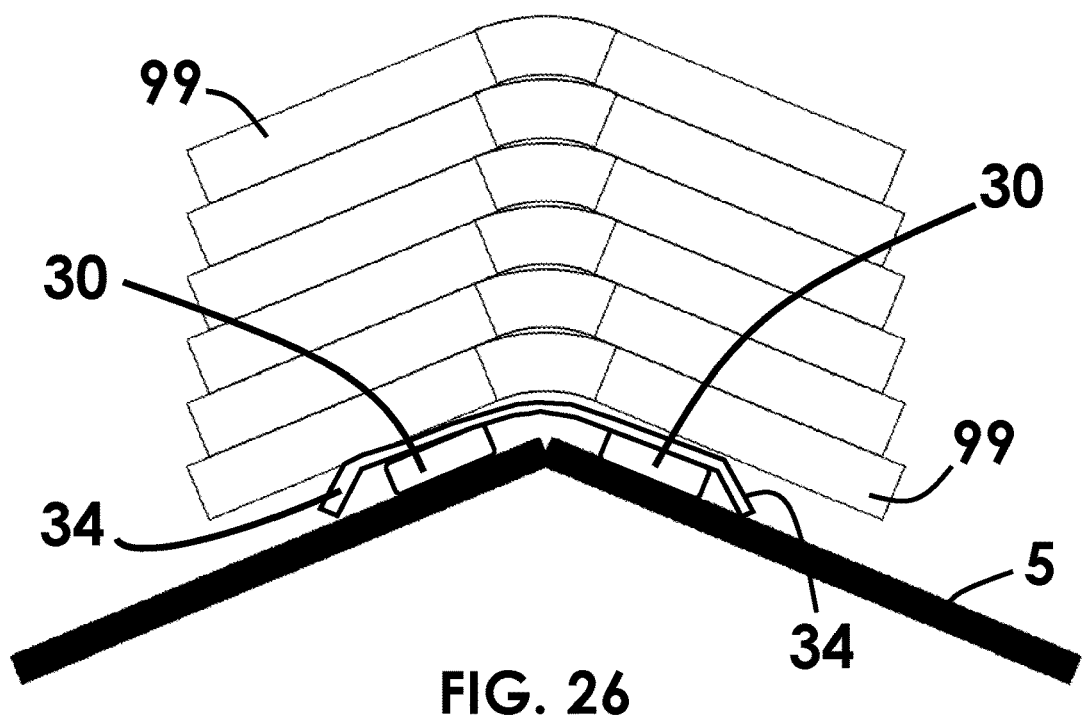
FIG. 26 illustrates a portable support and six rows of bundles of roofing shingles located on a peak of a roof.
Figure 28:
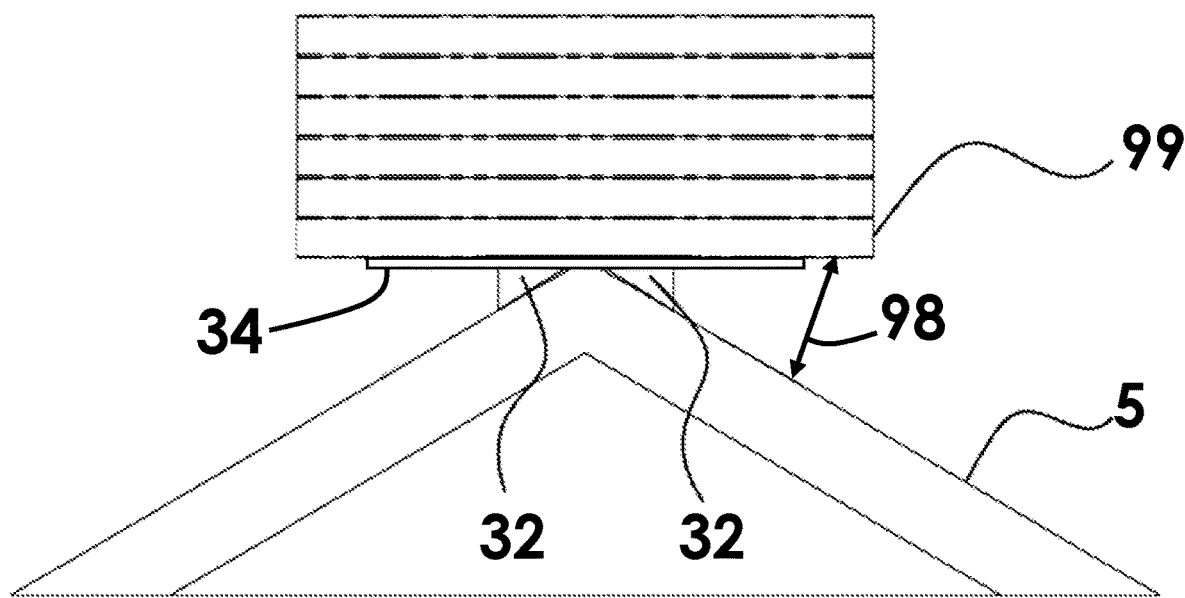
FIG. 28 illustrates a portable support and six rows of bundles of roofing shingles located on a peak of a roof.
Figure 29:
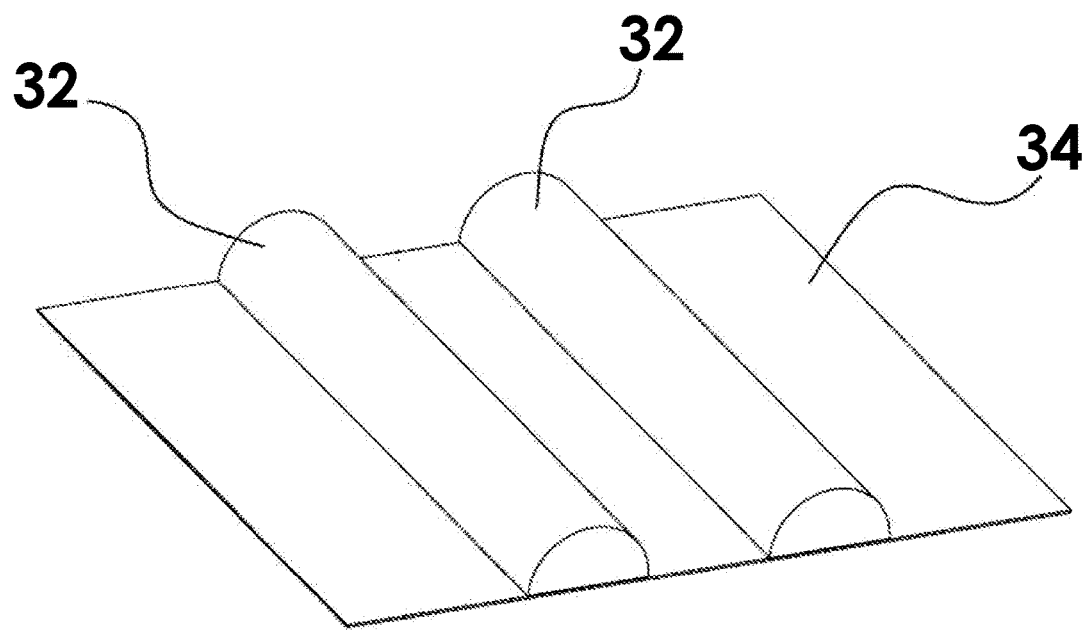
FIG. 29 is a bottom perspective view of an embodiment of a portable support of the present disclosure.
Figure 30:
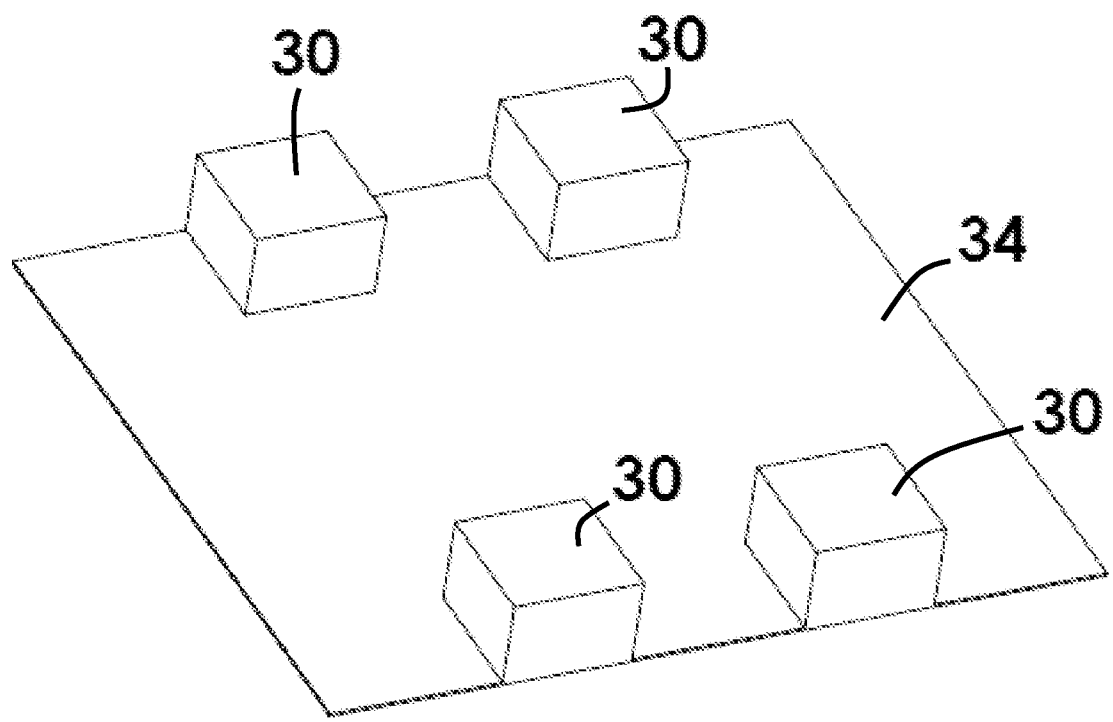
FIG. 30 is a bottom perspective view of an embodiment of a portable support of the present disclosure.

As shown in FIG. 25, in operation the one or more extension members 34 of one or more portable supports 30 are sandwiched between the one or more support members 12 and 13 and one or more bundles of roofing shingles 99 in a manner effective to suspend the one or more spacers 32 between the support members 12 and 13 during transport of one or more portable supports 30 together with the one or more bundles of roofing shingles 99 to one or more target surfaces, including, but not necessarily limited to one or more roofs 5 including one or more pitched roofs 5. As further shown in FIG. 25, one or more extension members 34 of this disclosure may be provided as planar rigid members or substantially planar rigid members. In another embodiment, one or more extension members 34 may be provided as non-planar rigid members or substantially non-planar rigid members. Planar type extension members 34 may include a perimeter shape as desired, e.g., a multi-sided perimeter as shown in FIG. 24B, a perimeter having one or more curved sides and/or one or more irregular shaped sides. As shown in FIG. 26, in another embodiment one or more extension members 34 may be provided as one or more flexible members whereby the opposing ends of the one or more extension members 34 of a portable support 30 may drop toward a roof 5 under gravity once the one or more support members 12 and 13 are separated from the portable support 30. In an embodiment including the transport of one or more portable supports 30 together with one or more bundles of roofing shingles 99 onto a peak 6 of roof 5, rigid or substantially rigid extension members 34 are suitably operationally configured to maintain their original shape as shown in FIG. 28, or flex in kind according to a degree of flex of the bottom surface 99A of one or more bundles of roofing shingles 99 in a manner effective to maintain a spacing 98 suitable for unobstructed withdrawal of the support members 12 and 13 apart from the one or more portable supports 30 and entry of the support members 12 and 13 to a contact position with one or more extension members 34 for further transport or adjustment of the one or more extension members 34 and/or one or more bundles of roofing shingles 99 thereon.

Figure 27A:
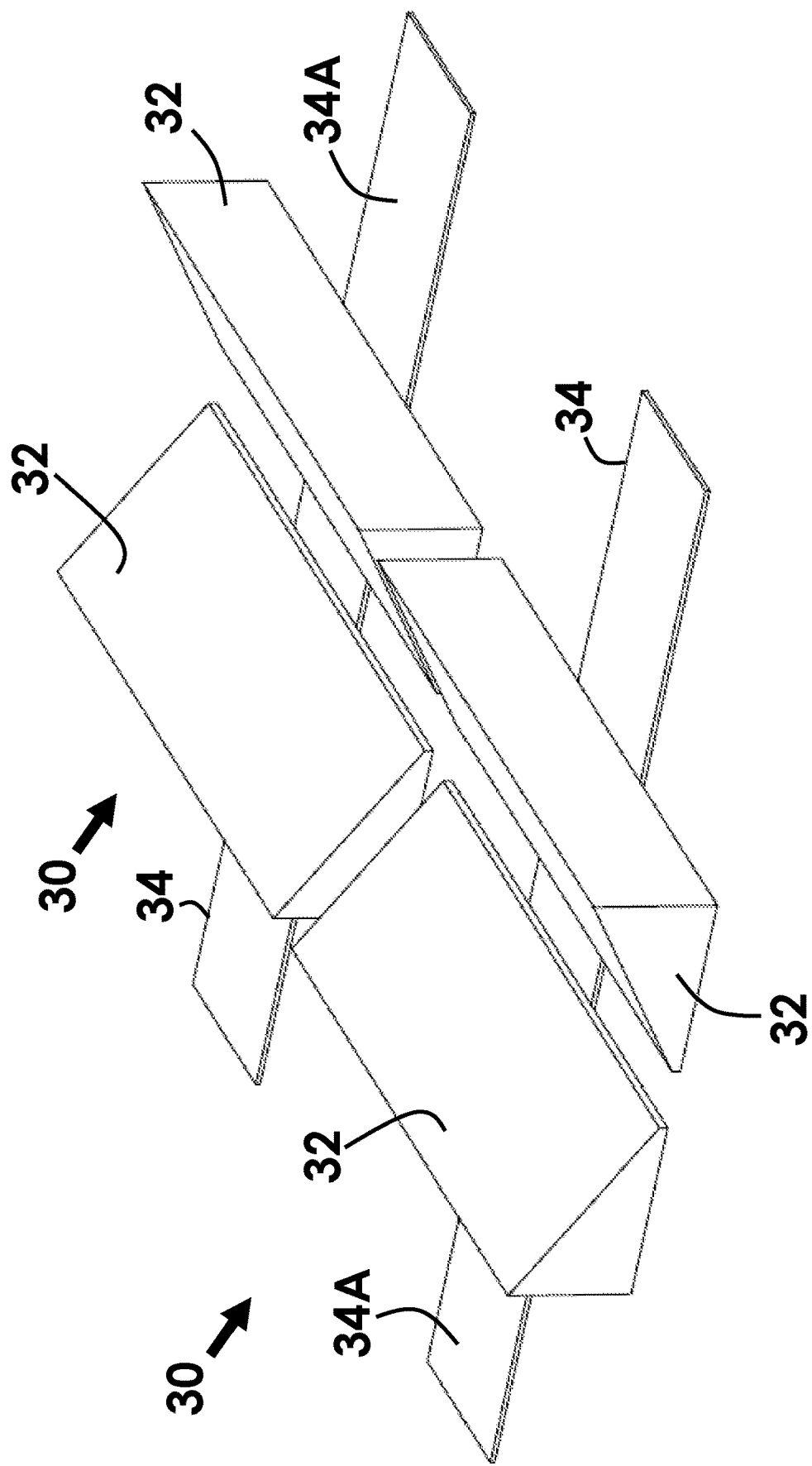
FIG. 27A is a bottom perspective view of an embodiment of two portable supports for use with a portable platform of FIG. 34.
Figure 27B:
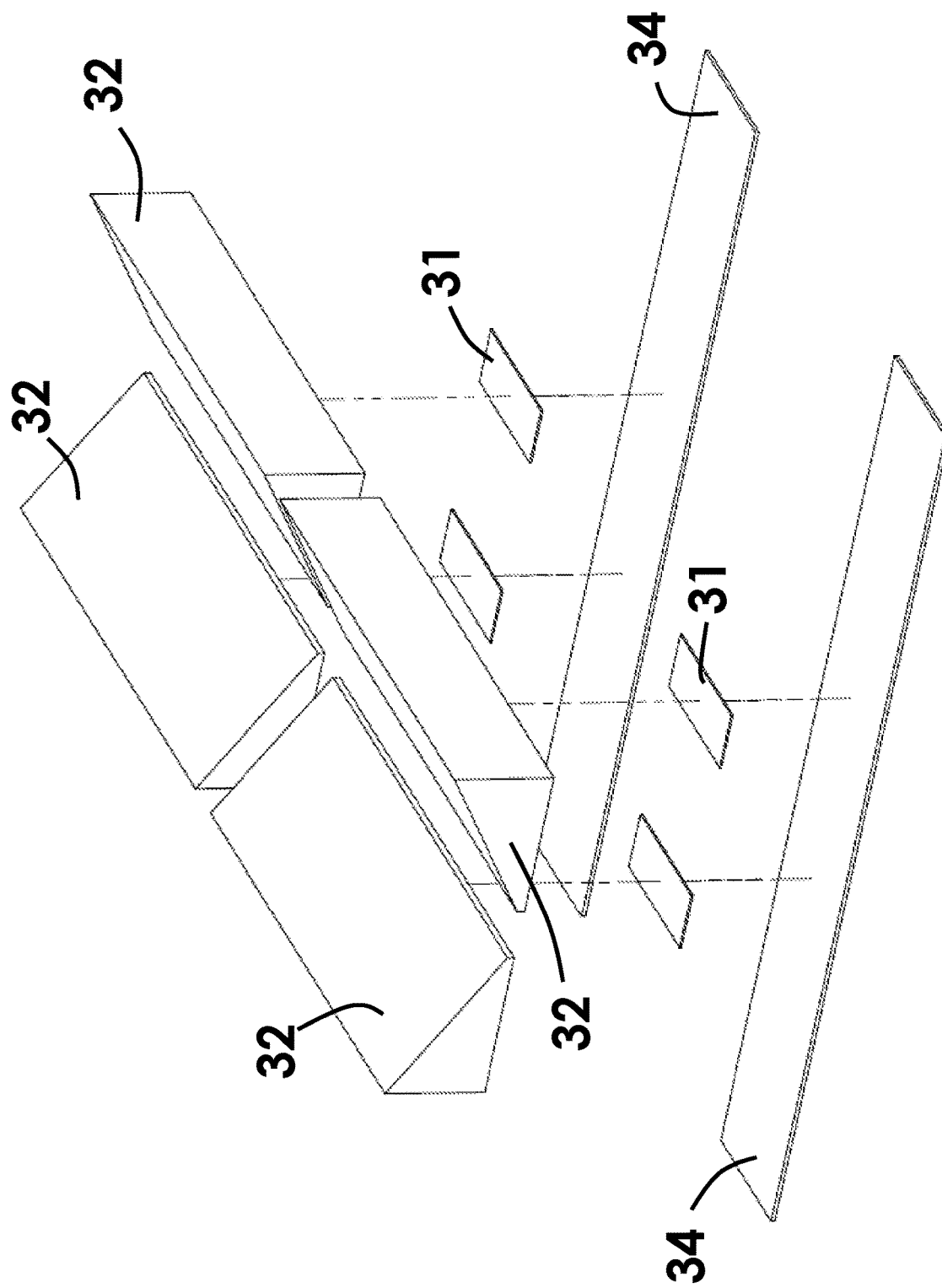
FIG. 27B is a bottom perspective exploded view of the portable supports of FIG. 27A.

Suitably, one or more spacers 32 may be releasably attached or permanently attached to one or more extension members 34 via one or more fasteners, one or more adhesives, one or more adhesive materials, and combinations thereof. Suitable fasteners may include, but are not necessarily limited to one or more hook and loop fasteners, nails, staples, tacks, snaps, buckles, pins, rivots, stitching, clamps, magnets, clips, clamps, barbed members, ties, threaded members, e.g., screws, bolts, and combinations thereof. As understood by the skilled artisan, adhesives may vary in bonding strength. As such, the one or more adhesives and/or adhesive materials of this disclosure suitably comprise a bonding strength effective to maintain an attachment between the one or more spacers 30 and the one or more extension members 34 during transport as described above. Suitable adhesives may include, but are not necessarily limited to acrylic adhesives, epoxy adhesives, e.g., one-part epoxy, two-part epoxy, urethane adhesives, anaerobic adhesives, polyurethane reactive adhesives (PUR adhesives), spray adhesive, glue, contact cement, and combinations thereof. Suitable adhesive materials 31 may include, but are not necessarily limited to double-sided or double-coated adhesive or bonding materials, e.g., double-coated adhesive tape, double-coated adhesive sheet material, and combinations thereof (see FIG. 27B). Double-sided or double-coated adhesive or bonding materials of this disclosure are commercially available from various sources including, but not necessarily limited to 3M Company, St. Paul, Minn., U.S.A.

In one embodiment, one or more fasteners and/or one or more adhesives and/or one or more adhesive materials 31 may be applied to one or more spacers 32 and/or one or more extension members 34 at the time of use of one or more portable supports 30, e.g., at an end user location 130. In another embodiment, one or more fasteners and/or one or more adhesives and/or one or more adhesive materials 31 may be applied to one or more spacers 32 and/or one or more extension members 34 at a point of manufacture 110, e.g., a shingle manufacturing facility, or a storage facility 120 such as a shingle distributor location. Suitably, a desired or otherwise required volume of one or more adhesives may be applied to one or more spacers 32 and/or one or more extension members 34 to provide one or more portable supports 30, e.g., via brush, spray, pouring, blotting, smearing, rubbing, and combinations thereof. Likewise, adhesive material 31 of a desired or otherwise required surface area may be applied to one or more spacers 32 and/or one or more extension members 34 to provide one or more portable supports 30.

In another embodiment, a portable support 30 may comprise one or more extension members 34 having one or more slotted surfaces operationally configured to receive one or more spacers 32 therein or vice versa. In another embodiment, a portable support 30 may comprise one or more spacers 32 with one or more apertures operationally configured to receive one or more extension members 34 there through. In another embodiment, one or more extension members 34 may include one or more female mating surfaces operationally configured to receive one or more spacers 32 therein, e.g., a pop connector configuration, a threaded connection.

For purposes of transport, wrapping material, e.g., plastic and/or paper wrapping materials, and/or strapping material and/or banding material and/or rope and/or cord, or the like may be used to secure the one or more bundles of roofing shingles 99 and corresponding one or more portable supports 30 as desired. In one embodiment, one or more portable supports 30 and one or more bundles of roofing shingles 99 may be placed onto a platform trailer 4 or the like via a fork lift or other lift for transport. In an embodiment where one or more portable supports 30 and one or more bundles of roofing shingles 99 are delivered from a point of manufacture 110 to a storage facility 120, a fork lift or other lift may remove one or more portable supports 30 and one or more bundles of roofing shingles 99 from the platform trailer 4 or the like for purposes of storage. Once the stored portable supports 30 and one or more bundles of roofing shingles 99 thereon are transported to an end user location 130 a lifting device 10 may transport the one or more portable supports 30 and one or more bundles of roofing shingles 99 together to a target surface, e.g., a peak 6 of a roof 5.

Without limiting the disclosure to one or more particular embodiments, to promote operable adherence of one or more spacers 32 to one or more extension members 34 during transport of one or more bundles of roofing shingles 99, each of the one or more spacers 32 suitably comprises a weight effective for use with the one or more adhesives and/or one or more adhesive materials 31 of a portable support 30. In one non-limiting embodiment for use with one or more bundles of roofing shingles 99, each of the one or more spacers 32 of a portable support 30 may comprise a weight of or about 1.4 kg (3.0 pounds) or less. In addition, the size and/or shape of one or more spacers 32 are not limited to any one configuration but may vary as desired. In addition, the location of one or more spacers 32 along one or more bottom surfaces 34A of one or more extension members 34 may also vary as desired. For example, regarding the transport of one or more bundles of roofing shingles 99 to one or more pitched roofs 5, the one or more spacers 32 may be operationally configured and located along one or more bottom surfaces 34A in a manner effective to support at least part of one or more bundles of roofing shingles 99 apart from a roof 5 as desired, e.g., see FIGS. 26 and 28.

The thickness or height of one or more extension members 34 of a portable support 30 may vary as desired. As such, in addition to the one or more spacers 32, one or more extension members 34 may also be operationally configured to contribute to the spacing 98 between a roof 5 and one or more bundles of roofing shingles 99, e.g., see FIGS. 26 and 28. In one embodiment of a portable support 30, the one or more extension members 34 may each comprise a uniform thickness. In another embodiment of a portable support 30, the one or more extension members 34 may each comprise a non-uniform thickness. In another embodiment of a portable support 30, one or more first extension members 34 may comprise a first thickness or thicknesses and one or more second extension members 34 may comprise a second thickness or thicknesses. Although a portable support 30 may be built to scale, in an embodiment operationally configured for use with one or more bundles of roofing shingles 99 the one or more extension members 34 may include a thickness ranging from or about 1.0 mm (0.039 inches) up to or about 7.62 (3.0 inches).

In one embodiment, a portable support 30 may be operationally configured for use with a plurality of roofs 5 of varying pitch. In another embodiment, a portable support 30 may be operationally configured for use with a roof 5 of a particular pitch. In addition, to elongated rectangular plank type spacers 32 as shown in FIG. 24A-26, other configurations of spacers 32 are herein contemplated including, but not necessarily limited to elongated three sided members or wedge shape members (see FIGS. 27A, 27B and 28), elongated semicircle members (see FIG. 29), elongated cylindrical members, elongated irregular shaped members, and combinations thereof. In another embodiment, one or more spacers 32 may be operationally configured to conform to one or more particular surface shapes of one or more target surfaces. As such, in one embodiment a portable support 30 may include two or more unlike spacer 32 configurations. In another embodiment, one or more spacers 32 may be provided as a plurality of individual members of one or more desired shapes and spaced apart as shown in the non-limiting examples of FIG. 27A and FIG. 30. As shown in FIGS. 24B, 27A, 29, and 30, the one or more opposing spacers 30 may be arranged in parallel or substantially parallel alignment. In another embodiment, the one or more opposing spacers 32 may be arranged in a non-parallel alignment effective for use with support members 12 and 13 of a lifting device 10 of this disclosure or other fork lift.

Figure 31:
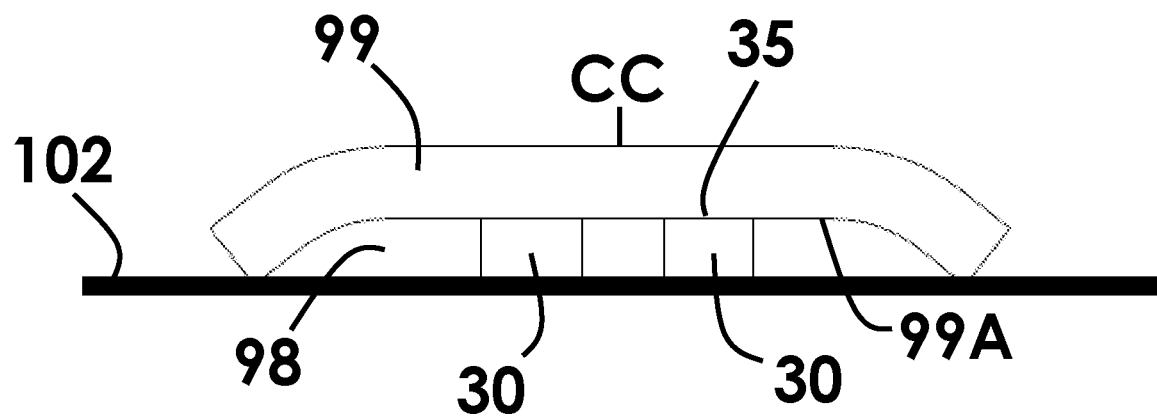
FIG. 31 illustrates portable supports located on a support surface and a bundle of roofing shingles on the portable supports.

In another embodiment, one or more portable supports 30 may be operationally configured to be transported to one or more target surfaces together with one or more bundles of roofing shingles 99 via a lifting device 10 without the use of one or more extension members 34. For example, one or more portable supports 30 may be attached directly to one or more bundles of roofing shingles 99 via one or more fasteners and/or one or more adhesives and/or one or more adhesive materials 31 as described above. In one embodiment, one or more portable supports 30 may be provided with one or more adhesive surfaces comprising one or more adhesives operationally configured to adhere to a bottom surface 99A of a bottommost row of one or more bundles of roofing shingles 99 effective for the one or more portable supports 30 to be transported together with the one or more bundles of roofing shingles 99 by a lifting device 10 to one or more target surfaces. With reference to FIG. 31, in one embodiment one or more portable supports 30 may be placed on a support surface 102 or the like in a desired arrangement whereby one or more rows of one or more bundles of roofing shingles 99 may be placed on top of the one or more portable supports 30 in a manner effective for adhesive and/or adhesive material 31 located on one or more upper surfaces 35 of the one or more portable supports 30 to adhere the one or more portable supports 30 to the bottom surface 99A of the bottommost row of one or more bundles of roofing shingles 99, i.e., adhere the one or more portable supports 30 to the outer packaging, e.g., plastic packaging, paper packaging, synthetic packaging, of one or more bundles of shingles 99 of the bottommost row of the one or more bundles of shingles 99. As further shown in FIG. 31, the one or more portable supports 30, the one or more bundles of roofing shingles 99 and the support surface 102 may cooperate to provide spacing 98 between the one or more bundles of roofing shingles 99 and the support surface 102, the spacing 98 being defined by a height and width operable for support members 12 and 13 of a lifting device 10 to be directed into the spacing 98 under the one or more bundles of roofing shingles 99 in a manner effective for a lifting device 10 to lift or otherwise transport the one or more bundles of roofing shingles 99 and one or more portable supports 30 attached thereto to a target surface, e.g., a roof 5 including a peak 6 of a pitched roof 5. Once the one or more bundles of roofing shingles 99 are lifted off from a support surface 102 via a lifting device 10 (see arrow F in FIG. 32), adhesive and/or adhesive material 31 disposed on the one or more upper surfaces 35 of the one or more portable supports 30 is operationally configured to maintain an attachment of the one or more portable supports 30 to the one or more bundles of roofing shingles 99 when suspended therefrom during transport to a target surface as shown. In an embodiment comprising at least two opposing portable supports 30, one or more bundles of roofing shingles 99 are suitably placed on the opposing portable supports 30 lengthwise with a midpoint CC of the one or more bundles of roofing shingles 99 located at or near a midpoint between the opposing portable supports 30 as shown in FIG. 31, i.e., a balanced position of one or more bundles of roofing shingles 99. When delivering the one or more portable supports 30 and one or more bundles of roofing shingles 99 to a peak 6 of the roof 5, the lifting device 10 is operationally configured to place the one or more portable supports 30 on opposing sides of the peak 6 equidistant or substantially equidistant from the peak 6 in a manner similar as depicted in FIG. 26 and FIG. 28 effective to provide a desired spacing 98 between at least part of a roof 5 and at least part of the bottommost row of the one or more bundles of roofing shingles 99. Depending on the one or more portable supports 30 provided for a given operation, the spacing 98 realized may be established according to one or more of the following: a pitch of a target roof 5, the amount of flex or bend for one or more bundles of roofing shingles 99, the amount of flex or bend for one or more portable supports 30, the size, e.g., the height, width, length, of one or more portable supports 30, the shape of one or more portable supports 30, the thickness of one or more extension members 34, the one or more materials of construction of the one or more portable supports 30, the weight of a load of one or more bundles of roofing shingles 99 placed on one or more portable supports 30, the compression strength for one or more portable supports 30, and combinations thereof. The amount of flex or bend for one or more bundles of roofing shingles 99 may vary according to the size or length of one or more bundles of roofing shingles 99, the type of one or more bundles of roofing shingles 99, the material(s) of construction of one or more bundles of roofing shingles 99, the material(s) of construction of the outer packaging of one or more bundles of roofing shingles 99, the manufacturing process of one or more bundles of roofing shingles 99, and combinations thereof.

In one embodiment, one or more adhesives and/or one or more adhesive materials 31 may be applied to one or more upper surfaces 35 of one or more portable supports 30 at the time of use of the one or more portable supports 30 similar as described above. In one embodiment, one or more adhesives and/or one or more adhesive materials 31 may be placed on one or more portable supports 30 at a point of manufacture 110, e.g., a shingle manufacturing facility, or a storage facility 120 such as a shingle distributor location, similar as described above. Once a desired or otherwise required volume of one or more adhesives and/or desired or otherwise required surface area of one or more adhesive materials 31 are applied to the one or more portable supports 30, one or more bundles of roofing shingles 99 may be placed on top of the one or more portable supports 30 as shown in FIG. 31.

Similar as described above, wrapping material may be used to secure the one or more bundles of roofing shingles 99 and one or more portable supports 30 during transport. Suitably, the combination of one or more portable supports 30 and one or more bundles of roofing shingles 99 may be placed onto a platform trailer 4 or the like via a fork lift or other lift for transport. In an embodiment where the one or more portable supports 30 and one or more bundles of roofing shingles 99 are delivered from a point of manufacture 110 to a storage facility 120, a fork lift or other lift may remove the combination of one or more portable supports 30 and one or more bundles of roofing shingles 99 from the platform trailer 4 or the like for purposes of storage. Once the one or more portable supports 30 and one or more bundles of roofing shingles 99 are transported to an end user location 130, a lifting device 10 may transport the one or more bundles of roofing shingles 99 together with the one or more portable supports 30 to a target surface, e.g., a roof 5 including a peak 6 of a pitched roof 5.

Figure 33A:
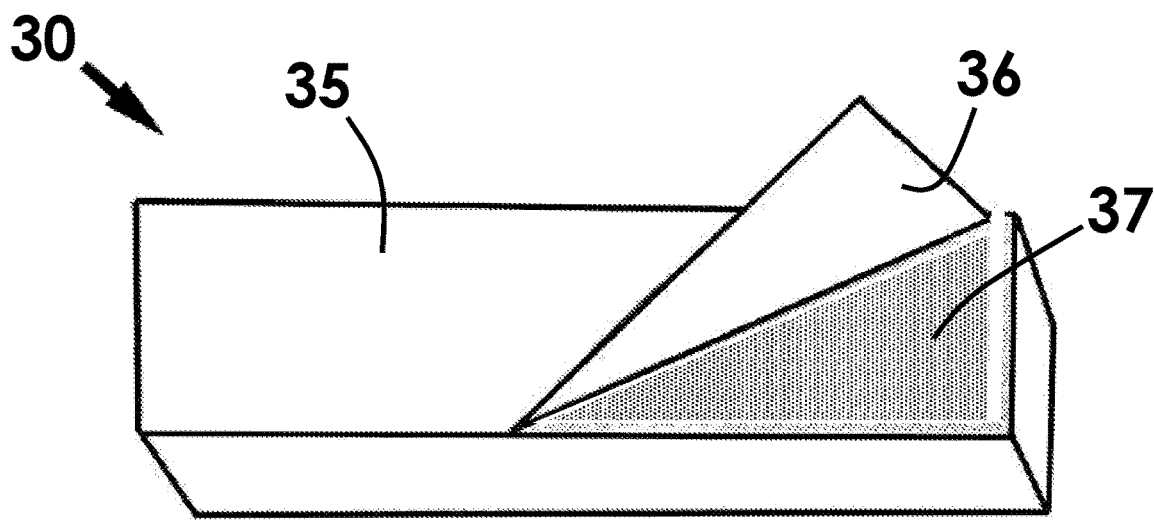
FIG. 33A is a top perspective view of an embodiment of a portable support including a peel-off layer partially peeled away from the portable support.
Figure 33B:
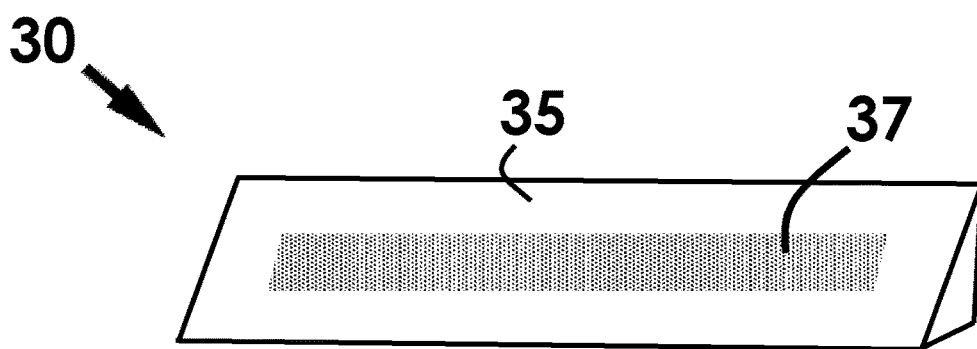
FIG. 33B is a top perspective view of an embodiment of a portable support.
Figure 34:
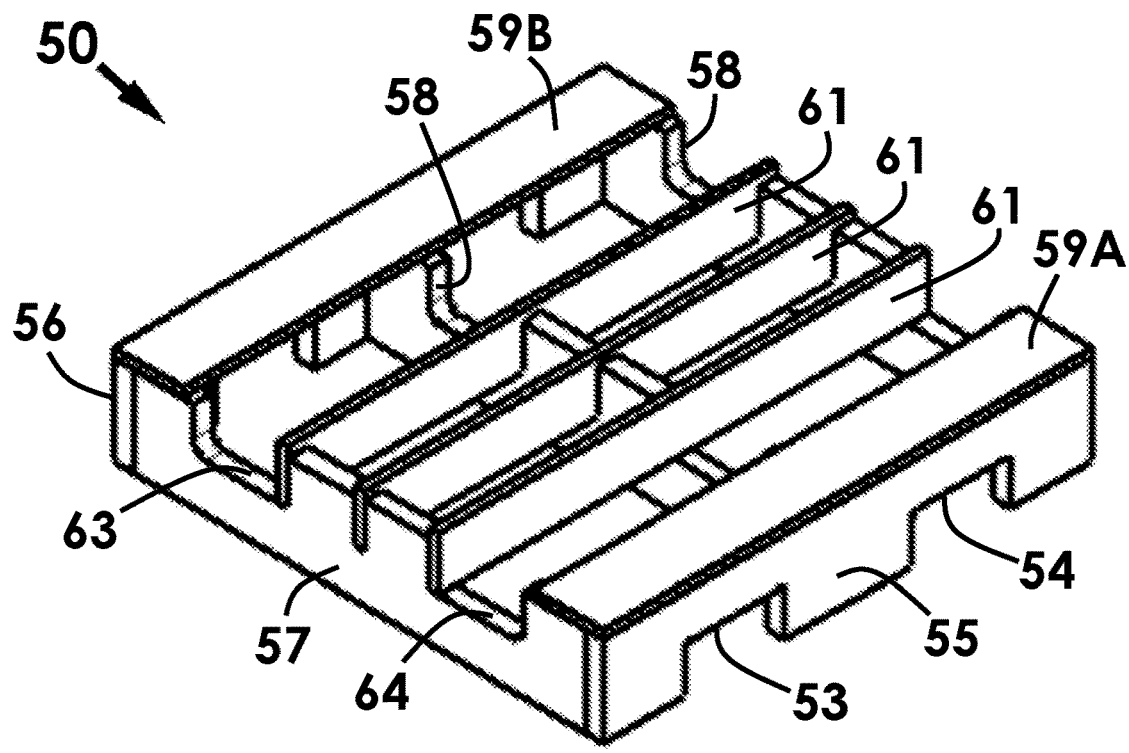
FIG. 34 is a front perspective view of an embodiment of a portable platform of the present disclosure.
Figure 35:
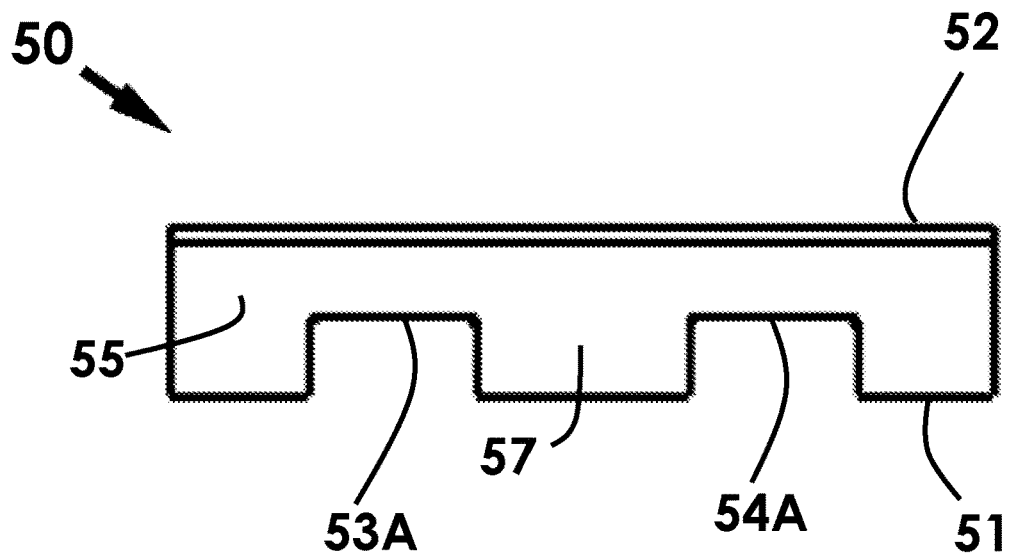
FIG. 35 is a front elevation view of the portable platform of FIG. 34.
Figure 36:
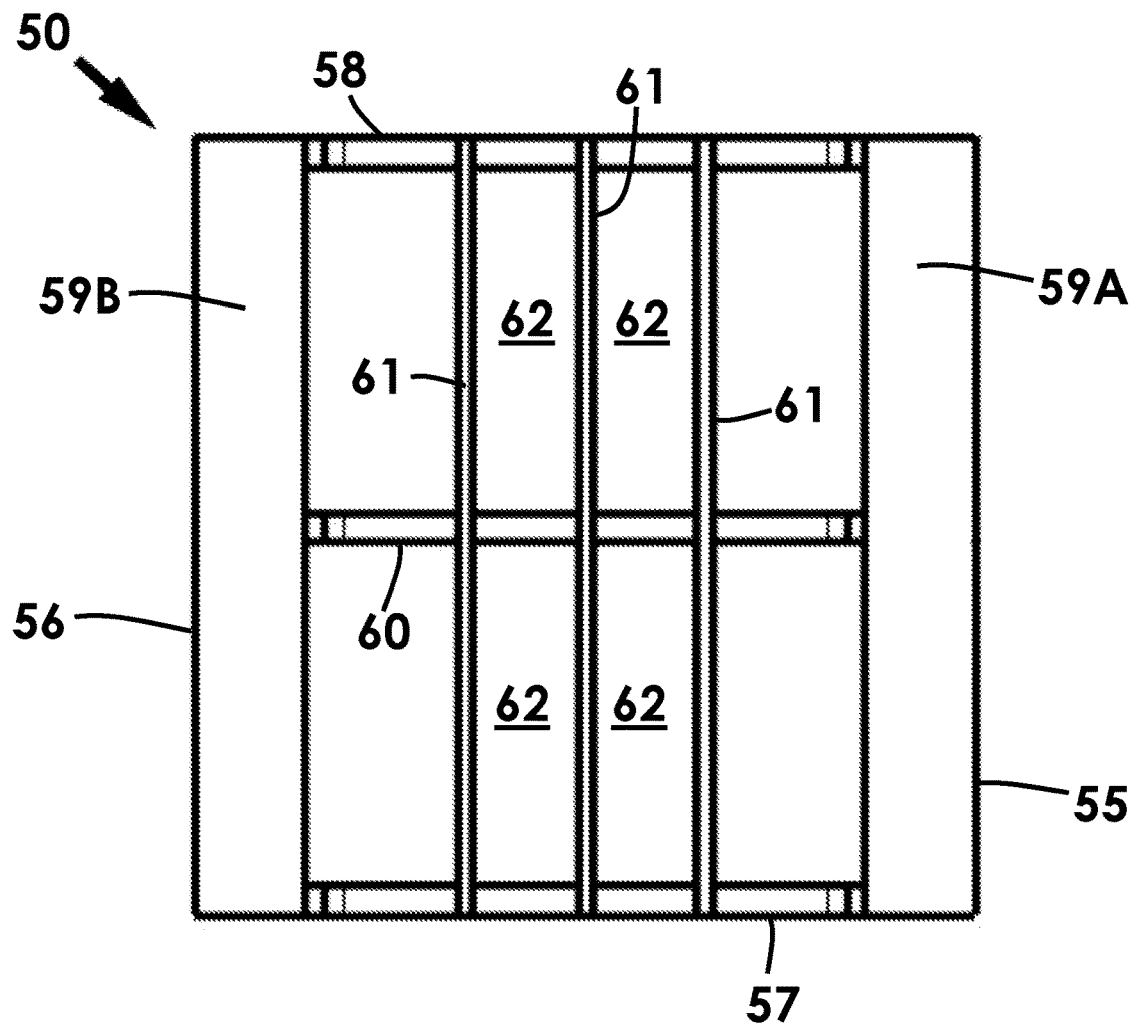
FIG. 36 is a top view of the portable platform of FIG. 34.

In another embodiment, one or more portable supports 30 may include one or more upper surfaces 35 comprising one or more adhesive surfaces 37 as shown in FIGS. 33A and 33B. As shown in FIG. 33A, one or more portable supports 30 may include one or more peel-off layers or release liners 36 operationally configured to cover one or more adhesive surfaces 37 and expose the one or more adhesive surfaces 37 once the one or more release liners 36 are removed from the one or more portable supports 30.

In another embodiment, one or more portable supports 30 may comprise one or more adhesive materials 31 similar as described above in reference to FIG. 27B. One or more adhesive materials 31 may be applied to the one or more portable supports 30 at a point of manufacture of the one or more portable supports 30 or applied at a different location prior to adhering one or more portable supports 30 to one or more bundles of roofing shingles 99. In one embodiment, one or more adhesive materials 31 may be applied to one or more portable supports 30 at a point of manufacture 110 of bundles of roofing shingles 99 and/or at one or more storage facilities 120 of bundles of roofing shingles 99 and/or at one or more end user locations 130.

Figure 32:
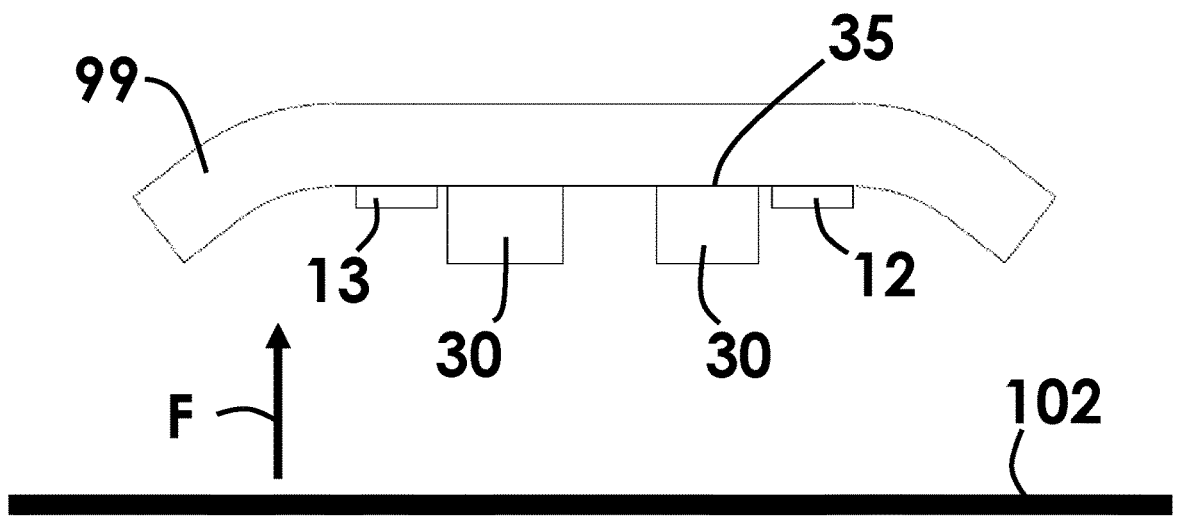
FIG. 32 illustrates the portable supports and bundle of roofing shingles of FIG. 31 lifted off from the support surface via a lifting device of this disclosure.

In another embodiment, one or more adhesive surfaces 37 of one or more adhesives and/or one or more adhesive materials 31 may be applied to one or more outer surfaces of one or more bundles of roofing shingles 99 whereby the one or more bundles of roofing shingles 99 may be placed on one or more portable supports 30 in a manner effective to adhere the one or more portable supports 30 to the one or more bundles of roofing shingles 99. Regardless the type of adhesive application employed, the one or more adhesive surfaces are operationally configured to form an operable adhesive connection between one or more portable supports 30 and one or more bundles of roofing shingles 99 as shown in FIG. 32.

The one or more portable supports 30, including one or more spacers 32 and one or more extension members 34, may be constructed from one or more materials including, but not necessarily limited to one or more materials resistant to chipping, cracking, tearing, undesired bending and undesired reshaping as a result of ozone, weathering, heat, moisture, other outside mechanical influences and/or chemical influences, as well as physical impacts. Suitable materials of construction of one or more portable supports 30 as depicted in FIGS. 23A and 23B and also one or more spacers 32 of this disclosure may include, but are not necessarily limited to one or more metals, plastics, rubbers, paper and/or paper based materials, e.g., cardboard, ceramic materials, composite materials, fiber reinforced plastics, woods, bamboos, rock and/or other earth based materials such as brick and/or concrete, and/or clay, textiles, sponge materials, corks, polycarbonates, foams, and combinations thereof. Suitable materials of construction of the one or more extension members 34 may include, but are not necessarily limited to one or more metals, plastics, rubbers, paper and/or paper based materials, e.g., cardboard, ceramic materials, composite materials, fiber reinforced plastics, woods, bamboos, textiles, foams, corks, polycarbonates, synthetic materials, and combinations thereof. In an embodiment of a portable support 30 comprising one or more puncture forming fasteners, the one or more extension members 34 may be constructed from one or more puncturable materials and/or comprise one or more pop-out sections providing one or more apertures operationally configured to receive one or more puncture forming fasteners there through. Suitable metals for one or more portable supports 30, including one or more spacers 32 and one or more extension members 34, include, but are not necessarily limited to aluminum, copper, nickel, brass, alloy steel, carbon steel, titanium, and combinations thereof. Suitable plastics for one or more portable supports 30, including one or more spacers 32 and one or more extension members 34, include, but are not necessarily limited to thermoplastics such as polyvinyl chloride ("PVC"), chlorinated polyvinyl chloride ("CPVC"), UHN4W polyethylene, high density polyethylene ("HDPE"), low density polyethylene ("LDPE"), polypropylene, and combinations thereof. Suitable foams for one or more portable supports 30, including one or more spacers 32 and one or more extension members 34, include, but are not necessarily limited to closed cell foam, open cell foam, and combinations thereof. Suitable closed cell foam may include neoprene foam, polystyrene foam, polyethylene foam, e.g., high-density polyethylene foam and/or low-density polyethylene foam, and combinations thereof. Suitable open cell foam may include polyurethane foam. Suitable textiles for one or more portable supports 30, including one or more spacers 32 and one or more extension members 34, include, but are not necessarily limited to textiles comprising animal based fibers, plant based fibers, mineral based fibers, synthetic fibers, and combinations thereof. Non-limiting examples of animal based fibers 20 include wool, mohair, silk, and combinations thereof. Non-limiting examples of plant based fibers include bamboo, cotton, linen, hemp, jute, ramie, and combinations thereof. Non-limiting examples of mineral based fibers include asbestos cloth, glass fiber, and combinations thereof. Non-limiting examples of synthetic fibers include acrylic, nylon, polyester, spandex, rayon, and combinations thereof.

In one embodiment, the one or more portable supports 30 may be constructed from one or more environmentally friendly biodegradable materials and/or one or more non-flammable materials. Also, one or more portable supports 30 may be provided in one or more colors and/or color patterns as desired or as may otherwise be required for one or more particular uses. The one or more portable supports 30 may also include one or more glow in the dark materials and/or one or more fluorescent colors. In addition, the one or more portable supports 30 may include one or more reflectors or reflective materials. In one embodiment, one or more extension members 34 may include one or more grommets and/or one or more eyelets. In another embodiment, one or more extension members 34 may be provided as one or more straps and/or ropes and/or cables and/or wire material and/or mesh material. In another embodiment, one or more extension members 34 may be provided as one or more cylindrical members, e.g., one or more elongated solid rods or tubes.

In one embodiment, the one or more materials of construction of one or more portable supports 30 may be subject to compression or other reshaping under a load such as weight force applied to the one or more portable supports 30 by one or more bundles of roofing shingles 99. As such, the one or more portable supports 30 are effective to maintain spacing 98 for operable use of the one or more support members 12 and 13 as described above when under a load. As an example, one or more portable supports 30 subject to compression or other reshaping under load may be provided in one or more sizes and/or shapes to provide a desired spacing 98 when under load.

With reference to FIGS. 34-37, a system 100 of this disclosure may also comprise one or more portable platforms 50 operationally configured for assembly with one or more portable supports 30 for transporting one or more items including, but not necessarily limited to one or more building materials to one or more target surfaces. A portable platform 50 of this disclosure is operationally configured to be transported via a fork lift and/or pallet truck in a manner similar as a pallet 3, skid or other portable support device known in the art used for storing and transporting goods. As described below, a portable platform 50 of this disclosure is also operationally configured to be transported via a lifting device 10 of this disclosure. As such, a portable platform 50 of this disclosure suitably includes (1) a planar or substantially planar bottom surface 51 operationally configured to be placed on a planar or substantially planar support surface 102, (2) a planar or substantially planar upper surface 52 operationally configured to support one or more items thereon including building materials and/or other items and (3) planar or substantially planar side surfaces comprising lower fork pockets 53 and 54 or the like operationally configured to receive fork tines of a fork lift, forks of a pallet truck, and support members 12 and 13 of a lifting device 10 therein.

In one embodiment, a portable platform 50 of this disclosure may be provided as a single or one-piece item formed via a mold or computer numerical control ("CNC") machining. In an embodiment of a portable platform 50 as shown in FIGS. 34-37, a portable platform 50 of this disclosure may be provided as an assembly of parts including a front side member 55, a rear side member 56, a right side member 57 and a left side member 58 defining a perimeter of the portable platform 50. A portable platform 50 of this embodiment also includes one or more decking members 59A, 59B defining at least part of an upper surface 52 of the portable platform 50, a center structural support member ("center support member 60") and one or more inner runner members 61 defining at least part of the upper surface 52 of the portable platform 50, the one or more elongated inner runner members 61 forming one or more openings referred to herein as cavities 62 (see FIG. 36) operationally configured to receive one or more portable supports 30 therein or one or more spacers 32 of one or more portable supports 30 therein as described below.

Figure 37:
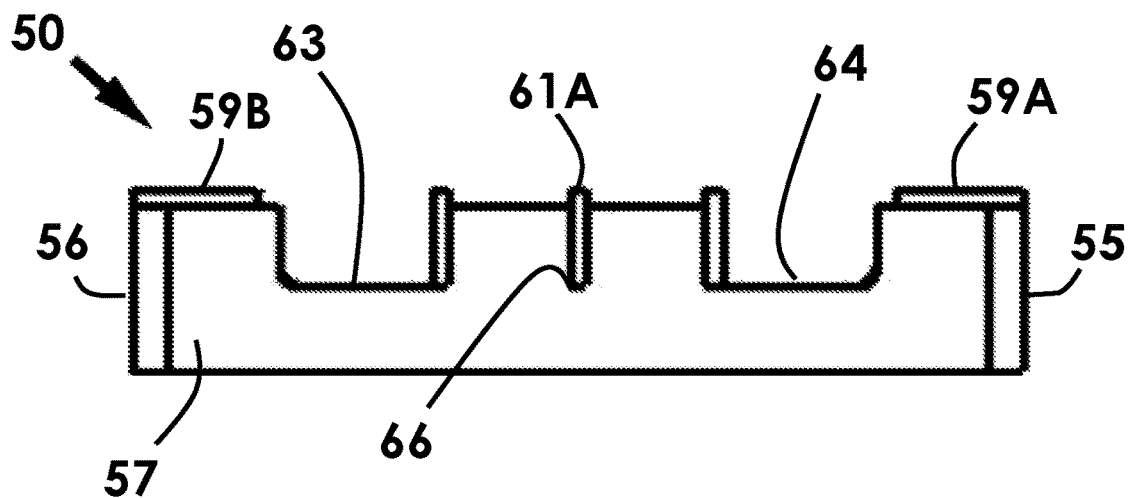
FIG. 37 is a right side elevation view of the portable platform of FIG. 34.

In the embodiment of FIGS. 34-37, the portable platform 50 includes (1) a front decking member 59A disposed along the top of the front side member 55, part of the right side member 57, part of the center support member 60 and part of the left side member 58 and (2) a rear decking member 59B disposed along the top of the rear side member 56, part of the right side member 57, part of the center support member 60 and part of the left side member 58. In addition, the right side member 57, the center support member 60 and the left side member 58 may include one or more cutout sections 66 operationally configured as abutment surfaces to receive bottom parts of the one or more runner members 61 therein. In this embodiment, the portable platform 50 includes three inner runner members 61 disposed lengthwise perpendicular to the right side member 57, the center support member 60 and the left side member 58. As shown in FIG. 37, the upper surfaces 61A of the three inner runner members 61 terminate at the same or about the same elevation as the upper surface of the front and rear decking members 59A, 59B providing a planar type upper surface 52. In another embodiment, the one or more runner members 61 may include shorter members attached in a manner effective to be disposed lengthwise perpendicular to the right side member 57, the center support member 60 and the left side member 58.

In this embodiment of a portable platform 50, the front side member 55 and the rear side member 56 comprise first fork pockets 53 and 54 (or "lower fork pockets 53 and 54") operationally configured to receive fork tines of a fork lift, forks of a pallet truck, and support members 12 and 13 of a lifting device 10 in a manner effective to transport the portable platform 50 as desired. In this embodiment of a portable platform 50, the front side member 55 and the rear side member 56 include cutout sections 53A and 54A defining the lower fork pockets 53 and 54. In another embodiment, the front side member 55 and/or the rear side member 56 may include apertures for receiving fork tines of a fork lift, forks of a pallet truck, and support members 12 and 13 there through.

Figure 47:
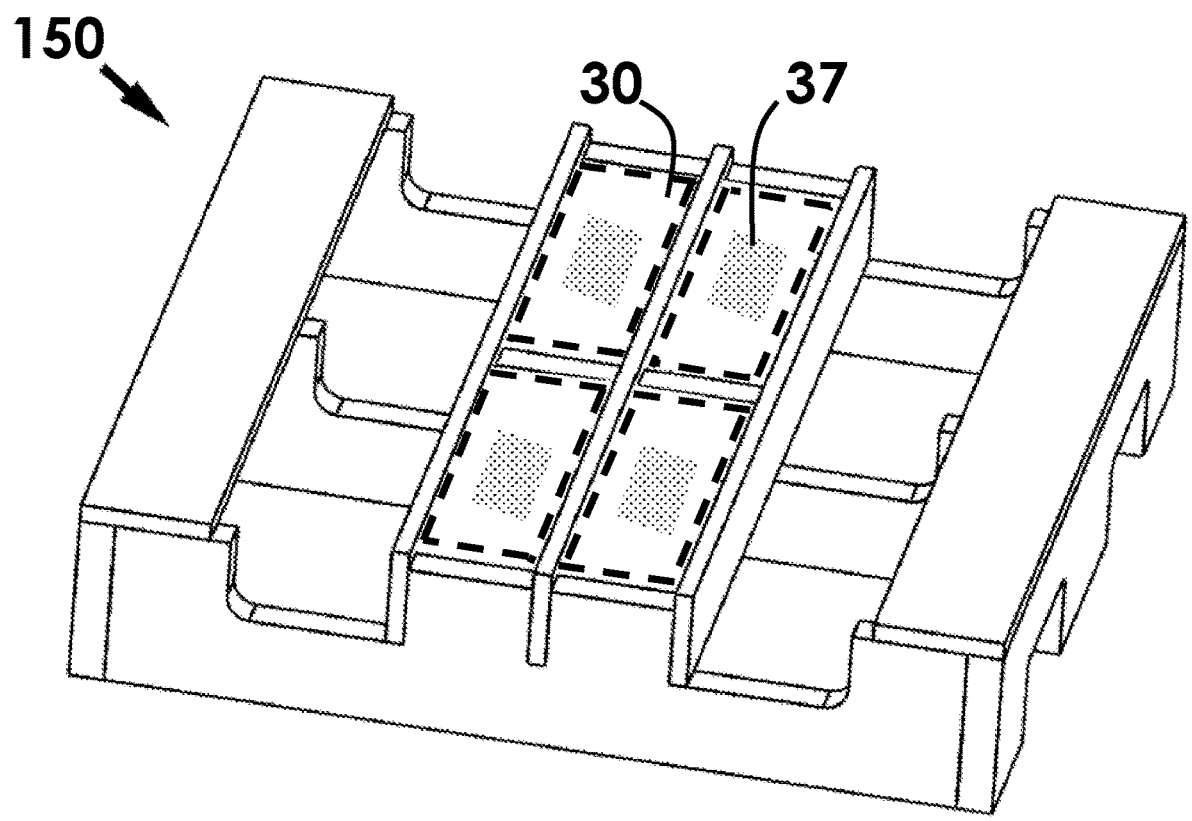
FIG. 47 is a top perspective view of the portable platform assembly of FIG. 46.

Referring to FIG. 37, the right side member 57, the center support member 60 and the left side member 58 of this embodiment of a portable platform 50 include cutout sections forming parallel channel type configurations defining second fork pockets 63 and 64 (or "upper fork pockets 63 and 64") of the portable platform 50 operationally configured to receive fork tines of a fork lift, forks of a pallet truck, and support members 12 and 13 of a lifting device 10 in a manner effective for a fork lift, pallet truck and lifting device 10 to lift and/or transport one or more items including, but not necessarily limited to one or more building materials off from the portable platform 50. As stated above, the one or more cavities 62 are operationally configured to receive one or more portable supports 30 including one or more spacers 32 of one or more portable supports 30 therein providing a portable platform assembly 150 of this disclosure (see FIGS. 47 and 48). Suitably, the upper fork pockets 63 and 64 of a portable platform assembly 150 are operationally configured to receive fork tines of a fork lift, forks of a pallet truck, and support members 12 and 13 of a lifting device 10 in a manner effective for a fork lift, pallet truck and lifting device 10 to lift and/or transport or otherwise remove one or more portable supports 30 apart from the portable platform 50 together with any one or more items located on top of the one or more portable supports 30. Herein, a portable platform assembly 150 may also be referred to as a multi-part portable platform including (1) a first part, e.g., a portable platform 50, operationally configured as a base member of the multi-part portable platform, and (2) a second part, e.g., one or more portable supports 30 operationally configured as a removable member of the multi-part portable platform operationally configured to be removed from the first part and transported to one or more target locations, e.g., a roof 5 including a peak 6 of a pitched roof 5, as described herein.

Figure 38:
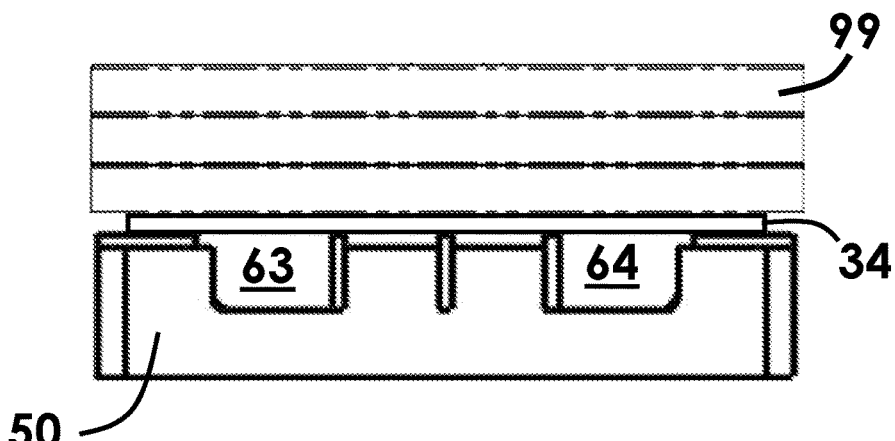
FIG. 38 is a right side elevation view of a portable platform assembly including the portable platform of FIG. 34 with three rows of bundles of roofing shingles on the portable platform assembly.
Figure 39:
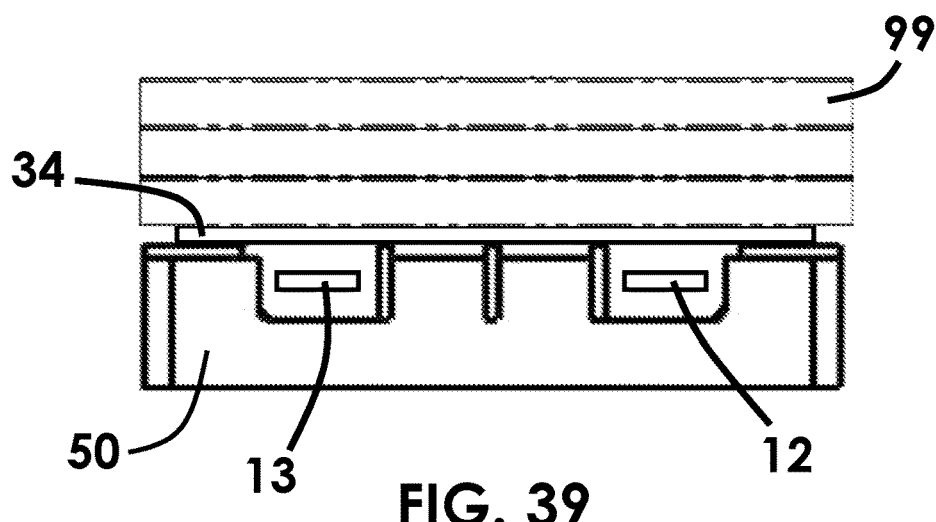
FIG. 39 is a right side elevation view of the portable platform assembly of FIG. 38 including support members of a lifting device of this disclosure mated with second fork pockets of the portable platform assembly.
Figure 40:
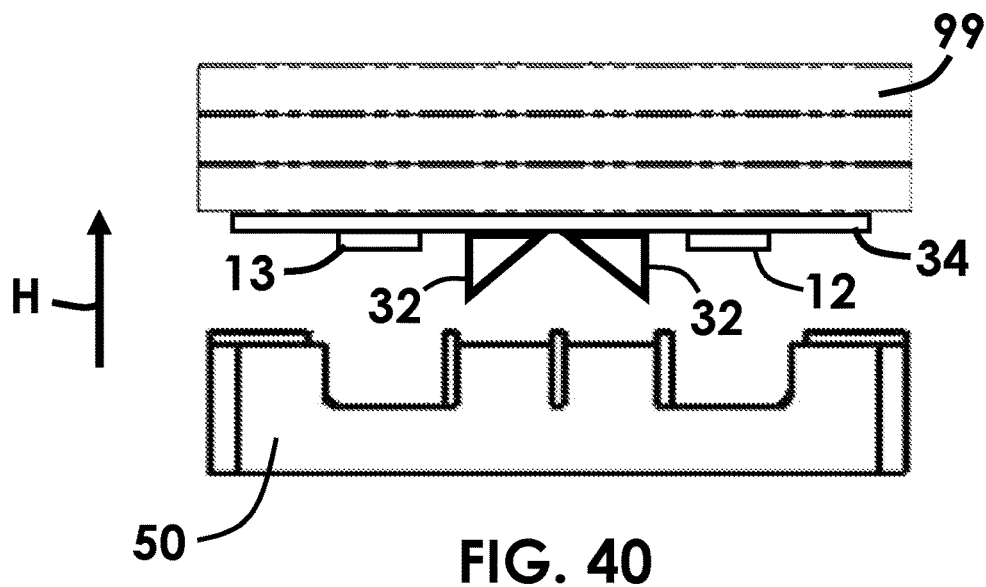
FIG. 40 is a right side elevation view of the portable platform assembly of FIG. 39 illustrating the support members of a lifting device directing a portable support of the portable platform assembly and the three rows of bundles of roofing shingles apart from a portable platform of the portable platform assembly.

With reference to FIGS. 38-40, in an embodiment of a system 100 of this disclosure including a portable platform assembly 150 comprising a portable platform 50 and a portable support 30 combination operationally configured to transport one or more bundles of roofing shingles 99, the one or more extension members 34 of the portable support 30 suitably extend over at least part of the upper fork pockets 63 and 64 in a manner effective for support members 12 and 13 to contact one or more bottom surfaces 34A of the one or more extension members 34 when the support members 12 and 13 are directed upward (see arrow H) to lift and remove the one or more bundles of roofing shingles 99 and the portable support 30 from the portable platform 50, i.e., lift and remove the spacers 32 of the portable support 30 from the one or more cavities 62 of the portable platform 50. Suitably, the weight of the one or more bundles of roofing shingles 99 under gravity is effective to sandwich the one or more extension members 34 against the support members 12 and 13 to hold the portable support 30 in a fixed position as shown in FIG. 40 until the portable support 30 and the one or more bundles of roofing shingles 99 are placed or otherwise unloaded from the lifting device 10 onto a peak 6 of the roof 5.

Figure 41:
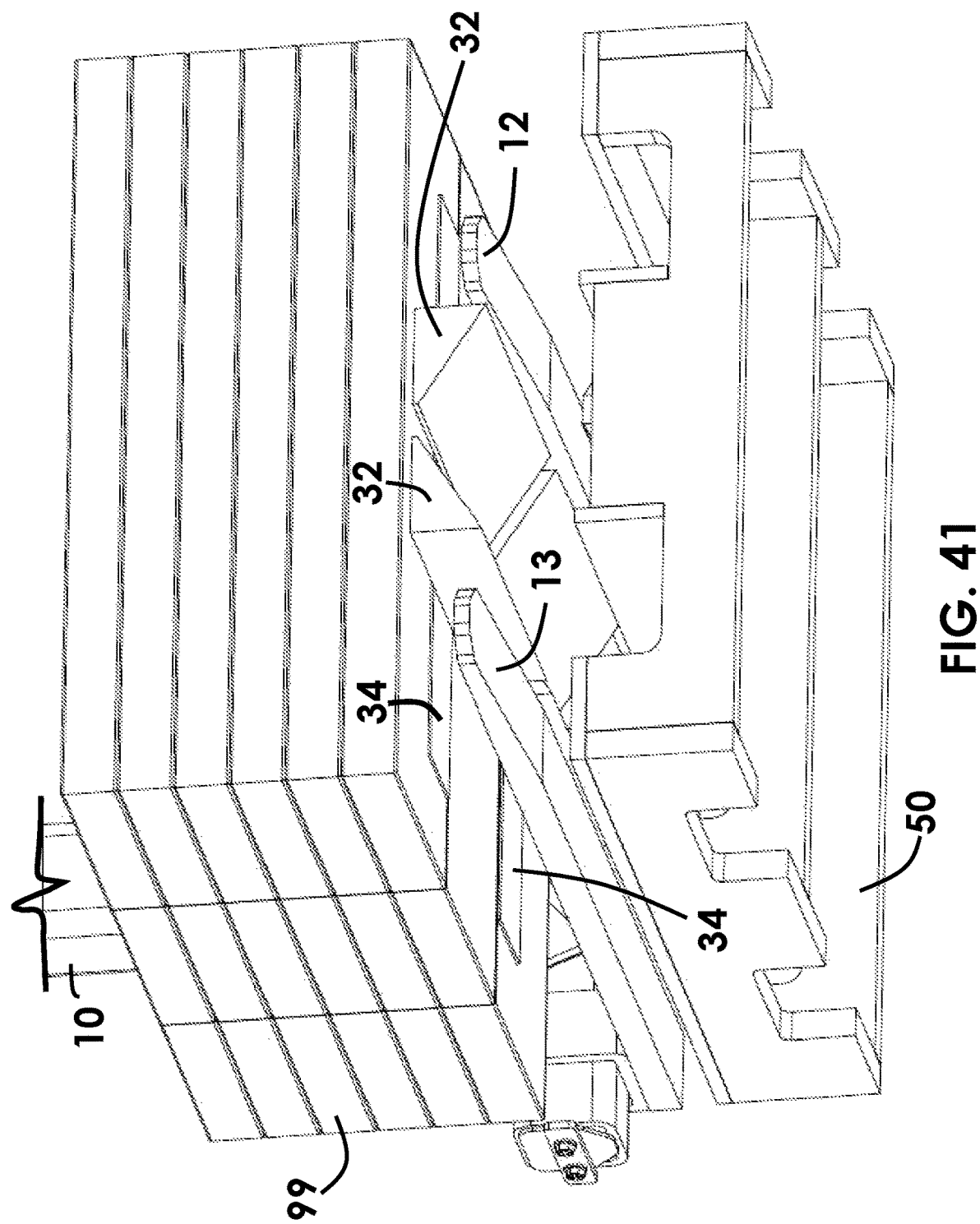
FIG. 41 is a bottom perspective view of an embodiment of a portable platform assembly of the present disclosure including the portable supports of FIG. 27A and six rows of bundles of roofing shingles separated from a portable platform of the portable platform assembly by support members of a lifting device of this disclosure.

In an embodiment of a portable support assembly 32 comprising a single extension member 34 of a rectangular shape as shown in FIG. 24B, the extension member 34 may include a perimeter of a size up to the size of the perimeter of a corresponding portable platform 50. In another embodiment, one or more extension members 34 may be provided in a minimal size effective for use with fork tines of a fork lift, forks of a pallet truck, and support members 12 and 13 of a lifting device 10 as shown in FIGS. 38-40. For example, as shown in FIG. 41 one or more extension members 34 of one or more portable support assemblies 32 may comprise a width less than the width of the corresponding one or more portable supports 30 (also see the portable support assemblies 32 of FIGS. 27A and 27B, which are operationally configured for use with a portable platform 50 as shown in FIGS. 34-37).

Figure 42:
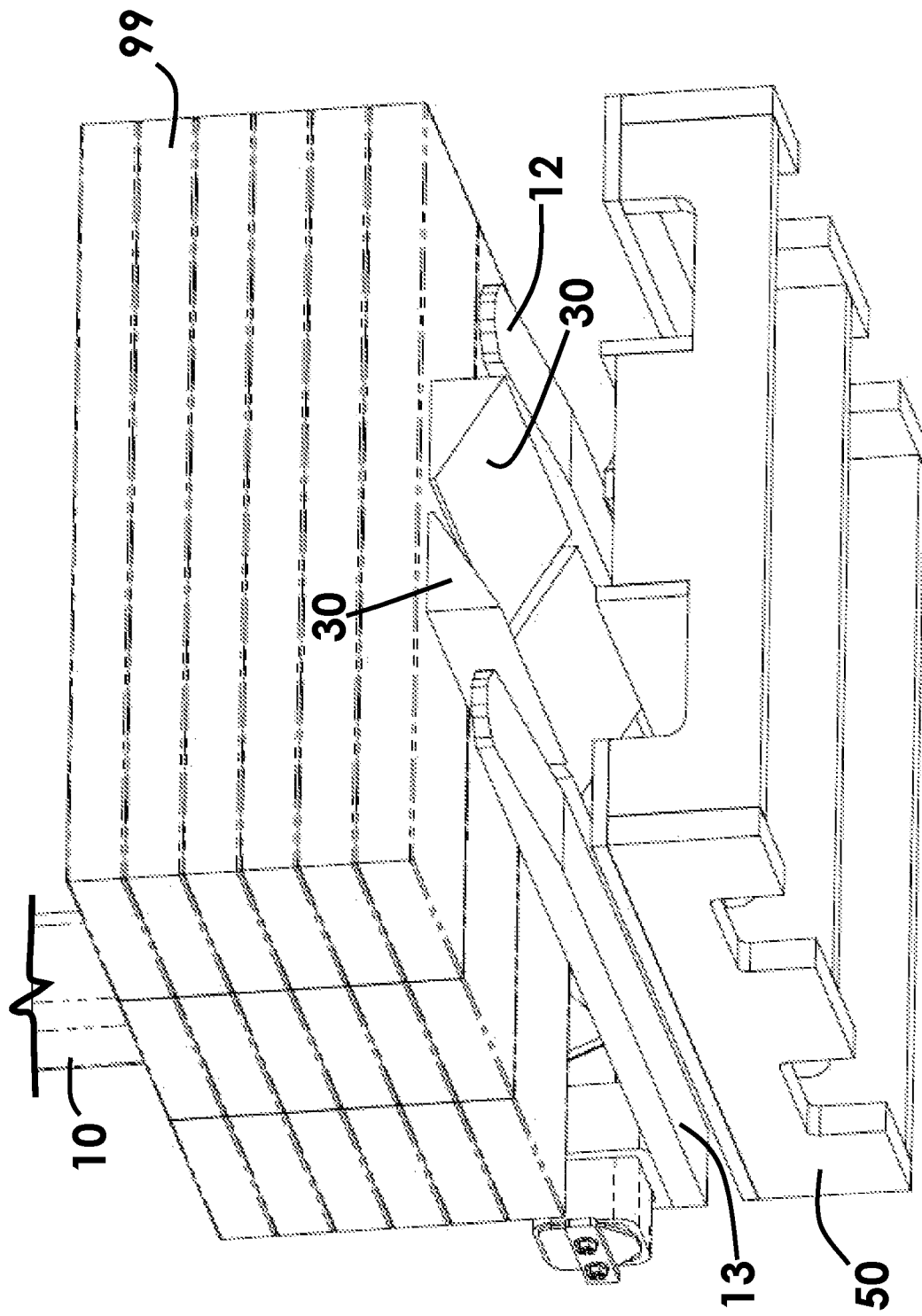
FIG. 42 is a bottom perspective view of an embodiment of a portable platform assembly of the present disclosure including four portable supports adhered to a bottommost row of six rows of bundles of roofing shingles separated from a portable platform of the portable platform assembly by support members of a lifting device of this disclosure.
Figure 48:
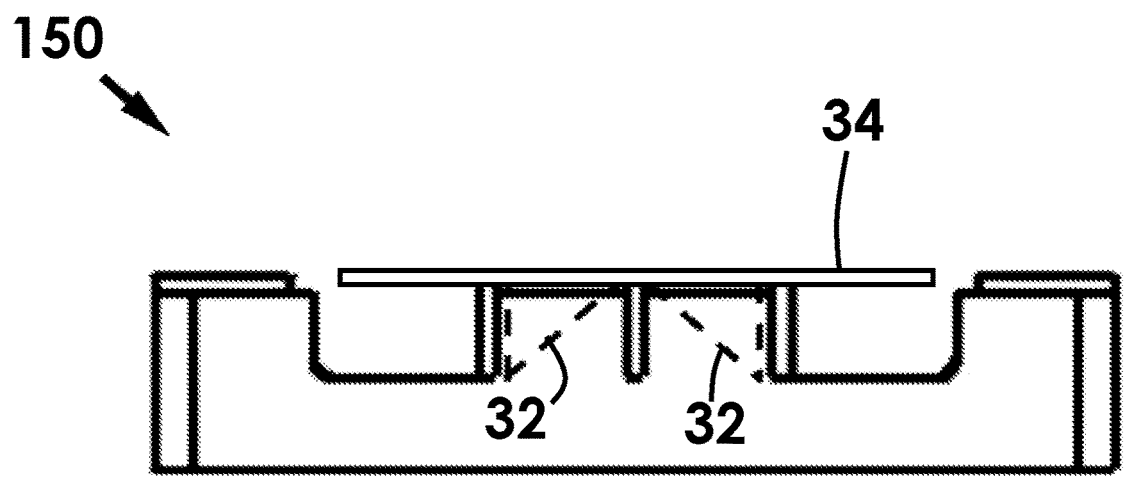
FIG. 48 is a right side elevation view of an embodiment of a portable platform assembly including the portable platform of FIG. 46.

In one embodiment of a portable platform assembly 150 comprising one or more portable supports 30 including one or more extension members 34 and one or more spacers 32 the one or more cavities 62 of a portable platform 50 may be provided as closed bottom, partially closed bottom or open bottom cavities operationally configured to receive one or more spacers 32 therein suspended from or by the one or more extension members 34 (see FIG. 48). In one embodiment of a portable platform assembly 150 comprising one or more portable supports 30 having one or more adhesive surfaces 37 and/or one or more adhesive materials 31 each of the one or more cavities 62 of the portable platform 50 may include a floor or one or more catch type surfaces operationally configured to hold the one or more portable supports 30 within the cavities 62 at an elevation effective for one or more bundles of roofing shingles 99 placed on the portable platform 50 to contact and adhere to the one or more portable supports 30 in a manner effective for the one or more portable supports 30 to be removed from the one or more cavities 62 when the one or more bundles of roofing shingles 99 are removed from the portable platform 50 via a fork lift, pallet truck or lifting device 10 (see FIG. 42).

Figure 43:
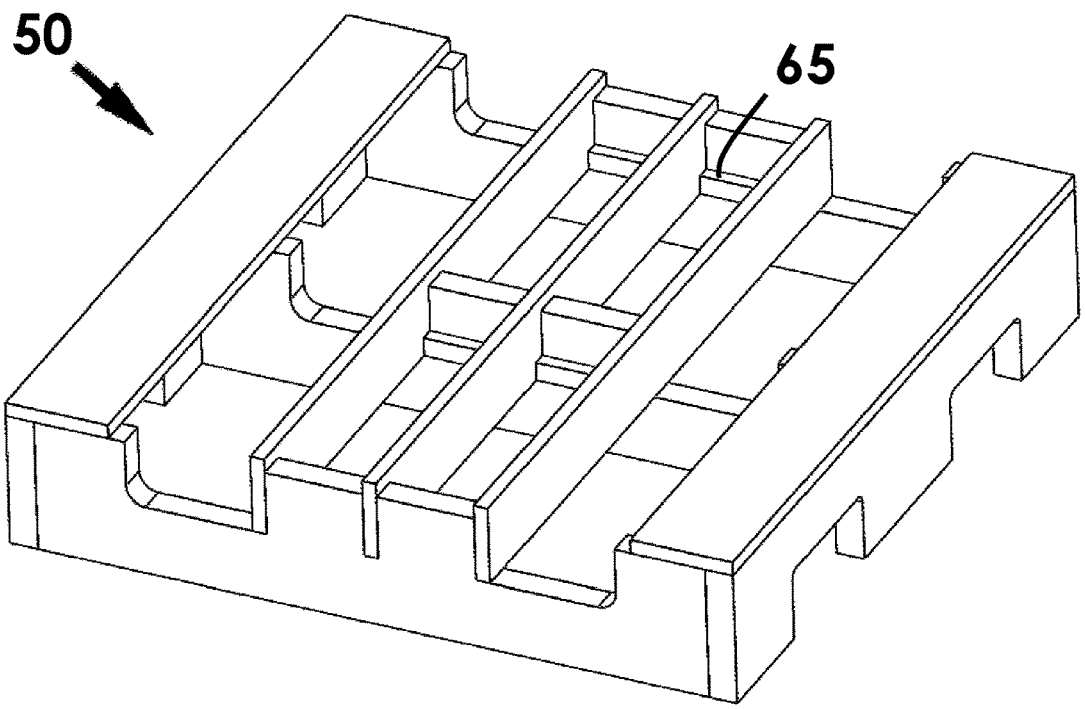
FIG. 43 is a top perspective view of another embodiment of a portable platform of the present disclosure.
Figure 44:
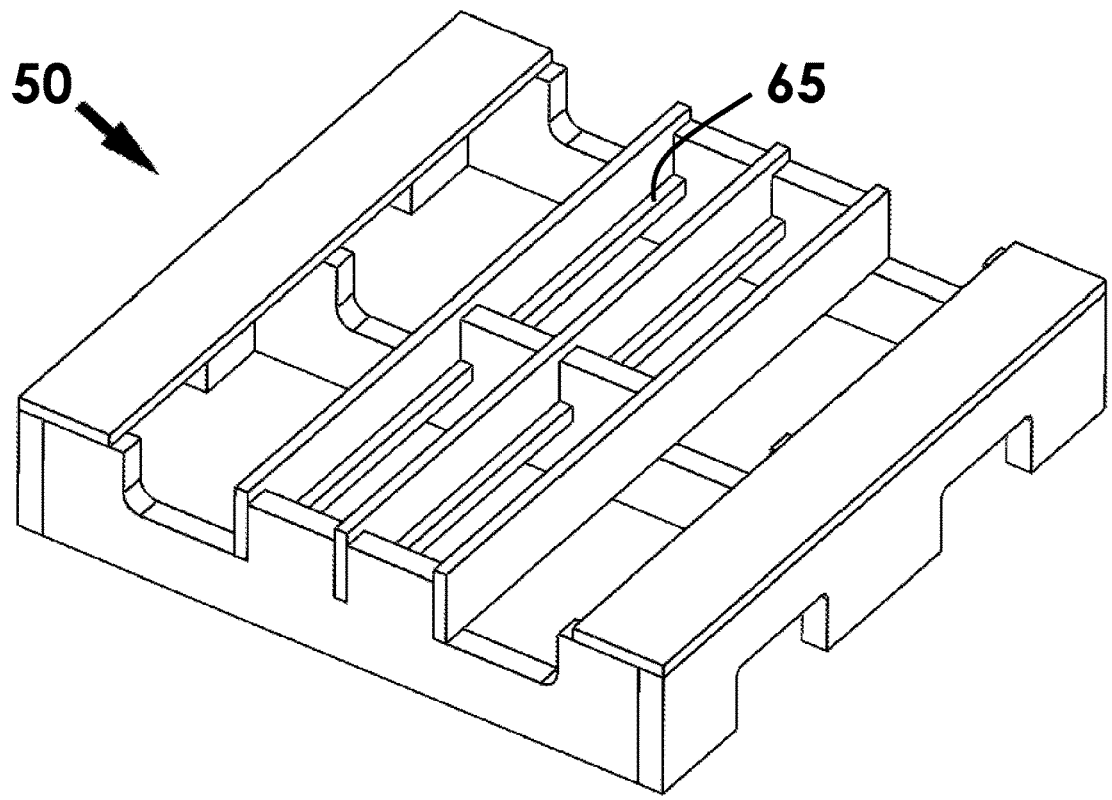
FIG. 44 is a top perspective view of another embodiment of a portable platform of the present disclosure.
Figure 45:
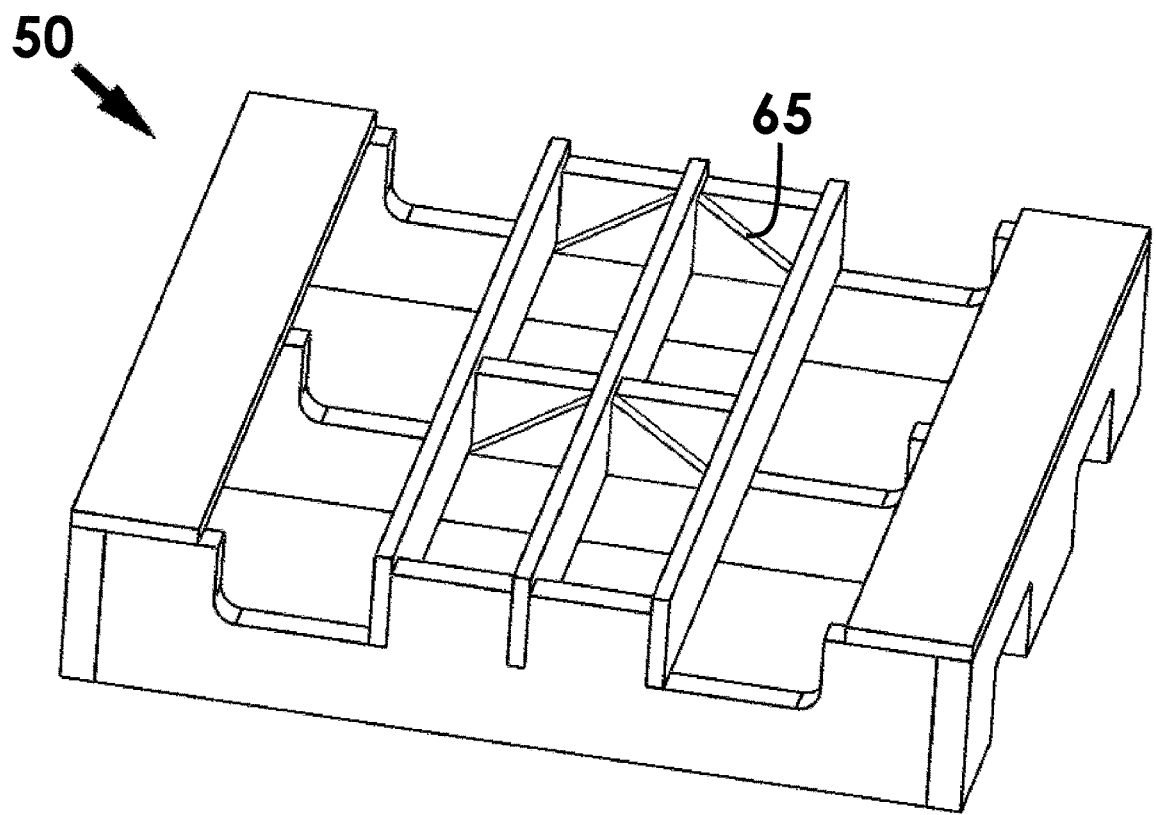
FIG. 45 is a top perspective view of another embodiment of a portable platform of the present disclosure.
Figure 46:
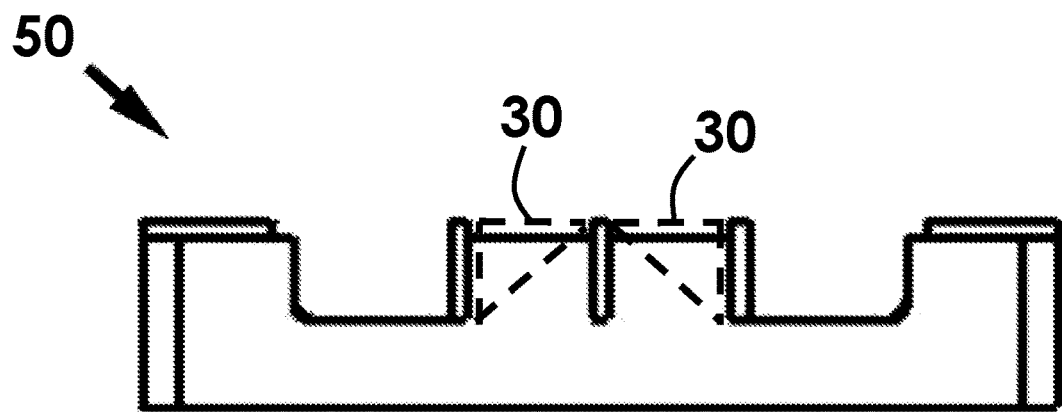
FIG. 46 is a right side elevation view of the portable platform of FIG. 45 including portable supports in a mated position with the portable platform providing a portable platform assembly.

As shown in FIGS. 43-45, the one or more cavities 62 may comprise open bottoms with one or more flanges 65 or other catch type surfaces operationally configured to maintain one or more portable supports 30 in the one or more cavities 62 as desired. As shown, the one or more flanges 65 may be located at one or more points within the one or more cavities 62 corresponding to particular size and shape portable supports 30. Suitably, the one or more flanges 65 are operationally configured to hold the one or more portable supports 30 within the one or more cavities 62 at a position whereby the one or more upper surfaces 35 of the one or more portable supports 30 are aligned, or substantially aligned, with the upper surface 52 of the portable platform 50 (see FIGS. 46 and 47 including four individual portable supports 30 corresponding to the one or more flanges 65 of the portable platform 50 of FIG. 45).

Herein, suitable materials of construction of a portable platform 50 may include, but are not necessarily limited to materials resistant to chipping, cracking, excessive bending and reshaping as a result of ozone, weathering, heat, moisture, other outside mechanical and chemical influences, as well as physical impacts. Exemplary materials of construction include, but are not necessarily limited to metals, plastics, rubbers, woods, filled composite materials, and combinations thereof. Suitable metals may include, but are not necessarily limited to steel as described herein, aluminum, copper, nickel, brass, and combinations thereof. Metals such as titanium are contemplated but may not be feasible based on material cost. Suitable plastics may include, but are not necessarily limited to acrylic or polymethyl methacrylate ("PMMA"), polycarbonate ("PC"), polyethylene ("PE"), polypropylene ("PP"), polyethylene terephthalate ("PETE"), polyvinyl chloride ("PVC"), acrylonitrile-butadiene-styrene ("ABS"), and combinations thereof. Non-limiting examples of woods include any wood desirable or available including, but not necessarily limited to pine, oak, ash, beech, fir, spruce, cedar, redwood, birch, cherry, mahogany, maple, poplar, teak, walnut, hickory, and combinations thereof. A portable platform 50 of this disclosure may also include one or more corrosion-inhibiting coatings and/or one or more protective coatings such as one or more polyurethane spray on coatings and/or one or more polyurea spray on coatings.

In one non-limiting embodiment, a portable platform 50 may be constructed via a vacuum forming process, e.g., vacuum formed plastic. As understood by the skilled artisan, a vacuum forming process may take into consideration associated geometry alterations suitable to produce a desired vacuum formed portable platform 50, e.g., modifications in corners to prevent thinning of the plastic material during the vacuum forming process and other modifications that be required for a particular vacuum forming process.

The invention will be better understood with reference to the following non-limiting examples, which are illustrative only and not intended to limit the present disclosure to a particular embodiment.

Example 1

Figure 49:
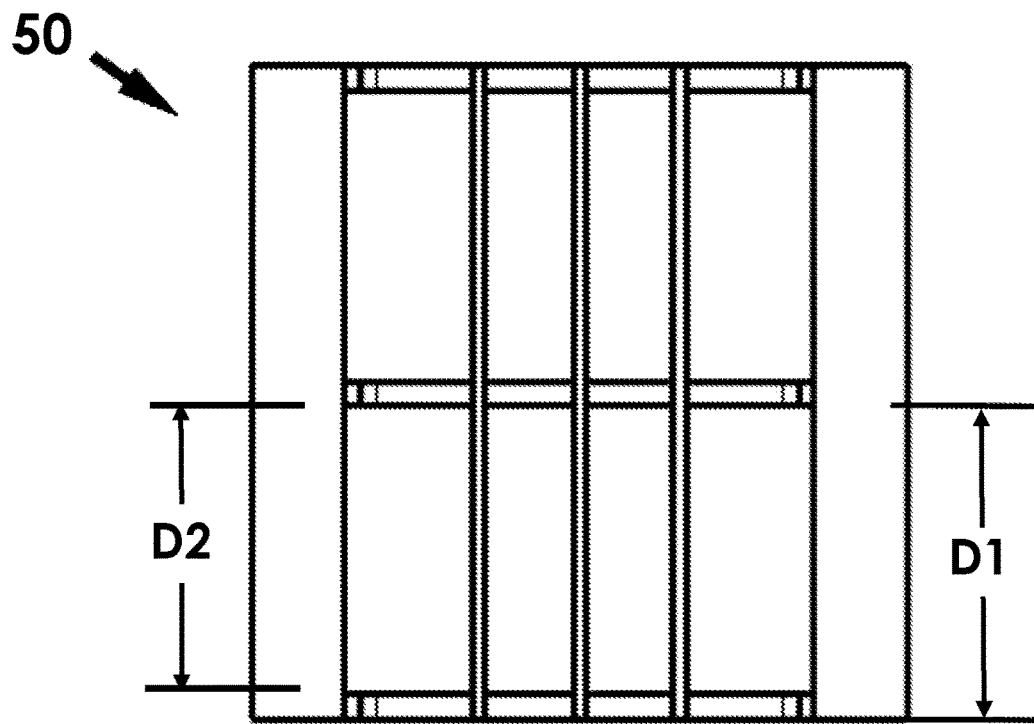
FIG. 49 is a top view of an embodiment of a portable platform of the present disclosure.
Figure 50:
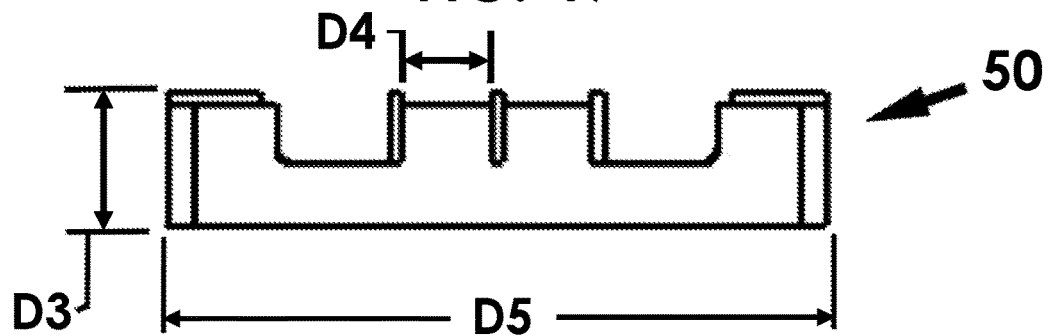
FIG. 50 is a right side elevation view of the portable platform of FIG. 49.
Figure 51:
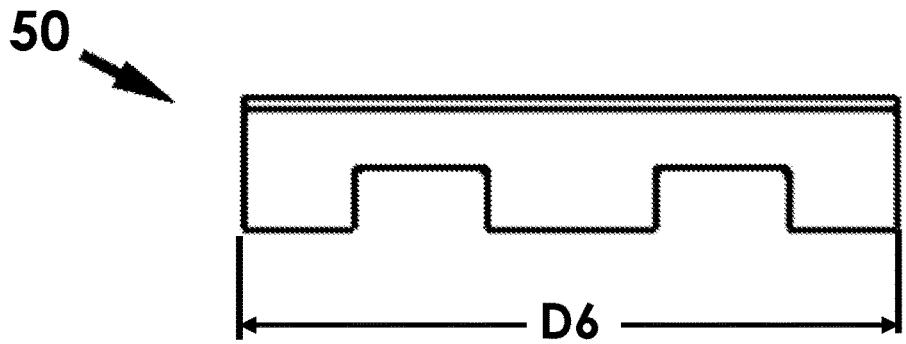
FIG. 51 is a front elevation view of the portable platform of FIG. 49.

With reference to FIGS. 49-51, in a first non-limiting example a portable platform 50 is provided operationally configured to support up to or about 1814.4 kg (4000.00 pounds) thereon. The portable platform 50 has the following dimensions:

D1: 47.6 cm (18.75 inches);
D2: 43.8 cm (17.25 inches);
D3: 20.3 cm (8.00 inches);
D4: 13.3 cm (5.25 inches);
D5: 99.1 cm (39.00 inches);
D6: 99.1 cm (39.00 inches).

Example 2

Figure 52:
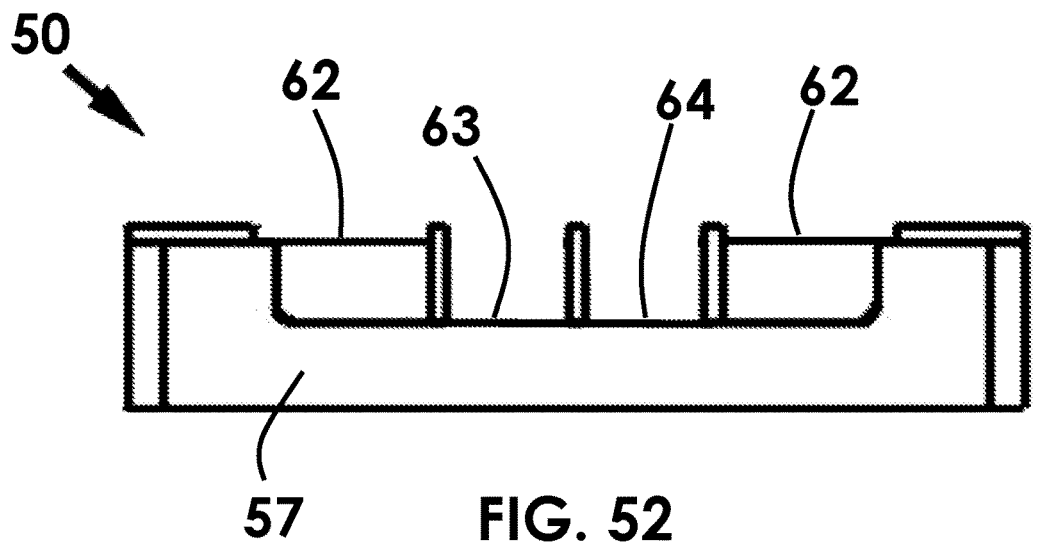
FIG. 52 is a right side elevation view of another embodiment of a portable platform of the present disclosure.

In a second non-limiting example, a portable platform 50 may include upper fork pockets 63 and 64 that are located between cavities 62 as shown in FIG. 52.

Example 3

Figure 53:
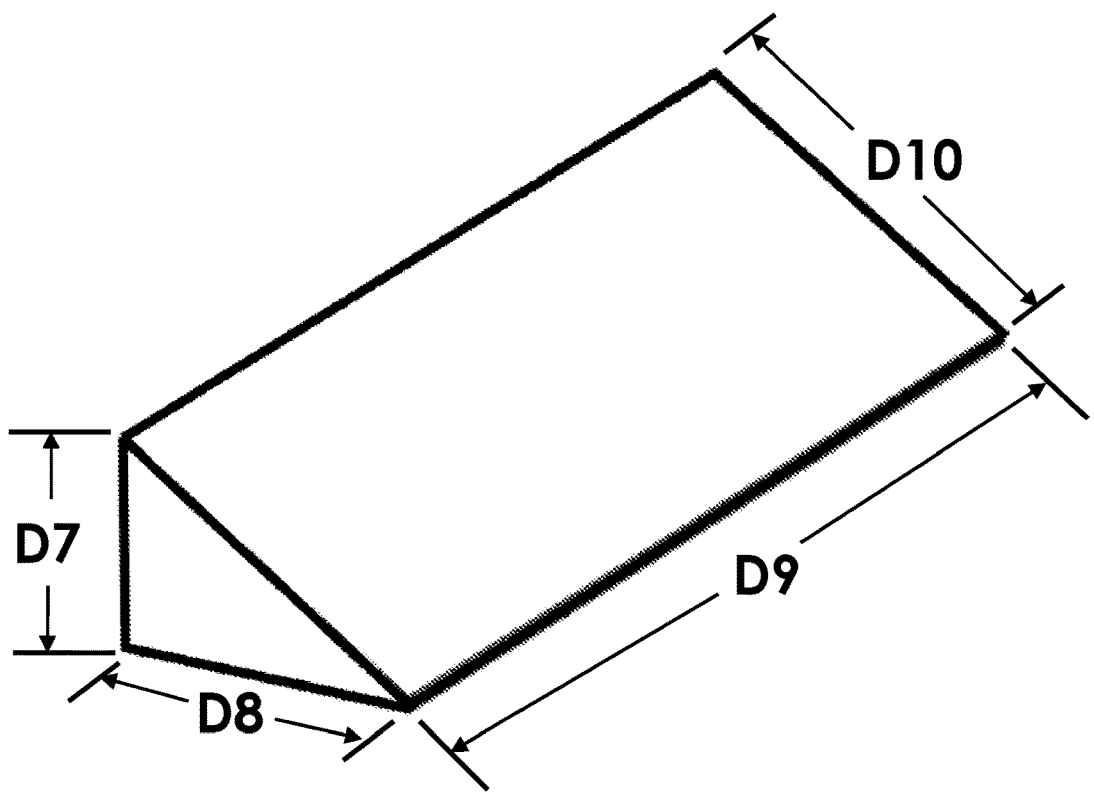
FIG. 53 is a perspective view of a portable support of the present disclosure.

With reference to FIG. 53, in a third non-limiting example one or more spacers 32 are provided for use with a portable support 50 as described in Example 1. Each spacer 32 has the following dimensions:

D7: 8.89 cm (3.5 inches);
D8: 13.97 cm (5.5 inches);
D9: 43.2 cm (17.0 inches);
D10: 16.6 cm (6.52 inches).

Example 4

Figure 54:
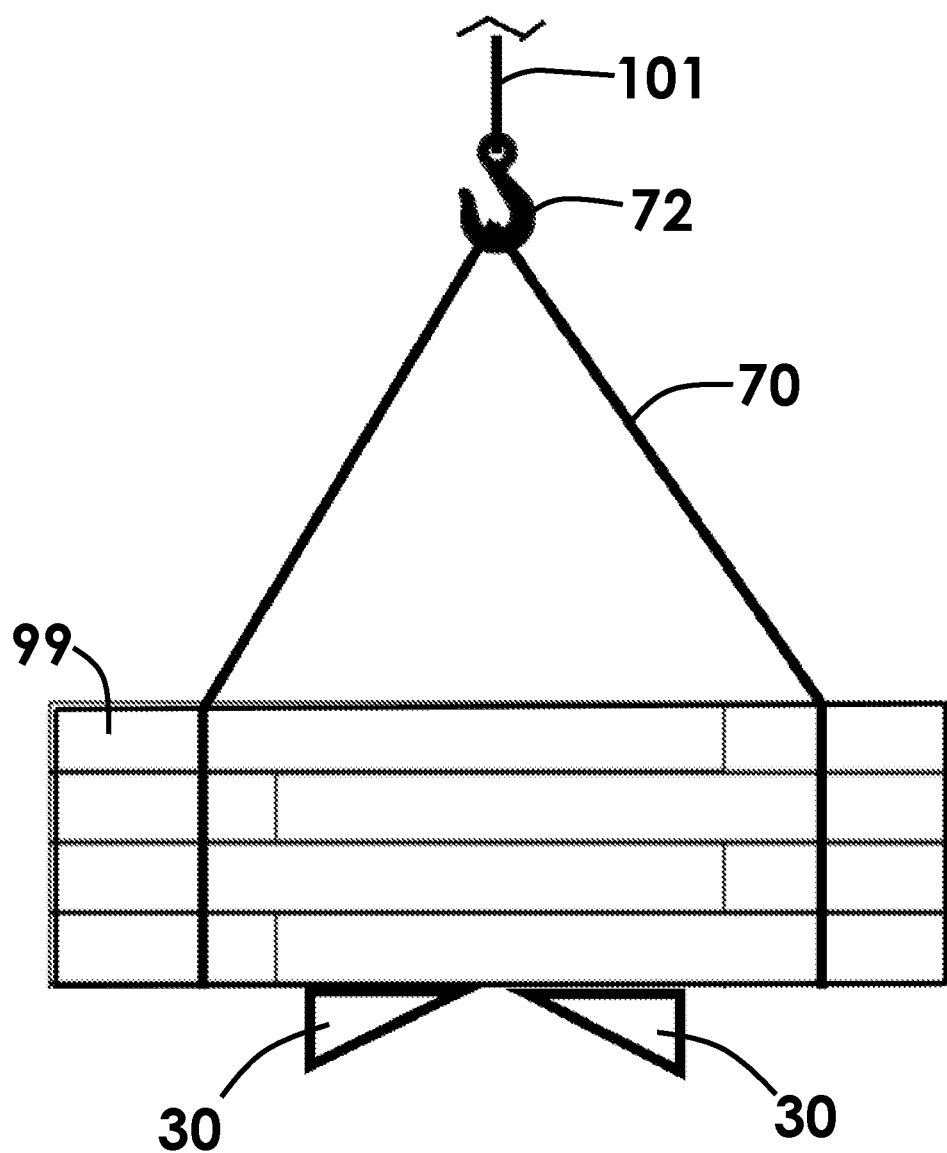
FIG. 54 illustrates four rows of bundles of roofing shingles and portable supports adhered to a bottommost row of the bundles of roofing shingles being transported in space via hoisting materials and lifting equipment.
Figure 55:
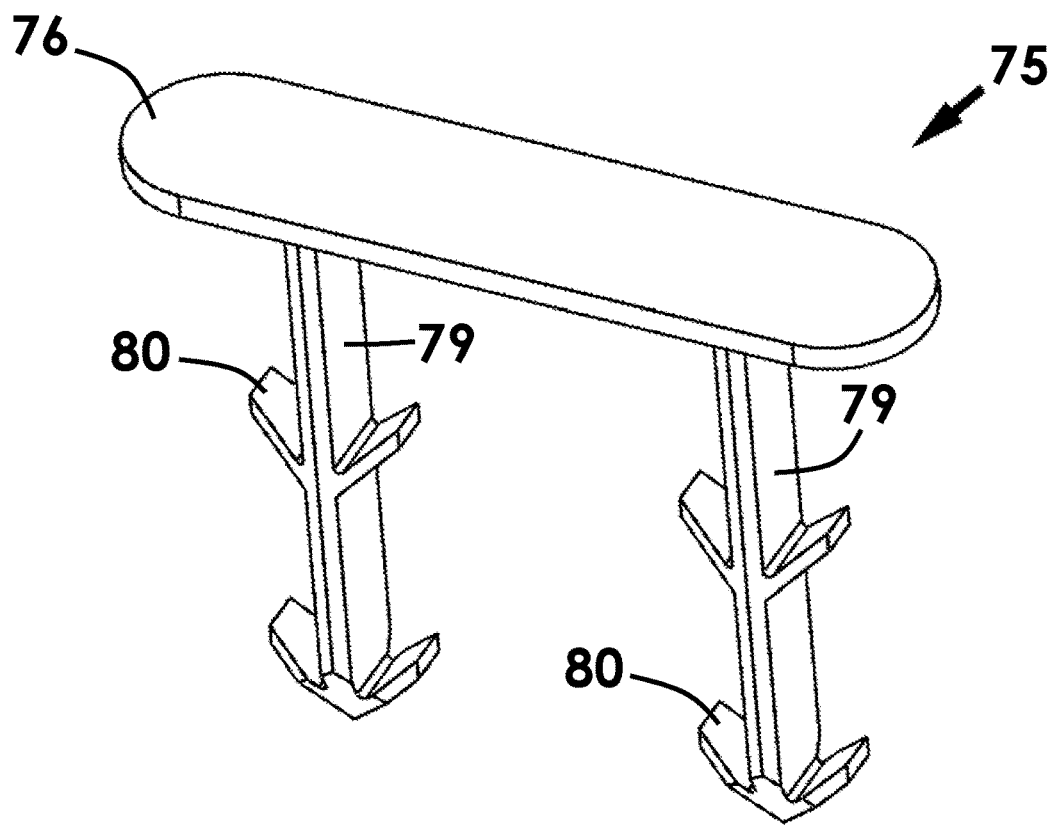
FIG. 55 is a top perspective view of an embodiment of a barbed member of a portable support of the present disclosure.
Figure 56:
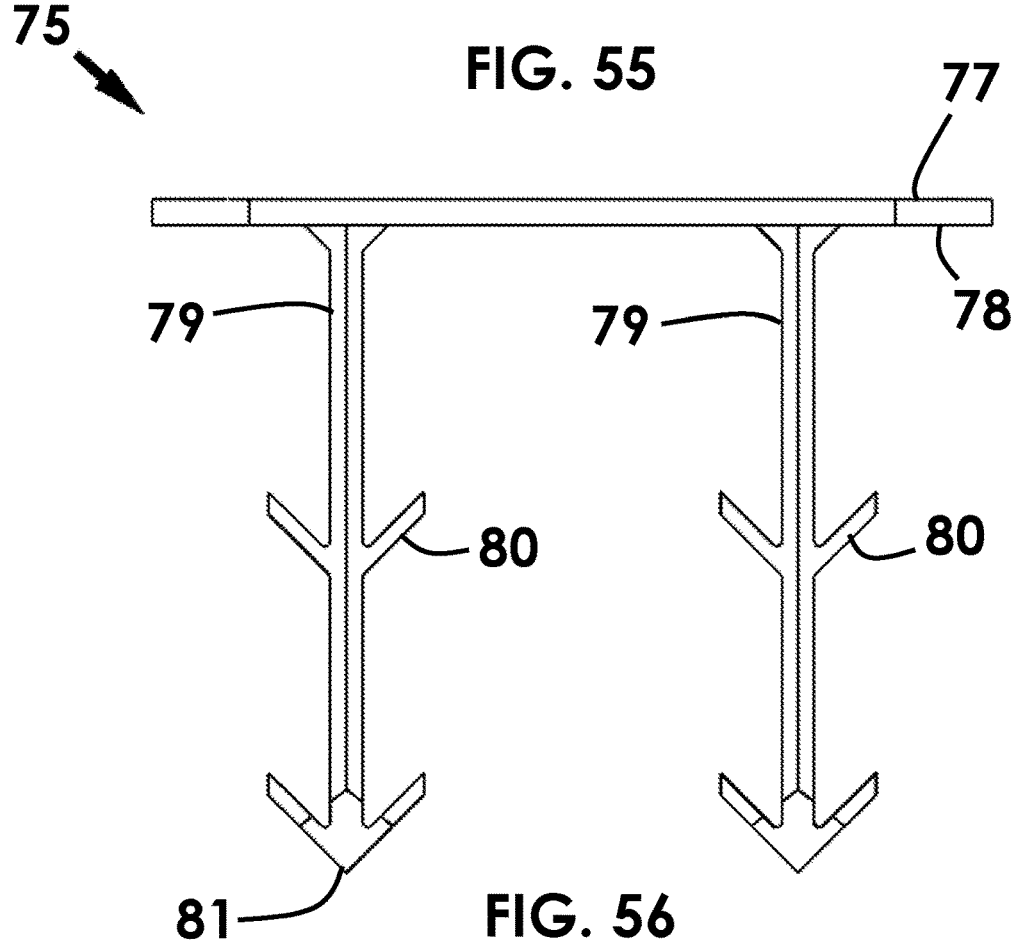
FIG. 56 is a side elevation view of the barbed member of FIG. 55.
Figure 57:
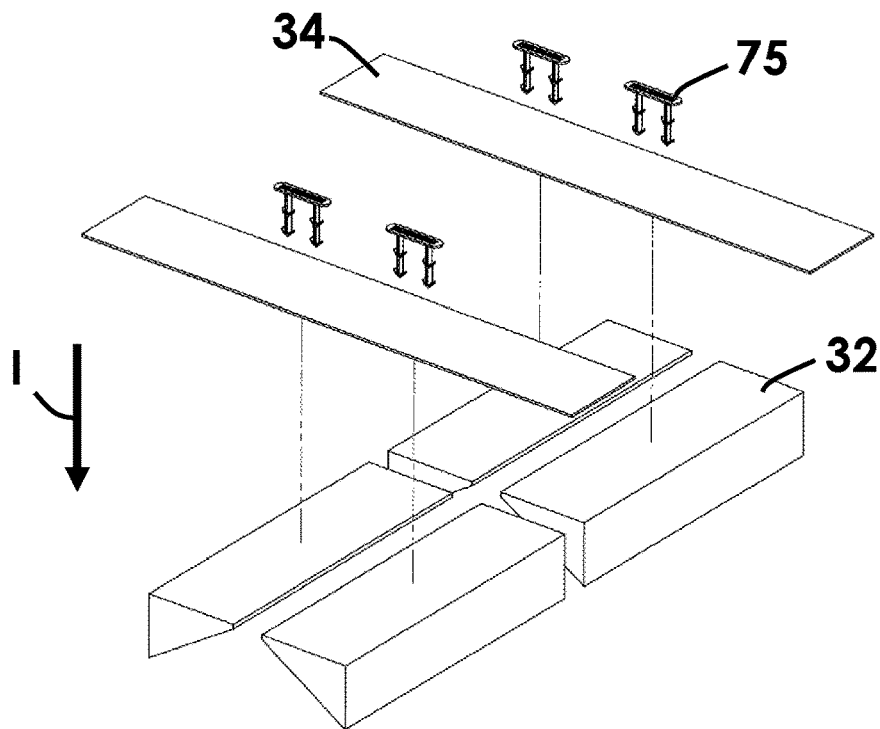
FIG. 57 is a top perspective exploded view of an embodiment of a portable support of the present disclosure.

With reference to FIG. 54, in a fourth non-limiting example one or more bundles of roofing shingles 99 and one or more portable supports 30 may be lifted and transported to one or more target surfaces via a hoist or the like including a lift line 101 of lifting equipment 7. In one embodiment, the one or more portable supports 30 may be fastened and/or adhered and/or tied to the one or more bundles of roofing shingles 99. In another embodiment, one or more extension members 34 of one or more portable supports 30 may be fastened and/or adhered and/or tied to the one or more bundles of roofing shingles 99. With further reference to FIG. 54, one or more bundles of roofing shingles 99 may be bound and/or supported with one or more hoisting materials 70, e.g., rope, cord, netting, mesh material, cable, chain, and combinations thereof and connected to a lift hook 72 such as an eye hook or clevis hook or other connector, e.g., lifting tongs, shackles, clamps, hoist ring, in a manner effective to lift and transport the one or more bundles of roofing shingles 99 and the one or more portable supports 30 to one or more target surfaces including, but not necessarily limited to a peak 6 of a roof 5. In another embodiment, the one or more extension members 34 of one or more portable supports 30 may be bound by one or more hoisting materials 70 in a manner effective to transport the one or more portable supports 30 with the one or more bundles of roofing shingles 99. In another embodiment, support members 12 and 13 of a lifting device 10 or fork tines of a fork lift 8 may be employed for transporting the one or more bundles of roofing shingles 99 and one or more portable supports 30 via the one or more hoisting materials 70.

Example 5

With reference to FIGS. 55-59, in a fifth non-limiting example one or more portable supports 30 comprise one or more barbed members 75 that are operationally configured to attach one or more extension members 34 to one or more spacers 32 constructed from one or more puncturable materials including, but not necessarily limited to foam. A barbed member 75 of this example is provided as a staple type member comprising a head 76 defined by a planar outer surface 77 and a planar inner surface 78 and one or more elongated legs 79 extending out from the inner surface 78. Each of the one or more legs 79 comprises one or more barbs 80 and/or other projections disposed along the one or more legs 76. In this embodiment, the one or more legs 79 include one or more puncture forming distal ends 81 operationally configured to puncture one or more extension members 34 and one or more corresponding portable supports 30.

Figure 58:
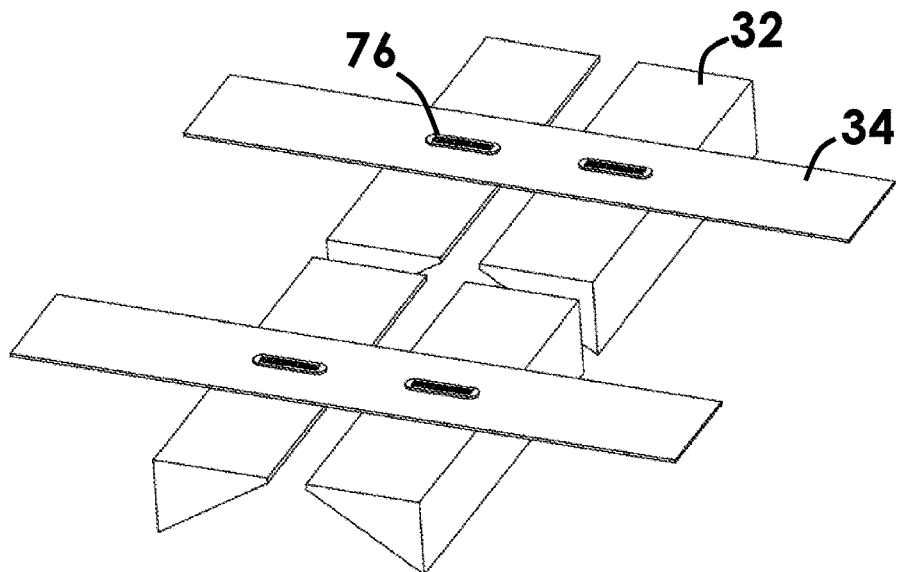
FIG. 58 is a top view of the portable support of FIG. 57 assembled.
Figure 59:
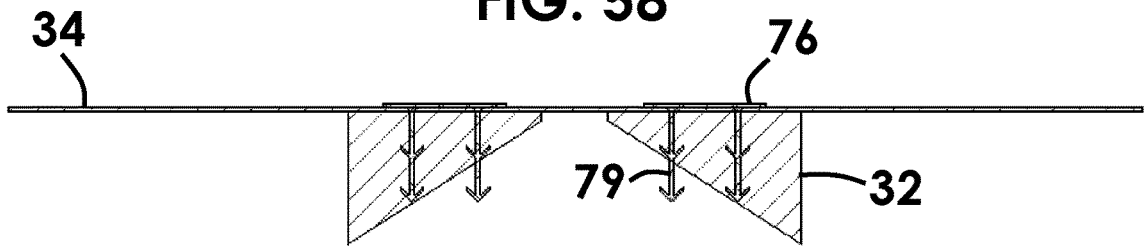
FIG. 59 is a side view of the portable support of FIG. 57 assembled.

In this embodiment, the one or more barbed members 75 are provided as one-way barbed members 75 wherein the one or more barbs 80 and/or other projections extend out from the one or more legs 79 at an angle effective for each of the one or more barbed members 75 to penetrate through the one or more extension members 34 into the one or more spacers 32 (see arrow I in FIG. 57) and catch or hold the inner material of the one or more spacers 32. As shown in FIGS. 58-59, the one or more legs 79 of each barbed member 75 employed are directed into the one or more spacers 32 via a tool such as hammer or the like, or manually pressed into the one or more spacers 32 so that the head 76 sandwiches a corresponding part of an extension member 34 against a corresponding part of a spacer 32 providing a planar type surface effective for receiving one or more items including, but not necessarily limited to one or more bundles of roofing shingles 99 thereon. Suitably, the one or more barbs 80 of a barbed member 75 are operationally configured to prevent rotation of the barbed member 75 when mated to an extension member 34 and a spacer 32. In addition, in an embodiment of a barbed member 75 comprising a plurality of legs 79, the plurality of legs 79 are operationally configured to prevent rotation of the barbed member 75 when mated to a spacer 32. Although the one or more barbed members 75 may be built to scale, one or more barbed members 75 operationally configured for use with one or more spacers 32 as described in Example 3 may include one or legs 79, each leg 79 having a length up to or about 6.35 cm (2.5 inches).

Example 6

Figure 60:
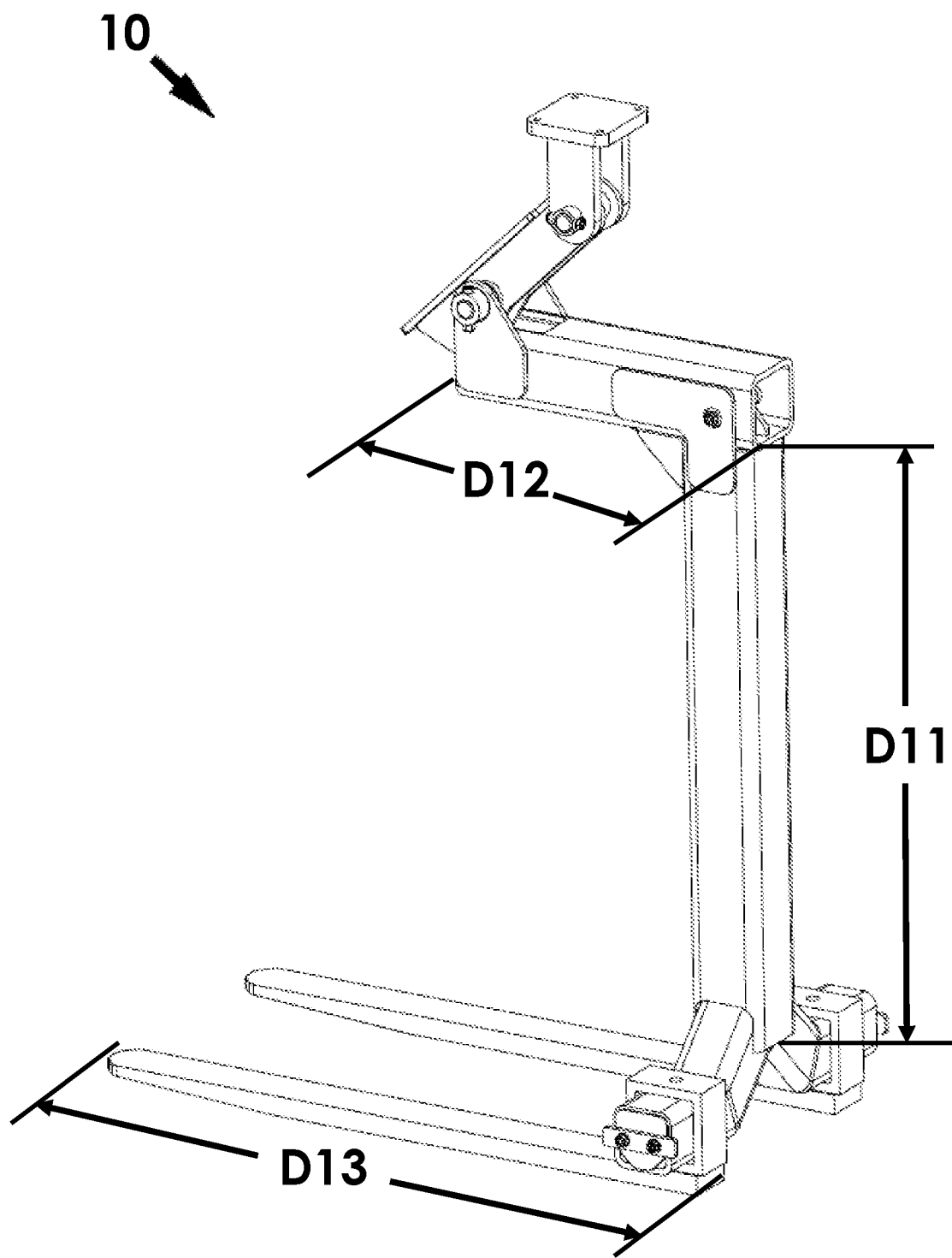
FIG. 60 is a rear perspective view of an embodiment of a lifting device of this disclosure.

In a sixth non-limiting example, a lifting device 10 as shown in FIG. 60 that is operationally configured to carry up to or about eighteen bundles of shingles 99 or a weight up to or about 693.99 kg (1530.0 pounds) has the following dimensions:
D11: 121.9 cm (48.0 inches);
D12: 76.2 cm (30.0 inches);
D13: 132.1 cm (52.0 inches).

Example 7

In a seventh non-limiting example, a lifting device 10 comprising a descending fork frame as depicted in FIGS. 8-13 may be operationally configured to transport a maximum load of 2721.6 kg (6000.0 pounds). In one operation, a total of fifty-six (56) bundles of roofing shingles 99, each bundle weighing 80.0 pounds, are stacked on a portable platform assembly 150 in fourteen rows of four bundles of roofing shingles 99 per row or a weight up to or about 2032.1 kg (4480.0 pounds). In this embodiment of the lifting device 10, the support members 12 and 13 of the lifting device 10 may comprise fork tines, each having a length of or about 152.4 cm (60.0 inches) and a maximum width of or about 12.7 cm (5.0 inches). In addition, a third frame section 25 of this embodiment of the lifting device 10 comprises a length of or about 96.5 cm (38.0 inches).

Example 8

Figure 61:
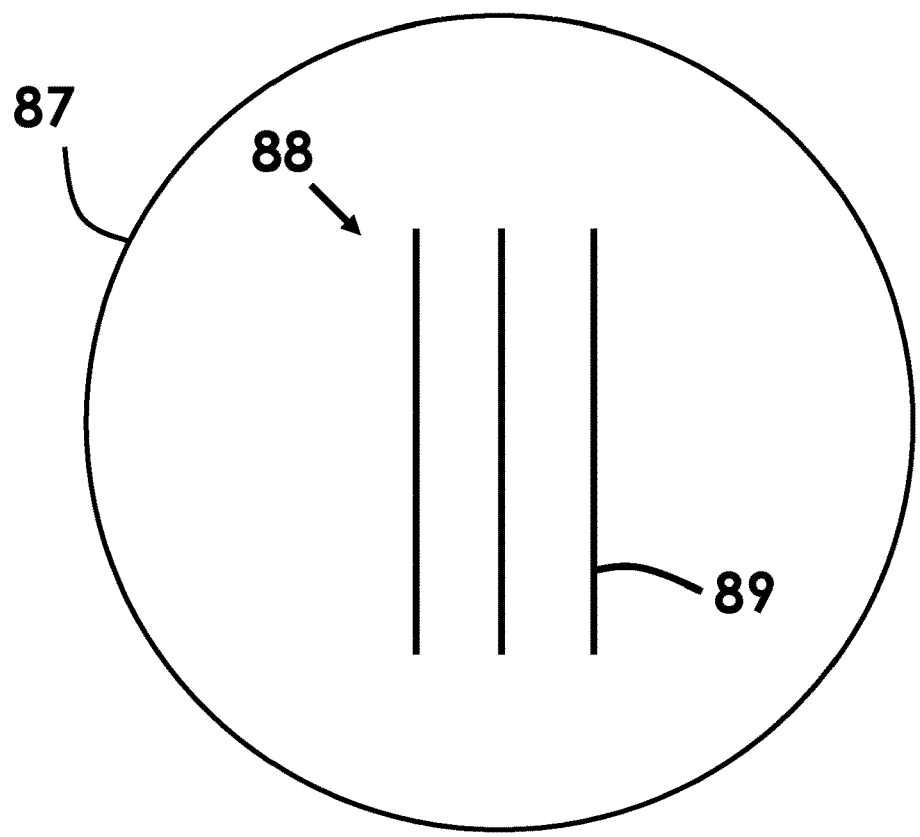
FIG. 61 is a front view of a reticle on a lens of a camera of this disclosure.

With reference to FIG. 61, in an eighth non-limiting example a lifting device 10 of this disclosure may include a camera with a lens 87 comprising a reticle 88 thereon, the reticle 88 comprising one or more vertical guide lines 89 operationally configured to assist an operator of the lifting device 10 in the transport of one or more loads of one or more bundles of roofing shingles 99 onto one or more peaks 6 of one or more roofs 5.

Example 9

Figure 62:
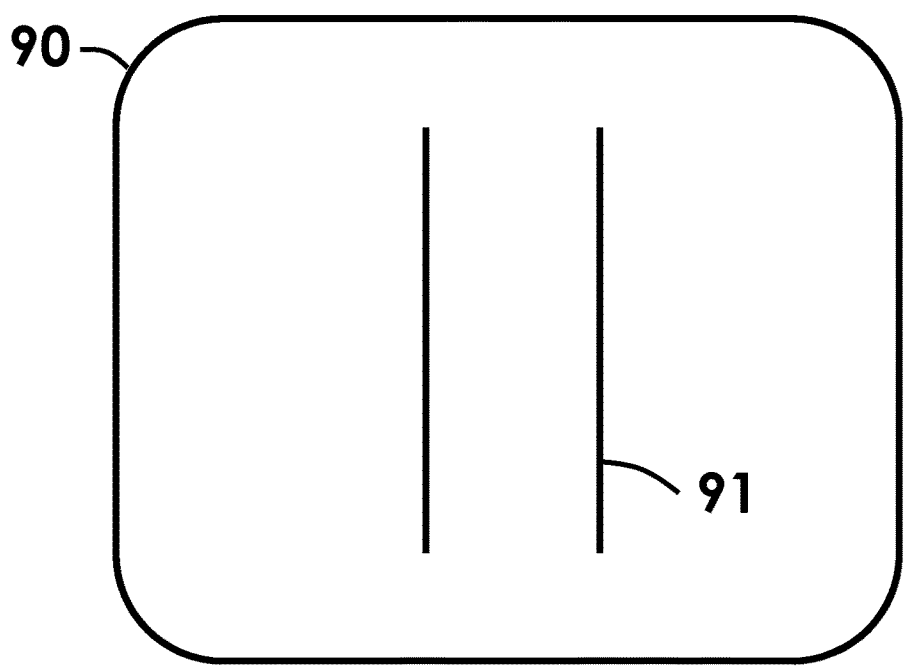
FIG. 62 is a front view of a display screen of a monitor of this disclosure including an overlay of one or more guide lines.

With reference to FIG. 62, in a ninth non-limiting example, a display screen 90 of a monitor operationally configured for use with a camera 39 of a lifting device 10 of this disclosure may include an overlay on the display screen 90 comprising one or more guide lines 91 operationally configured to assist an operator of the lifting device 10 in the transport of one or more loads of one or more bundles of roofing shingles 99 onto one or more peaks 6 of one or more roofs 5.

Example 10

With reference to FIG. 63, in a tenth non-limiting example, a first portable platform assembly 150 with one or more bundles of roofing shingles 99 thereon is provided at a first location. A lifting device 10 of this disclosure is operated via lifting equipment 7 to remove one or more portable supports 30 and one or more bundles of the roofing shingles 99 thereon from the portable platform 50 of the portable platform assembly 150 and transport the one or more portable supports 30 and one or more bundles of the roofing shingles 99 to a second portable platform 50A providing a second portable platform assembly 150 holding the one or more roofing shingles 99 at a second location (see arrows J and K). In another embodiment, in a warehouse type setting a fork lift may be used to remove one or more portable supports 30 and one or more loads of one or more items thereon from a first portable platform 50 of a first portable platform assembly 150 and transport the one or more portable supports 30 and one or more loads of one or more items to a second portable platform 50A providing a second portable platform assembly 150. Non-limiting examples of suitable fork lifts are described in U.S. Pat. No. 7,051,832 B2, titled "Material Handling Vehicle with Dual Control Handles," issued on May 30, 2006; and U.S. Pat. No. 7,366,600, titled "Distributed Control System for Forklift," issued on Apr. 29, 2008, each of which is herein incorporated by reference in its entirety.

Although the present disclosure is described above in terms of various exemplary embodiments and implementations, it should be understood that the various features and functionality described in one or more of the individual embodiments are not limited in their applicability to the particular embodiment with which they are described, but instead might be applied, alone or in various combinations, to one or more other embodiments whether or not such embodiments are described and whether or not such features are presented as being a part of a described embodiment. Thus, the breadth and scope of the claimed invention should not be limited by any of the above-described embodiments.

Terms and phrases used in this document, and variations thereof, unless otherwise expressly stated, should be construed as open-ended as opposed to limiting. As examples of the foregoing: the term "including" should be read as meaning "including, without limitation" or the like, the term "example" is used to provide exemplary instances of the item in discussion, not an exhaustive or limiting list thereof, the terms "a" or "an" should be read as meaning "at least one," "one or more," or the like.

Persons of ordinary skill in the art will recognize that many modifications may be made to the present disclosure without departing from the spirit and scope of the disclosure. The embodiment(s) described herein are meant to be illustrative only and should not be taken as limiting the disclosure, which is defined in the claims.

We claim:
1. A portable platform assembly for transporting one or more items located thereon, comprising:
   a portable platform; and
   a portable support removable from the portable platform;
   wherein the portable support includes one or more opposing spacers;
   wherein the portable support includes one or more extension members extending out from the one or more opposing spacers; and wherein the one or more extension members comprise contact surfaces for elongated support members of lifting equipment.

2. The portable platform assembly of claim 1 wherein the portable platform includes a first set of fork pockets at a first elevation and a second set of fork pockets at a second elevation.

3. The portable platform assembly of claim 2 wherein when the portable support is assembled with the portable platform then at least part of the portable support is located above the second set of fork pockets of the portable platform.

4. The portable platform assembly of claim 1 wherein the portable platform includes one or more openings configured to receive at least part of the portable support therein when the portable support is assembled with the portable platform.

5. The portable platform assembly of claim 1 wherein the portable platform comprises an upper surface for supporting at least part of the one or more extension members thereon and one or more openings configured to receive the one or more opposing spacers therein when the portable support is assembled with the portable platform.

6. The portable platform assembly of claim 1 wherein the portable support is configured to support the one or more items thereon when the portable support is located on a peak of a pitched roof.

7. The portable platform assembly of claim 1 wherein the portable support includes a first surface comprising the one or more spacers and the contact surfaces of the one or more extensions members and wherein the portable support includes a second surface configured to support the one or more items thereon.

8. The portable platform assembly of claim 7 wherein the portable support is configured to support the one or more items thereon when the portable support is apart from the portable platform.

9. The portable platform assembly of claim 1 wherein the portable platform is a four sided portable platform comprising a bottom surface and an upper surface, wherein the bottom surface includes a first set of fork pockets on a first side of the portable platform and wherein the upper surface includes a second set of fork pockets on a second side of the portable platform.

10. A portable platform assembly for transporting one or more items located thereon, comprising:
a portable platform; and
a portable support removable from the portable platform;
wherein the portable support includes one or more opposing spacers;
wherein the portable support includes one or more extension members extending out from the one or more opposing spacers;
wherein the one or more extension members comprise contact surfaces for elongated support members of lifting equipment; and
wherein the portable platform comprises an upper surface for supporting at least part of the one or more extension members thereon and one or more openings configured to receive the one or more opposing spacers therein when the portable support is assembled with the portable platform.

11. The portable platform assembly of claim 10 wherein the portable platform includes a first set of fork pockets at a first elevation and a second set of fork pockets at a second elevation.

12. The portable platform assembly of claim 11 wherein when the portable support is assembled with the portable platform then at least part of the portable support is located above the second set of fork pockets of the portable platform.

13. A portable platform assembly for transporting one or more items located thereon, comprising:
a portable platform; and
a portable support removable from the portable platform;
wherein the portable support includes one or more opposing spacers;
wherein the portable support includes one or more extension members extending out from the one or more opposing spacers;
wherein the one or more extension members comprise contact surfaces for elongated support members of lifting equipment; and
wherein the portable support is configured to support the one or more items thereon when the portable support is located on a peak of a pitched roof.

14. The portable platform assembly of claim 13 wherein the portable platform includes one or more openings configured to receive at least part of the portable support therein when the portable support is assembled with the portable platform.

15. The portable platform assembly of claim 13 wherein the portable platform includes a first set of fork pockets at a first elevation and a second set of fork pockets at a second elevation.

16. The portable platform assembly of claim 15 wherein when the portable support is assembled with the portable platform then at least part of the portable support is located above the second set of fork pockets of the portable platform.

\* \* \* \* \*